United States Patent
Yamamoto et al.

(10) Patent No.: US 9,218,059 B2
(45) Date of Patent: Dec. 22, 2015

(54) INPUT APPARATUS FOR VEHICLE

(75) Inventors: Norio Yamamoto, Kariya (JP); Nozomi Kitagawa, Okazaki (JP); Katsuhide Kumagai, Niwa-gun (JP); Masahiko Miyata, Niwa-gun (JP)

(73) Assignees: DENSO CORPORATION, Kariya (JP); KABUSHIKI KAISHA TOKAI RIKA DENKI SEISAKUSHO, Niwa-gun (JP)

(*) Notice: Subject to any disclaimer, the term of this patent is extended or adjusted under 35 U.S.C. 154(b) by 1782 days.

(21) Appl. No.: 12/195,792

(22) Filed: Aug. 21, 2008

(65) Prior Publication Data
US 2009/0076676 A1    Mar. 19, 2009

(30) Foreign Application Priority Data

Aug. 24, 2007  (JP) ................. 2007-219081
Aug. 24, 2007  (JP) ................. 2007-219082
Aug. 24, 2007  (JP) ................. 2007-219083
May 29, 2008   (JP) ................. 2008-140685

(51) Int. Cl.
| | | |
|---|---|---|
| G06F 3/033 | (2013.01) | |
| G05G 5/03 | (2008.04) | |
| G06F 3/01 | (2006.01) | |
| G06F 3/0338 | (2013.01) | |
| G06F 7/00 | (2006.01) | |
| G09G 5/00 | (2006.01) | |

(52) U.S. Cl.
CPC .............. *G06F 3/016* (2013.01); *G06F 3/0338* (2013.01); *B60K 2350/928* (2013.01); *Y10T 74/20201* (2015.01)

(58) Field of Classification Search
CPC ..... B60Q 1/1484; G06F 3/016; G06F 3/0338; B60K 2350/928
USPC .......... 345/156–157, 173–178; 700/1, 83–85; 701/1, 36–49; 715/700–702, 716
See application file for complete search history.

(56) References Cited

U.S. PATENT DOCUMENTS

| | | | |
|---|---|---|---|
| 6,448,670 B1 | 9/2002 | Onodera et al. | |
| 6,904,823 B2 | 6/2005 | Levin et al. | |

(Continued)

FOREIGN PATENT DOCUMENTS

| | | |
|---|---|---|
| JP | 2003-335192 | 11/2003 |
| JP | 2004-017761 | 1/2004 |

(Continued)

OTHER PUBLICATIONS

Office Action (1 pg.) dated Sep. 6, 2012 issued in corresponding Japanese Application No. 2008-140685 with an at least partial English-language translation (2 pgs.).

*Primary Examiner* — Khoi Tran
*Assistant Examiner* — Dale Moyer

(57) ABSTRACT

An input apparatus for a vehicle, the apparatus being used for operation input to various vehicular electronic devices, sets position input permission areas on a two-dimensional operation surface of an operation input device discretely by control of a main controller. In control modes of a reaction force, a guide input mode where position indication operations to the areas on the operation surface by the operation input device are guided along unique paths defined in the respective area and an arbitrary mode where the position indication operations are not guided but performed freely can be changed. The guide input mode is set at least during a vehicle travel.

25 Claims, 48 Drawing Sheets

(56) References Cited

U.S. PATENT DOCUMENTS

| | | |
|---|---|---|
| 7,104,152 B2 | 9/2006 | Levin et al. |
| 7,219,759 B2 | 5/2007 | Kitagawa et al. |
| 2003/0172757 A1* | 9/2003 | Yone ............................ 74/335 |
| 2004/0095369 A1* | 5/2004 | Takeuchi et al. ............. 345/701 |
| 2004/0206611 A1 | 10/2004 | Kobayashi |
| 2006/0236800 A1* | 10/2006 | Yone et al. ................. 74/336 R |
| 2006/0283279 A1 | 12/2006 | Levin et al. |
| 2007/0055423 A1* | 3/2007 | Yoshida et al. ................ 701/36 |
| 2008/0249668 A1* | 10/2008 | Miyata et al. ..................... 701/1 |
| 2009/0002314 A1* | 1/2009 | Uchiyama .................... 345/156 |
| 2009/0076676 A1* | 3/2009 | Yamamoto et al. ............. 701/29 |
| 2009/0284467 A1* | 11/2009 | Itoh et al. ...................... 345/157 |
| 2010/0073291 A1* | 3/2010 | Hisatsugu et al. ............ 345/161 |
| 2011/0301810 A1* | 12/2011 | Hisatsugu et al. .............. 701/36 |

FOREIGN PATENT DOCUMENTS

| | | |
|---|---|---|
| JP | 2004-017765 | 1/2004 |
| JP | 2004-226301 | 8/2004 |
| JP | 2004-243834 | 9/2004 |
| JP | 2004-326163 | 11/2004 |
| JP | 2004-355500 | 12/2004 |

\* cited by examiner (a)

(b)

(a)

(b)

(a)

(b)

(c)

(a)

(b)

(a)

(b)

(a)

(b)

(a)

(b)

(a)

(b)

(b)

(c)

(a)

(b)

(a)

(b)

(a)

(b)

(a)

(b)

(c)

(a)

(b)

(a)

(b)

(a)

(b)

INPUT APPARATUS FOR VEHICLE

CROSS REFERENCE TO RELATED APPLICATIONS

This application is based on and claims the benefit of priority of Japanese Patent Applications No. 2007-219081 filed on Aug. 24, 2007, No. 2007-219082 filed on Aug. 24, 2007, No. 2007-219083 filed on Aug. 24, 2007 and No. 2008-140685 filed on May 29, 2008, the disclosure of which are incorporated herein by reference.

FIELD OF THE INVENTION

The present invention generally relates to an input apparatus for a vehicle.

BACKGROUND OF THE INVENTION

Various vehicular electronic devices such as an air-conditioner system, audio system, navigation system, cruise control system, and perimeter monitoring system have been mounted to vehicles in recent years. Therefore, the number of operation portions disposed around an instrument panel of the vehicle is increasing. As a result, it is difficult to arrange only single-function operation portions as all the operation portions.

In many cases, a single multifunction-intensive operation portion which enables operations of multiple functions has been mounted to recent vehicles. Specifically, an input device having the multifunction-intensive operation portion provided on a center console portion etc. is installed. The multifunction-intensive operation portion includes an arrow key, a rotary switch, a joystick and a slider type operation input device which have two-dimensional movable ranges. A structure using the joystick as the multifunction-intensive operation portion is disclosed in JP-A-2004-226301 (Patent Document 1).

In recent years, a multifunction-intensive operation portion specific to a driver is provided on a steering wheel.

However, the conventional multifunction-intensive operation portion has the following disadvantages when provided on the steering wheel as the operation portion specific to the driver. For example, a function to be used is selected by feeding forward or back the function in a predetermined direction when using the arrow key and rotary switch, causing burdensome operations. Further, since the current operation state is difficult to instinctively understand, the operations depend on the content on the display. The operability without visual confirmation is not excellent for the driver.

On the other hand, the joystick or the sliding type operation input device which have two-dimensional movable ranges provide excellent operability because the function menu can be pointed freely to select a function. However, the driver may accidentally perform an unintended operation input during the travel.

Such an erroneous operation may occur when the operation input device is provided on a portion except the steering wheel.

SUMMARY OF THE INVENTION

In view of the above disadvantages, an object of the present invention is to provide an input apparatus for a vehicle, the apparatus achieving an excellent operability for a driver without visual confirmation and preventing erroneous operations during a travel.

To address the above-mentioned disadvantages, the input apparatus of the present invention is used for operation input of vehicular electronic devices.

The input apparatus includes: an operation input device for performing a position indication operation on a two-dimensional surface having a predetermined operation range wherein an operation axis is maintained at a neutral angle position when not in operation and wherein the operation input device is operated, against an reaction force that returns the operation axis to the neutral angle position, to tilt the operation axis in the direction of a position to be indicated when in operation; reaction force applying means for applying the reaction force in response to a position indication operation performed to the operation input device; selectable area setting means for setting a selectable area for the position input in the operation range on the two-dimensional operation surface; and reaction force control means for setting, as a control mode for the reaction force, a guide input mode in which the reaction force is controlled to guide the position indication operation toward the selectable area by the operation input device along a unique path determined on each selectable area on the two-dimensional operation surface.

According to the above structure of the present invention, the operation input device which can perform an arbitrary position indication operation in the predetermined operation range to perform the position indication operation input to the selectable areas provided on the predetermined operation range on the two-dimensional operation surface. Accordingly, a driver can perform the operation input easily by use of this operation input device even during the drive. For example, in a structure in which the guide input mode is set in a preset vehicle travel condition (for example, during a travel of a vehicle), the arbitrary position indication is restricted in the vehicle travel condition and the position indication operation can be thus performed only on the unique paths toward the selectable areas. That is, the operation cannot reach the selectable areas without passing through a specific path and the position input cannot be thus performed to the selectable areas. Accordingly, a possibility of performing a position input to unintended selectable areas by mistake is reduced largely. The position input can be also intentionally performed to the selectable area by memorizing the selectable areas and its unique path.

DETAILED DESCRIPTION

Figure 1:
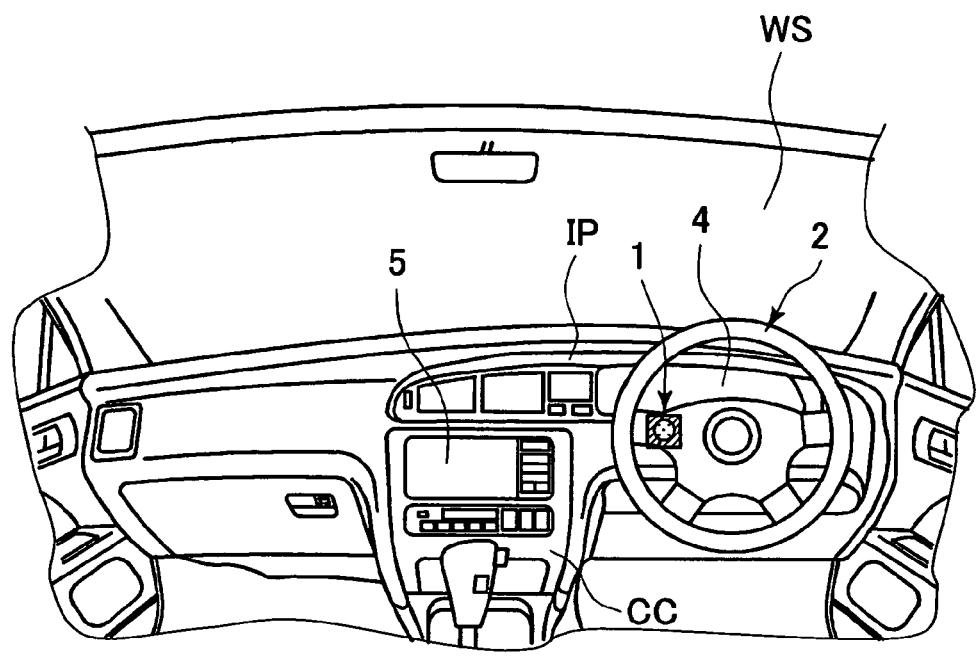
FIG. 1 shows a cockpit of a vehicle incorporating an input apparatus for a vehicle of embodiments of the present invention.

Embodiments of the present invention are explained in reference to the drawings. FIG. 1 shows a cockpit of a vehicle incorporating an input apparatus for a vehicle of the embodiments of the present invention. An operation input device 1 is disposed to a steering wheel 2. The operation input device 1 is used for input operations of one or more vehicular electronic devices such as an air-conditioner, audio device, navigation device, and communication device which are installed in the vehicle. The operation input device 1 is constituted as a pointing device, which performs a position indication operation on a predetermined operation range of a two-dimensional operation surface 40 (see FIG. 5 or 6).

Figure 2:
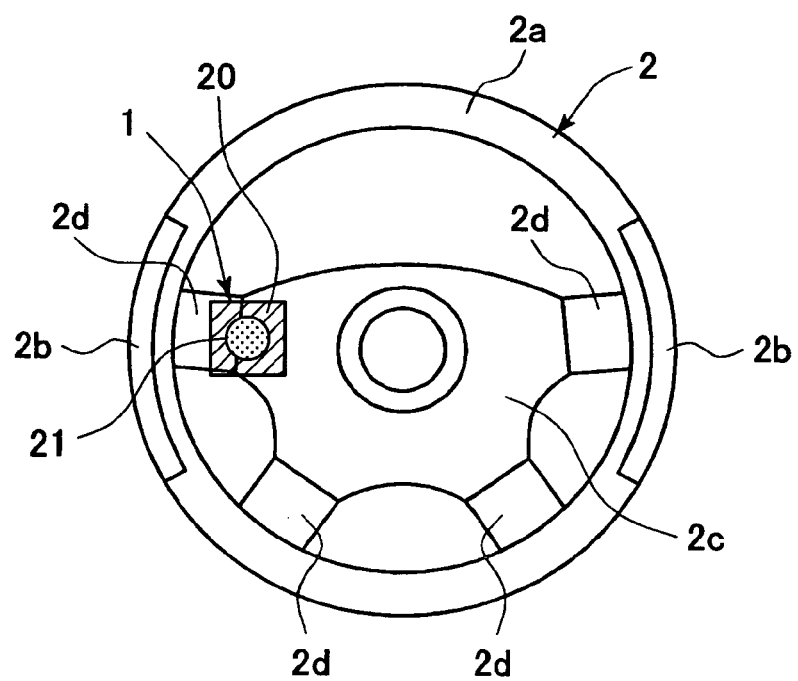
FIG. 2 is an external view showing a first embodiment of a steering wheel mounting an operation input device of the present invention.

As shown in FIG. 2, a steering wheel 2 includes a ring portion 2a gripped by a driver at the time of driving, a central boss portion 2c, and spoke portions 2d which combine the ring portion and boss portion. The boss portion 2c incorporates a horn mechanism and an air bag mechanism. The central area of the boss portion 2c is structured as a housing for the airbag. The surface of the boss portion 2c is structured as a horn button. Both lateral sides of the ring portion 2a when the steering wheel 2 is in a reference position (an operating condition in which a vehicle travels straight: steering neutral position) are grip portions 2*b* and 2*b*.

The operation input device 1 is provided on the left side of the horn button of the boss portion 2*c*. Specifically, the operation input device 1 is disposed to be operable when the steering wheel 2 is in the reference position in which the vehicle travels straight and when the driver grips the left (or right) grip portion 2*b* of the ring portion 2*a*. The operation input device 1 is disposed to be operable by the left hand gripping the grip portion 2*b* (by the right hand when gripping the right grip portion 2*b*) particularly by the thumb.

Figure 3:
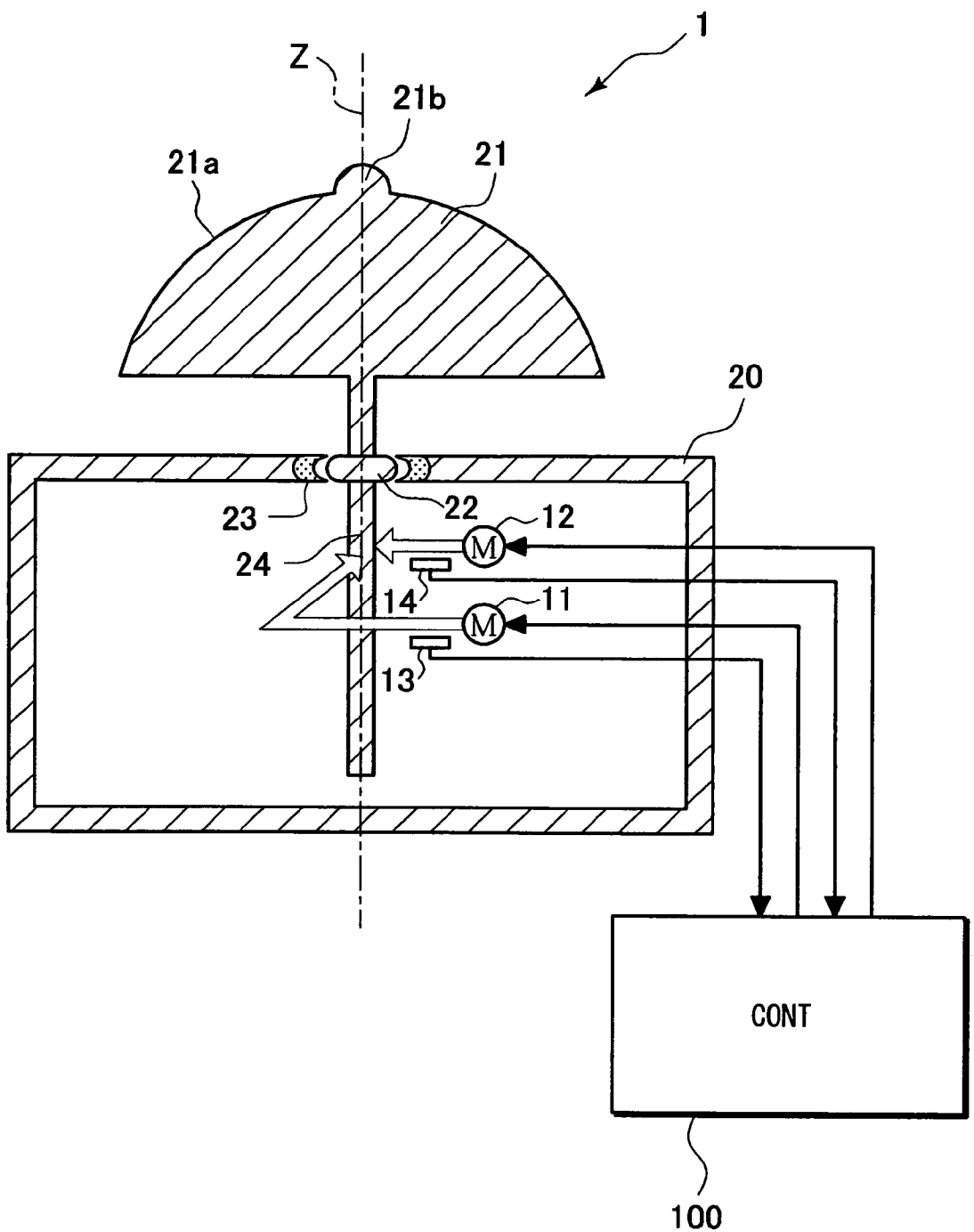
FIG. 3 is a sectional view showing an overview of a structure of the operation input device.

FIG. 3 is a sectional view of the operation input device 1. The operation input device 1, which is the pointing device, includes a joystick type controller (controller) 21 operated by the user. A main controller (ECU) 100 controls actuators (motors in this embodiment) 11 and 12, which add, to the joystick type controller 21, an reaction force against the direction of an operation of the joystick type controller 21 as the controller 21 offsets from a neutral position (it is natural that the reaction force is not added in the neutral position). The operation input device 1 is not limited to the joystick type, but may have a slider type or trackball type controller.

The joystick type controller 21 has a spherical operation surface 21*a*. A rod 24 extends from the back of the joystick type controller 21, and inserted into a housing 20. A spherical portion 22 is formed in the middle of the rod 24. A bearing 23 provided on the housing 20 supports the spherical portion 22, so that the rod 24 is supported pivotally relative to the housing 20. An operation axis Z of the joystick type controller 21 is held in the neutral angle position when not in operation. When the joystick type controller 21 is operated, the joystick type controller 21 is operated against the reaction force (return force) toward the neutral angle position such that the operation axis Z tilts from the neutral angle position in a direction corresponding to the direction of a position to be indicated on a screen 50 displayed on a display 202.

In such a structure, the joystick type controller 21 is movable in the direction along the operation surface 21*a*, which is the contact surface touched by the user, and the joystick type controller 2 uses a touch operation type performing operations using a frictional force between the hand (fingertip) of the user and the joystick type controller 2.

The operation surface 21*a* of the joystick type controller 21 is a two-dimensional operation surface whose operation range is predetermined. In this embodiment, the operation surface 21*a* is a spherical surface whose center is the spherical portion 22 supported by the bearing 23. A center position tactile recognition portion 21*b* is provided on the center of the operation surface 21*a* for causing the user to recognize the center position (a projection is provided in this embodiment, but a recess etc. may be provided). Accordingly, the tilt of the operation axis Z of the joystick type controller 21 can be recognized by the tactile sensation (visual recognition is also possible in this embodiment).

The joystick type controller 21 in this embodiment can move freely in the semispherical movable range along the operation surface 21*a*. In other words, the user can move the joystick type controller 21 from a portion of the operation surface 21*a* touched by the hand (fingertip) of the user to any in-plane direction (360 degrees) of the contact surface (except the edge of the movable range).

The actuators 11 and 12 are installed in the housing 20 as actuators which can add force to the joystick type controller 21 along the direction where the operation of the joystick type controller 21 is permitted. The actuators 11 and 12 are provided on an X-axis and a Y-axis (see FIG. 4) which intersect perpendicularly. The actuators 11 and 12 are connected to the rod 24 via gears (not shown). The rotation force of the motors are changed to the linear motion along the axial directions (X-axis, Y-axis), and transmitted to the rod 24, so that the force is applied to the joystick type controller 21. The actuators 11 and 12 operate to apply the reaction force against the operation direction to the joystick type controller 21 in accordance with a driving signal from the main controller 100, and function as reaction force generation means of the present invention.

The joystick type controller 21, which is the controller of the operation input device 1, has a degree of freedom of a two-dimensional operation. Position sensors 13 and 14 are provided as operation input displacement detectors which detects a two-dimensional operation input displacement of the controller. The position sensors 13 and 14 in this embodiment are rotary encoders 23 and 24 connected to rotation shafts of the actuators 11 and 12, which are the actuators. An optical image sensor etc. also can be used as the operation input displacement detector. Position detecting signals detected by the position sensors 13 and 14 are fed back to the main controller 100.

Figure 4:
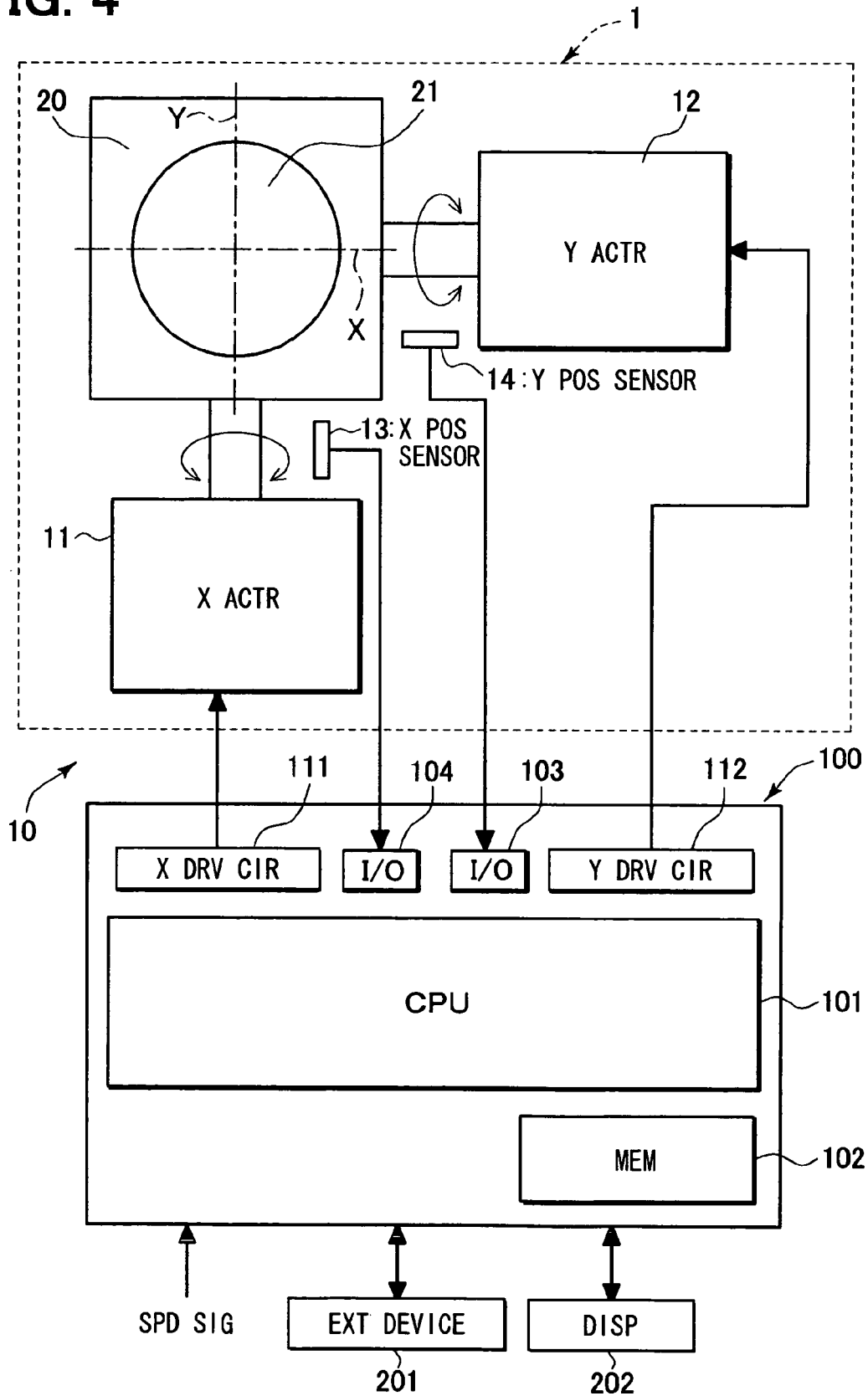
FIG. 4 is a block diagram showing an example of the input apparatus of the present invention.

FIG. 4 is a block diagram showing an example of the input apparatus for a vehicle of the present invention. An input apparatus 10 for a vehicle shown in FIG. 4 mainly includes a pointing device 1 disposed to the steering wheel 2 and the main controller 100 which receives input signals associated with the input operations (position indication operations and position input) from the pointing device 1. The main controller 100 is connected to a serial communication bus (not shown) which constitutes a network in the vehicle. The main controller 100 is connected to one or more external devices 201 to be operated by the input apparatus 10 and to the display 202 having a screen in front of the driver's seat. The main controller 100 is connected to the other ECUs, and can communicate with the ECUs (for example, the input of vehicle speed signals).

The main controller 100 includes a CPU 101, a storage (not shown) such as ROM and RAM, and a memory 102 composed of a hard disk drive and a nonvolatile memory. The CPU 101 is connected to an input-output sections (I/O in the drawing) 103 and 104 which receive signal input from the pointing device 1, and drive circuits (an X drive circuit and Y drive circuit in the drawing) 111 and 112 which output driving signals to the actuators 11 and 12. The ROM or memory 102 stores various programs performed by the CPU 101 and data required for the various programs. When CPU 101 performs these programs, the RAM is used as a working storage for the programs.

Fundamentally, when the joystick type controller 21 detects a direction of an operation by the joystick type controller 21 from a position detecting signal fed back from the position sensors 13 and 14, the main controller 100 drives the actuators 11 and 12 so that the reaction force is applied against the operation direction. That is, in accordance with the position detecting signals fed back from position sensors 13 and 14, the main controller 100 calculates a magnitude and direction of the reaction force to be applied to the joystick type controller 21. By outputting a drive instruction signal reflecting the calculation result to driving circuits 111 and 112, the main controller 100 drives the actuators (motor) 11 and 12.

The main controller 100 functions as selectable area setting means and reaction force control means. The main controller 100 sets selectable areas 43 for the position input discretely on the two-dimensional surface 40 (FIG. 5) having a predetermined operation range of the pointing device 1 (one or more selectable areas 43 are set discretely to different positions on the two-dimensional operation surface 40). The main controller 100 controls the reaction force of the actuators (reaction force applying means) 11 and 12 which apply the reaction force against the position indication operation by the pointing device 1. Specifically, control modes of the reaction force include an arbitrary mode in which the position indication operation toward the selectable areas 43 (43a to 43h) is arbitrarily possible in the operation range on the two-dimensional operation surface 40 and a discrete mode in which the position indication operation toward the selectable areas 43 (43a to 43h) is guided along unique paths 410 (410A to 410H) on the two-dimensional operation surface 40, the paths each being determined on each of the selectable areas 43 (43a to 43h). At least during the travel of the vehicle, the discrete mode is set (reaction force control means) (FIG. 6). The main controller 100 is connected to the other ECUs via the above-mentioned serial communication bus to acquire vehicle speed information (vehicle speed detection means). The main controller 100 in this embodiment acquires this vehicle speed information, and switches the two above-mentioned two modes.

Figure 5:
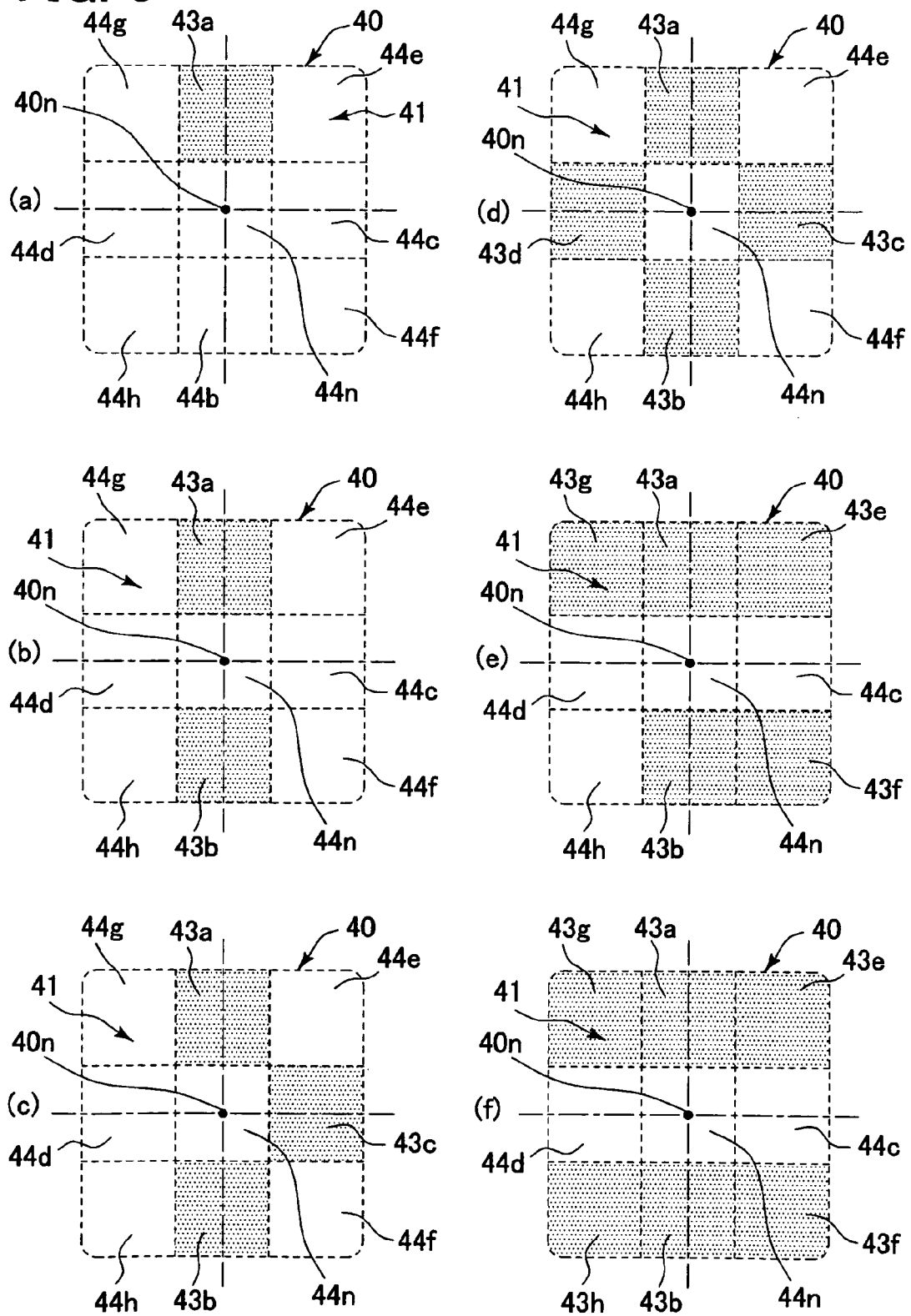
FIG. 5 simply shows a two-dimensional operation surface in an arbitrary mode.
Figure 6:
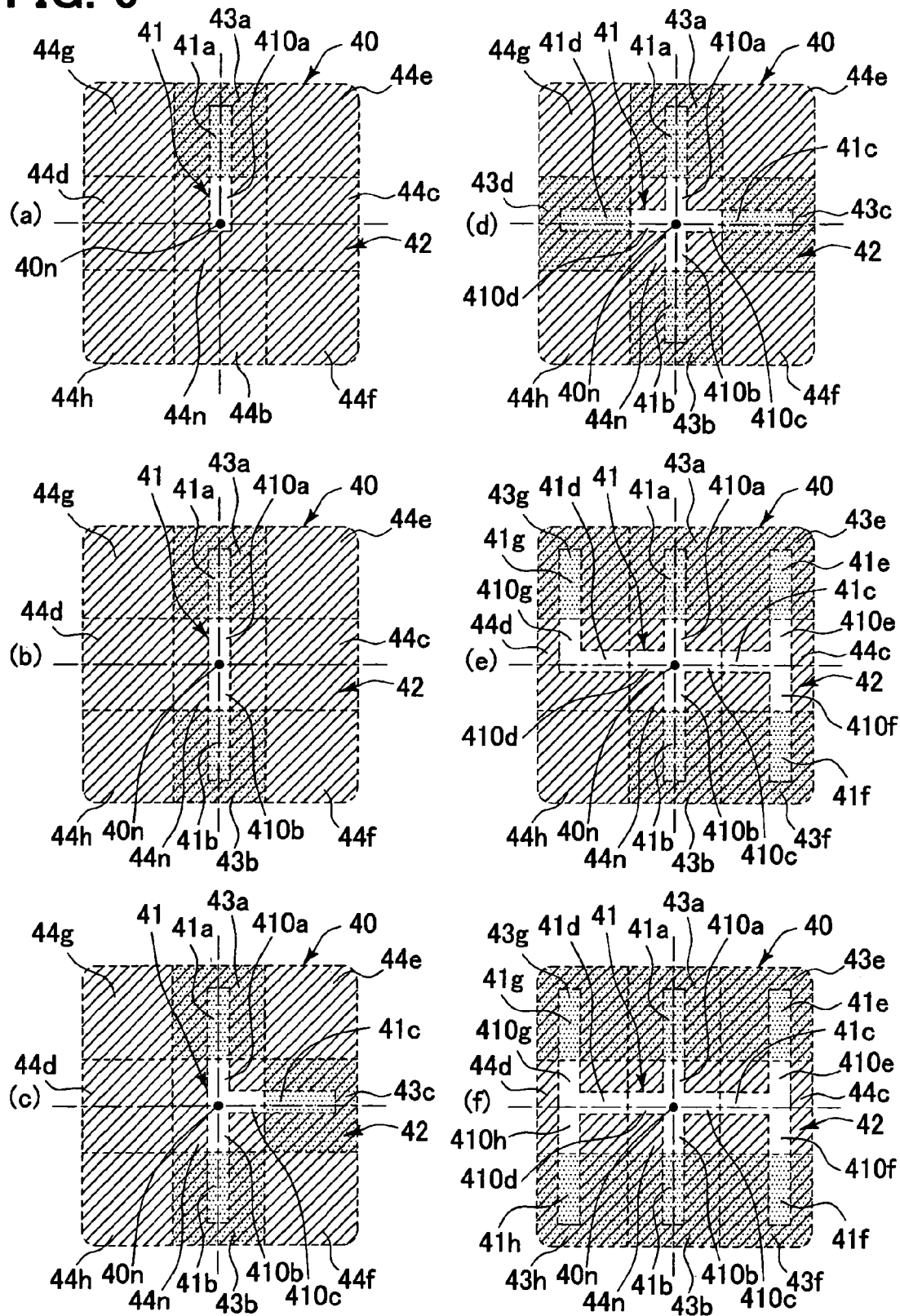
FIG. 6 simply shows a two-dimensional operation surface in a discrete mode.

FIGS. 5 and 6 simply show the operating range on the two-dimensional operation surface in the arbitrary mode and discrete mode. FIGS. 5 and 6 show the two-dimensional operation surface 40 having the operating range. The selectable areas 43 (43a to 43h) are set in respective predetermined positions in each two-dimensional operation surface 40 ((a) to (f) portions of FIG. 5, (a) to (f) portions of FIG. 6). Control contents are assigned to the selectable areas 43. The assigned control content is performed by the position input into the selectable areas 43.

In this embodiment, setting patterns which correspond arrangement positions (arrangement forms) of the selectable areas 43 (43a to 43h) to the control contents performed by the position input to the selectable areas 43 are stored in the memory 102 of the main controller 100 as setting pattern information. The main controller 100 sets the selectable areas 43 discretely on the two-dimensional operation surface 40 and assigns the corresponding control contents to the selectable areas 43 in accordance with the setting patterns.

The setting patterns include multiple patterns. Specifically, in the respective setting patterns, the arrangement forms of the selectable areas 43 (43a to 43h) in the two-dimensional operation surface 40 having the predetermined operation range are different from each other, different control contents are assigned to the selectable areas 43 having the same arrangement form, and different control contents assigned to the selectable areas 43 having different arrangement forms.

In each setting pattern, the arrangement form of the selectable areas 43 (43a to 43h) in the two-dimensional operation surface 40 having the predetermined operation range is determined as a unique arrangement form corresponding to the number of the selectable areas. In this embodiment, six arrangement forms as shown in FIG. 5 or 6 are defined. Accordingly, since the arrangement forms of selectable areas 43 are determined by the number, the user can memorize the arrangement forms easily. The arrangement forms of the selectable areas 43 shown in FIGS. 5 and 6 and the arrangement forms of the unique paths 410 (410A to 410H) mentioned later are set on the assumption that the operation input device 1 is disposed to the left side of the steering wheel 2. All the patterns are set such that operations to the right are prioritized. When the operation input device 1 is provided on the right side of the steering wheel 2, the arrangement forms of the selectable areas 43 shown in FIGS. 5 and 6 and the arrangement forms of the unique paths 410 (410A to 410H) mentioned later are changed symmetrically.

The selectable areas 43 are selected by the position indication operation by the operation input device 1, and a control content assigned to the selected one of the selectable areas 43 (43a-43h) is performed. The position input in this embodiment is entry operation from the non-selectable areas 44 to the selectable areas 43 or entry operation from a certain one of the selectable areas 43 to the other one of the selectable areas 43. That is, in the position indication operation by the operation input device 1, the position input is received when the indicated position is changed to the new selectable area 43.

In this embodiment, in the position indication operations from the non-selectable areas 44 to the selectable areas 43 or from the selectable areas 43 to the non-selectable areas 44, the reaction force is controlled so that the entry and exit into and from the selectable areas 43 can be recognized by tactile sensation. Specifically, to acquire a sense of a click in the entry and exit into and from the selectable areas 43, the main controller 100 controls reaction force so that the greater reaction force (tactile operation reaction level) than the normal reaction force (normal reaction force level) in the selectable areas 43 and non-selectable areas 44 is applied on boundaries between the selectable areas 43 and non-selectable areas 44. The operation tactility (sense of a click) is produced on boundaries between the selectable areas 43 or boundaries between the adjoining selectable areas 43.

The arbitrary mode and discrete mode (guide input mode) are explained below. FIG. 5 simply shows the two-dimensional operation surface 40 having the predetermined operation range in the arbitrary mode. The arbitrary mode is performed when the vehicle speed is under a vehicle speed threshold (vehicle speed level) such as when the vehicle is not traveling and when the vehicle travels slowly. Except that predetermined reaction force of returning the position indication operation to a neutral position 40n as the indicated position moves away from the neutral position 40n, reaction force restricting the position indication operations toward the selectable areas 43 by the operation input device 1 is not applied.

FIG. 6 simply shows the two-dimensional operation surface 40 having the prescribed operation range in the discrete mode (guide input mode). The discrete mode is performed when the vehicle speed exceeds the above-mentioned vehicle speed threshold (vehicle speed level), and two kinds of areas, operation restriction areas 42 and operation permission areas 41, are set on the operating range 40. Specifically, in each setting pattern, the reaction force is controlled such that the position indication operation toward the selectable areas 43 by the operation input device 1 is guided along the unique paths 410 (410A to 410H) on the two-dimensional operation surface, the paths each being defined on each of the selectable areas 43. The unique paths 40 are on the operation permission areas 41, and the other areas are on the operation restriction areas 42.

In this embodiment, as long as there is no change of a setting pattern, the selectable areas 43 are not changed when switching between the discrete mode and arbitrary mode. Accordingly, the mode switching can be simple. In the discrete mode, the position indication operation is performed only on the operation permission areas 41 although the selectable areas 43 (43a to 43h) are set extending to the operation restriction areas 42. Therefore, the selectable areas 43 in the discrete mode may exist within the operation permission areas 41 substantially. In the present invention, the setting of the selectable areas 43 in the discrete mode may be such that at least only the operation permission areas 41 (41a to 41h) may be set on the selectable areas 43 and the selectable areas 43 does not always need to be set extending to the operation restriction areas 42 like in this embodiment.

When the position indication operation for the entry from the operation permission areas 41 to the operation restriction areas 42 is performed, reaction force of an operation prevention level which is greater than the normal level and at which the operation input device 1 does not move even when the device 1 is strongly operated in the direction from the operation permission areas 41 to the operation restriction areas 42 is applied to the device 1, preventing the entry. That is, the position indication operation by the operation input device 1 in the operation restriction areas 42 is forbidden. On the other hand, on the operation permission areas 41, as the position indication operation moves away from the neutral position 40n, reaction force predetermined to return the operation to the neutral position 40n is applied. At this time, the same reaction force of the normal level as in the arbitrary mode is applied, and the operation is not limited particularly.

Figure 7:
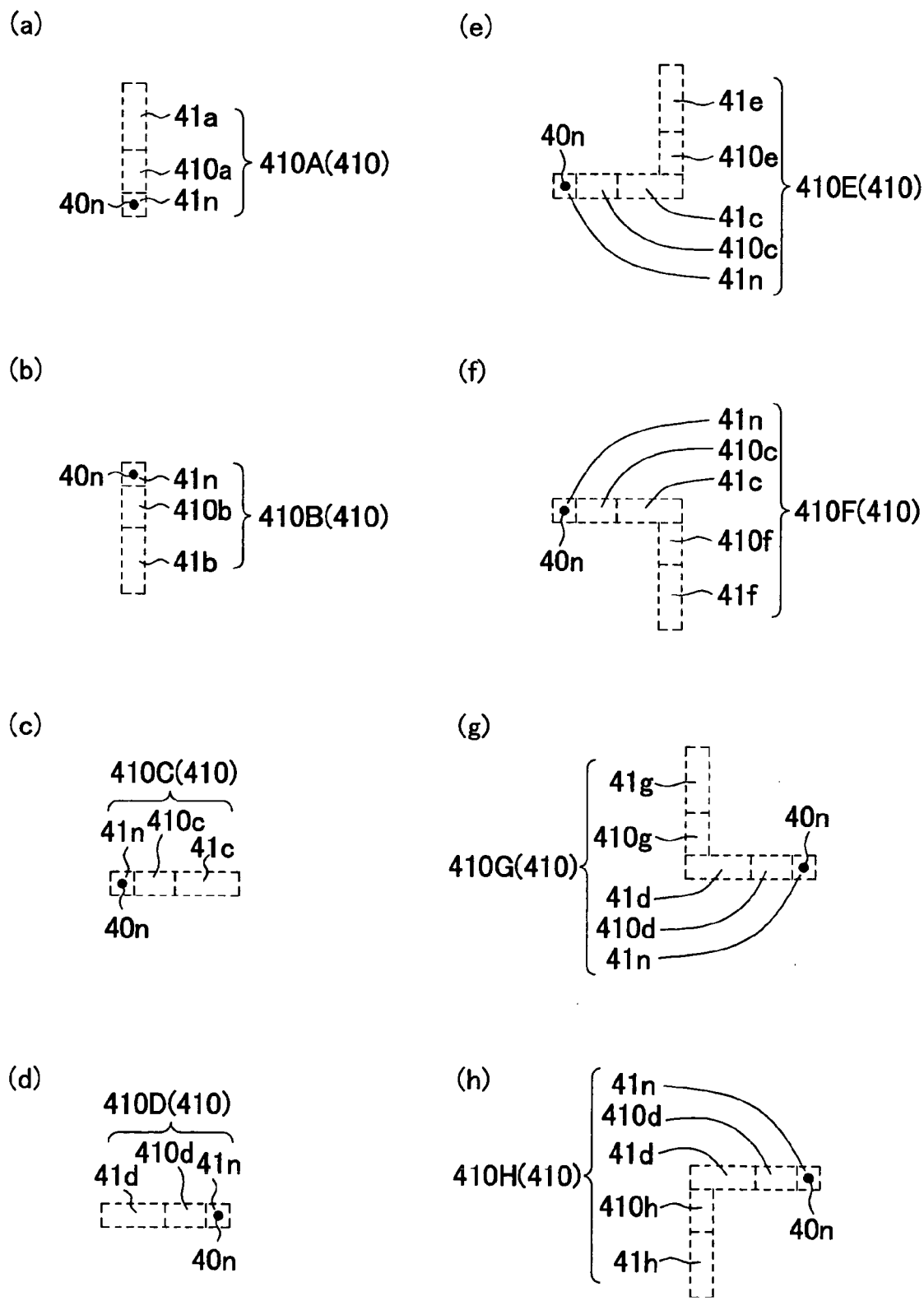
FIG. 7 shows unique paths in this embodiment.

The unique paths 410 in this embodiment are as shown in (a) to (h) portions of FIG. 7. A unique path 410A toward the selectable area 43a is composed of a neutral area 41n including a neutral position 40n and a path 410a. A unique path 410B toward the selectable area 43b is composed of the neutral area 41n and a path 410b. A unique path 410C toward the selectable area 43c is composed of the neutral area 41n and a path 410c. A unique path 410D toward the selectable area 43d is composed of the neutral area 41n and a path 410d. A unique path 410E toward the selectable area 43e is composed of the neutral area 41n and paths 410c, 41c, and 410e. A unique path 410F toward the selectable area 43f is composed of the neutral area 41n and paths 410c, 41c, and 410f. A unique path 410G toward the selectable area 43g is composed of the neutral area 41n and paths 410d, 41d, and 410g. A unique path 410H toward the selectable area 43h is composed of the neutral area 41n and paths 410d, 41d, and 410h.

The above two control modes are changed in accordance with the vehicle speed. In this embodiment, only the setting of the reaction force control to set the operation restriction areas 42 is changed in accordance with the change of the vehicle speed, but the setting patterns are not changed. However, in accordance with the change of the vehicle speed, the setting patterns may be changed while changing the control modes. In this embodiment, various external devices 201 to be operated by the operation input device 1 are connected to the main controller 100. For example, the devices include a "car navigation device," "car air-conditioner," "car audio," etc. Additionally, the devices include a "front camera," "rear camera," "head-up display (HUB)," "side camera," "parking support function," "night view support function," and the "rear-lateral warning function," as "view support functions." Further, the devices include a "sheet/steering position change function," "mirror position change function," "drive control function," etc. The devices include electronic devices having functions except the above functions. The display 202 is connected to the main controller 100. The display 202 functions as operation content display means for visually displaying correspondence between the arrangement positions of the selectable areas 43 and control contents corresponding to the selectable areas 43 and as display content change means for, in accordance with change of the setting patterns by the main controller 100, changing the displayed contents into the corresponding contents.

Figure 8:
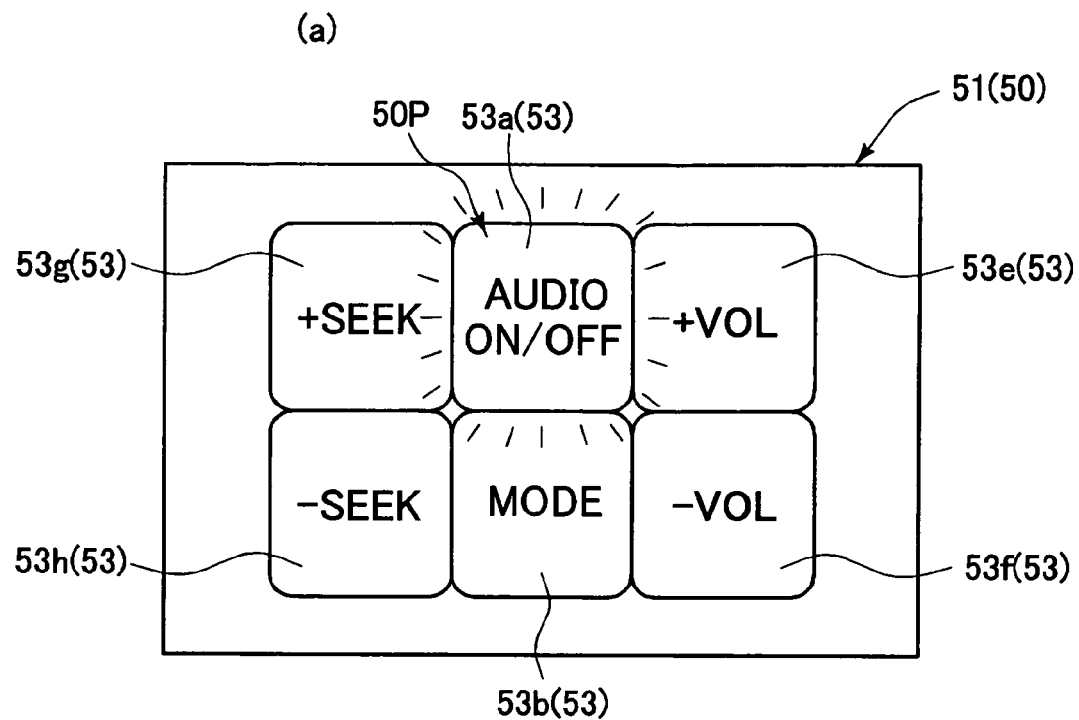
FIG. 8 shows examples of screen displays of a display in the arbitrary mode and discrete mode.
Figure 8:
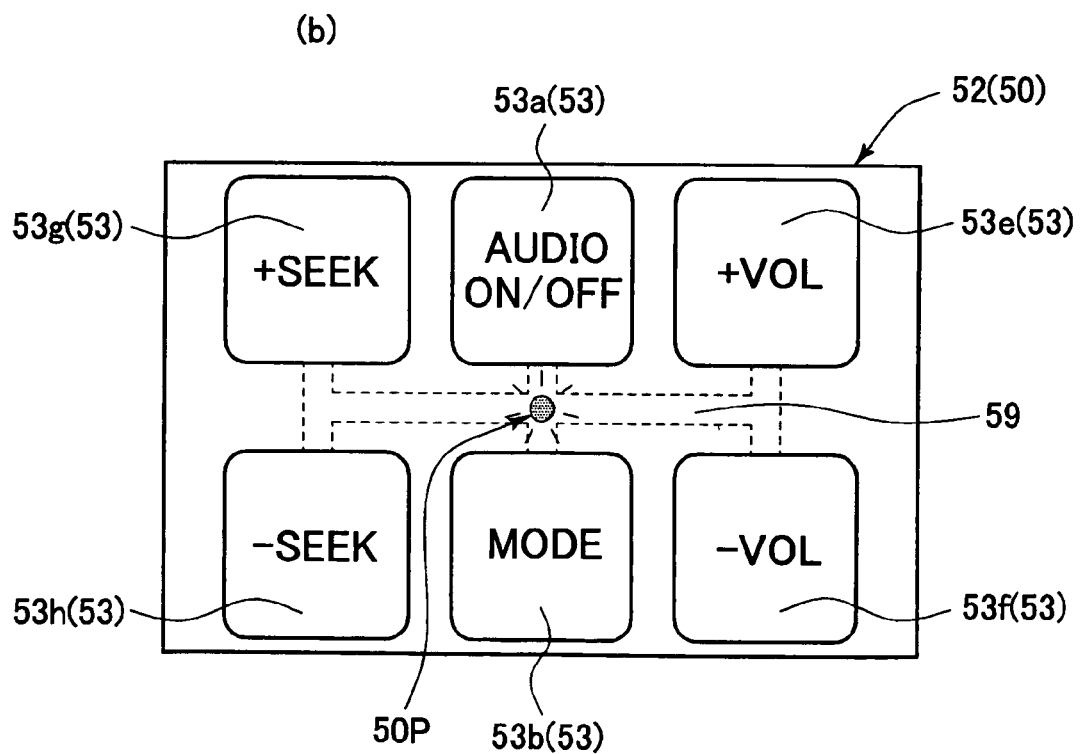

The (a) and (b) portions of FIG. 8 simply show the display screen 50. A screen 51 (50) shows a pointer selection screen showing display contents in the arbitrary mode. A screen 52 (50) shows a pointer selection screen showing display contents in the discrete mode. On positions 53 (53a, 53b, 53e, 53f, 53g, and 53h) corresponding to the selectable areas 43 on the screens 50 (51, 52) of FIG. 8, characters of control contents of the corresponding selectable areas 43 are shown. In the discrete mode, a graphic of a unique path corresponding portion 59 directed to the arrangement positions 53 is displayed corresponding to the actually set unique paths 410 together with the characters of the control contents in the arrangement positions 53 corresponding to the selectable areas 43. On the other hand, in arbitrary mode, an area where the unique paths 410 are displayed in the discrete mode is omitted, and only the positional relationship among the selectable areas 43 and their control contents are simply displayed.

The control contents of the selectable areas 43 displayed on the display 202 can be shown as images, as shown in FIG. 8. In this embodiment, images 53 (53a to 53h) shows the characters of the control contents corresponding to the selectable areas 43. In this case, the position indication operation is performed by the operation input device 1, and when the position of the selectable area 43 is indicated, an image of the indicated position is highlighted, and displayed differently from the other images. Accordingly, a position indicated by the operation input device 1 can be grasped visually. In this embodiment, an area whose position is indicated is highlighted lighter than before. In addition to the above highlighting, other highlighting such as inversion of characters and their background color may be performed.

Figure 15:
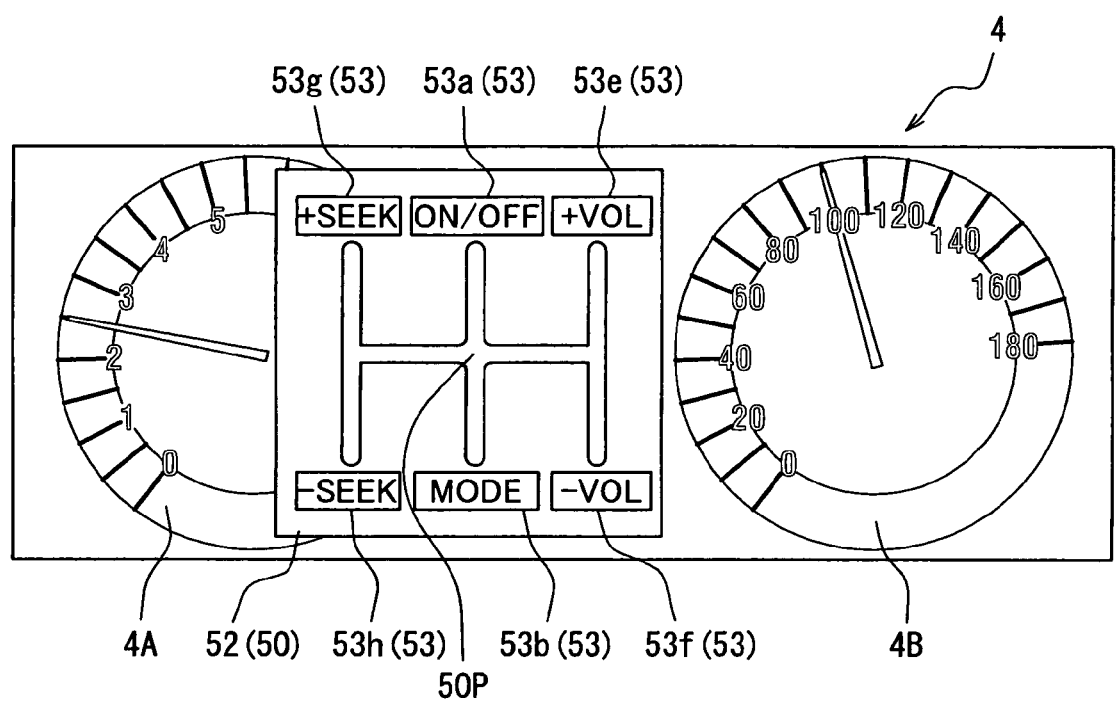
FIG. 15 is an example of a screen by a meter display.

The display 202 in this embodiment is structured in FIG. 1 as a meter display device including a display portion 4 is provided on the back of the steering wheel 2 in front of the driver's seat. As shown in FIG. 15, the above-mentioned display screen 50 (screens 51 and 52) is displayed on an area between a tachometer 4A and a speedometer 4B. An indicated position (pointer) 50P on the screen 52 in FIG. 15 is lighted on the unique path corresponding portion 59.

The display 202 in this embodiment is composed of a well-known color liquid crystal display including a dot-matrix LCD (liquid crystal display) and a driver circuit (not shown) for controlling the displaying of the LCD. For example, a driver circuit uses an active matrix driving method in which a transistor is attached to each pixel to light a target pixel certainly and performs displaying in accordance with display instructions and display screen data sent from the main controller 100. The display 202 may use also an organic EL (electroluminescence) display and a plasma display.

In the input apparatus 10 of this embodiment, when the position input is performed in the selectable area 43 by the operation input device 1, the main controller 100 performs a control content corresponding to the selectable area 43.

Figure 9:
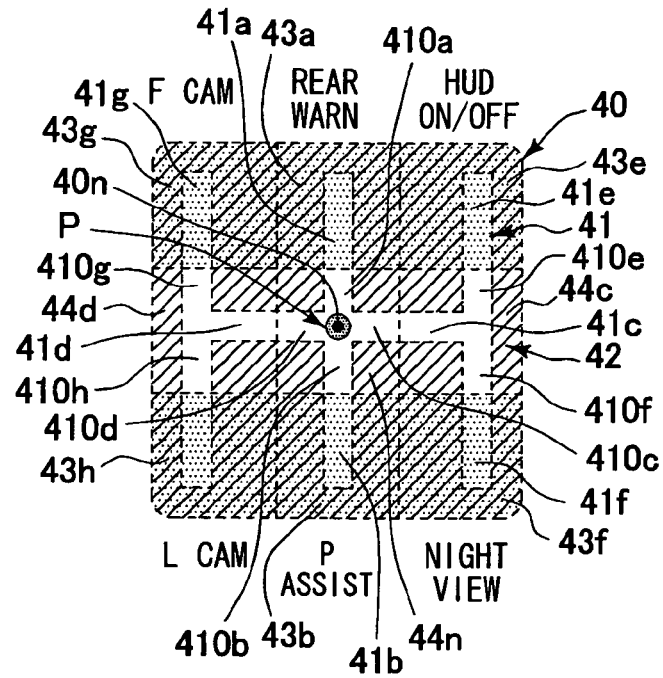
FIG. 9 explains setting patterns for control indications.
Figure 9:
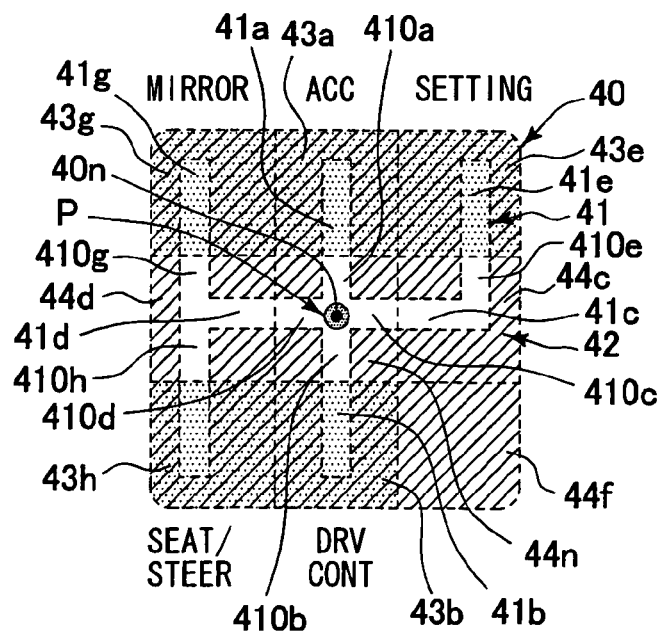

In all setting patterns in this embodiment, control contents assigned to the selectable areas 43 are related to each other. Specifically, in a setting pattern for control indications, only contents of control indications related to the same device 201 or same device function are collected and assigned to the selectable areas 43. Specifically, the setting patterns for control indications include: a setting pattern in which only "view support functions" such as a "front camera," "rear camera," "head-up display (HUB)," "side camera," "parking support function," "night view assist function," and a "rear-lateral warning function" are assigned to the selectable areas 43a, 43b, 43e, 43f, 43g, and 43h as shown (a) portion of FIG. 9; and a setting pattern in which only control contents related to various vehicle functions are assigned to the selectable areas 43a, 43b, 43e, 43g, and 43h as shown in (b) portion of FIG. 9. FIG. 9 shows a display in the discrete mode.

The same display is performed also in the arbitrary mode.

The setting patterns include a setting pattern changing pattern in which a control content of change to another setting pattern is assigned to each of the selectable areas 43. In this case, a setting pattern to be selected corresponds to each of the selectable areas 43. In accordance with the position input to the selectable areas 43, the change to the setting pattern corresponding to the selectable area 43 which has received the position input is performed, and a change instruction is outputted to change the displayed content on the display 202 into the corresponding content.

When fixed operation force continues to be applied to indicate the position of the selectable area 43 for changing setting pattern just after the position input, the position indicated by the operation input device 1 continues to be in the same position as the selectable area 43. When the selectable area 43 is changed into the non-selectable area 42 in changing setting patterns, the reaction force of the operation prevention level toward the neutral position 40n is applied immediately, and the position indication by the operation input device 1 is forcibly returned at least to the operation permission area 41. When the operation force is not applied, the position indication is automatically returned to the neutral position 40n.

A structure of the setting pattern for switching the setting patterns in this embodiment includes a lower hierarchy setting pattern (for control indications) in which control indication contents of the same external device 201 or the same functions of the external device 201 are assigned to the selectable areas 43 and a control indication content corresponding to the position input is performed, and an upper hierarchy setting pattern (for changing setting patterns) in which lower hierarchy setting patterns of different external devices 201 or device functions are assigned to the selectable areas 43 to change setting patterns. That is, the changing form of the hierarchical pattern selection is such that a device or function to be used is selected in the upper setting pattern and a concrete content used in the device or function is selected in the lower setting pattern.

Figure 10:
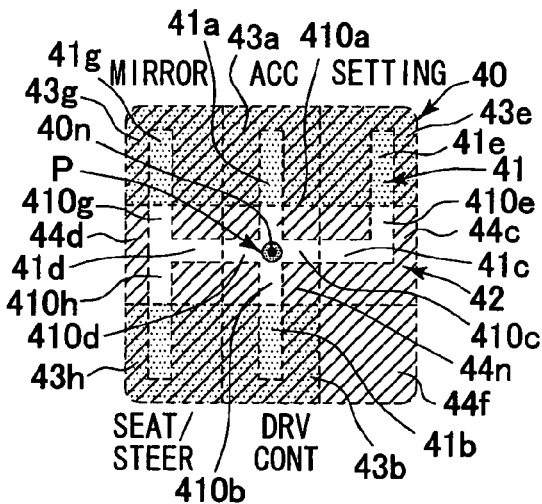
FIG. 10 explains movements between hierarchies of the setting patterns.
Figure 10:
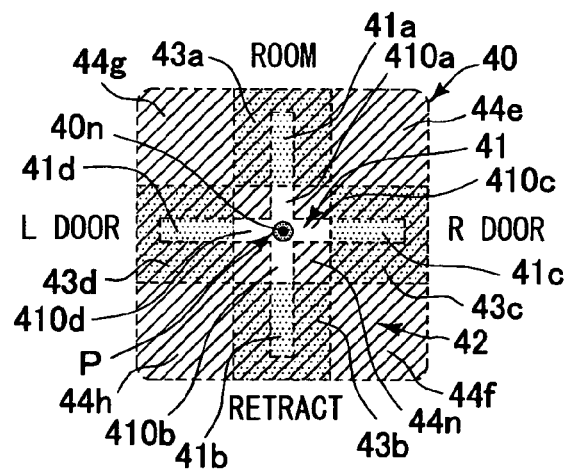
Figure 10:
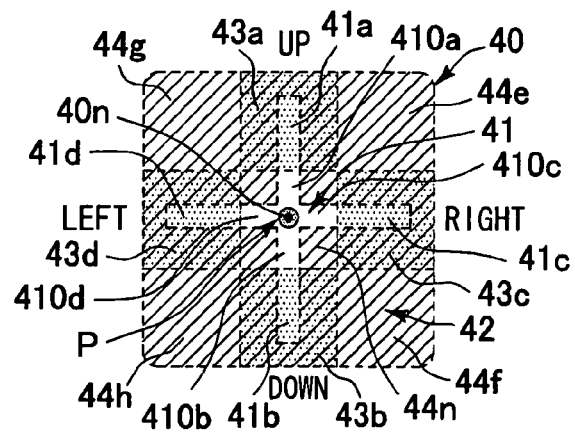

The concrete example is shown in FIG. 10. The (a) portion of FIG. 10 shows the upper hierarchy setting pattern for selecting the external device 201 or its device function. When the "mirror position change function" is selected by the position input in the upper setting pattern, the lower hierarchy setting pattern is selected. This lower hierarchy setting pattern is such that control contents related to the device or device function selected on the higher hierarchy are collected. In this embodiment, as shown in (b) portion of FIG. 10, the lower hierarchy setting pattern includes control contents related to the "mirror position change function" and specifically includes control contents for selecting which mirror is changed. When a mirror to be changed is selected in this setting pattern by the position input, a further lower hierarchy setting pattern is selected. This lower hierarchy setting pattern is such that control contents related to the device or device function selected in the upper hierarchy are collected. In this embodiment, as shown in (c) portion of FIG. 10, the further lower hierarchy setting pattern includes control contents related to the mirror selected in (b) portion of FIG. 10 and includes control indication contents for determining whether the mirror is tilted in the upward, downward, left, or right direction. That is, in the setting pattern of (c) portion of FIG. 10, even when the position input is performed in the selectable areas 43, the setting pattern is not changed. Instead, a control indication content of the selectable area 43 which has received the position indication is performed. An angle of the mirror is changed by a predetermined angle in response to one selection (position input). Although FIG. 10 is shown in the discrete mode, it is natural that the above-mentioned procedure is applied also in the arbitrary mode.

Figure 21:
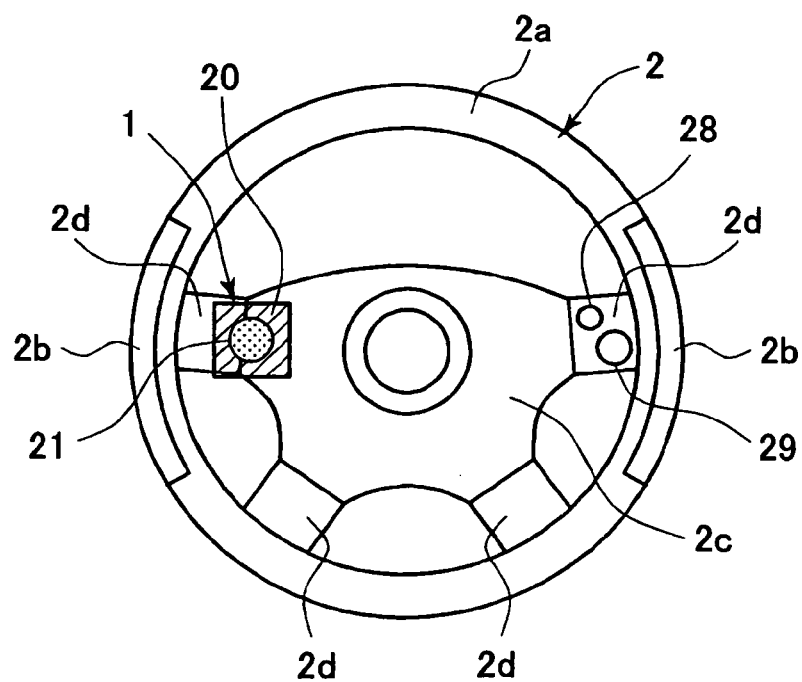
FIG. 21 shows external views showing a second example of a steering wheel mounting the operation input device of the present invention.
Figure 22:
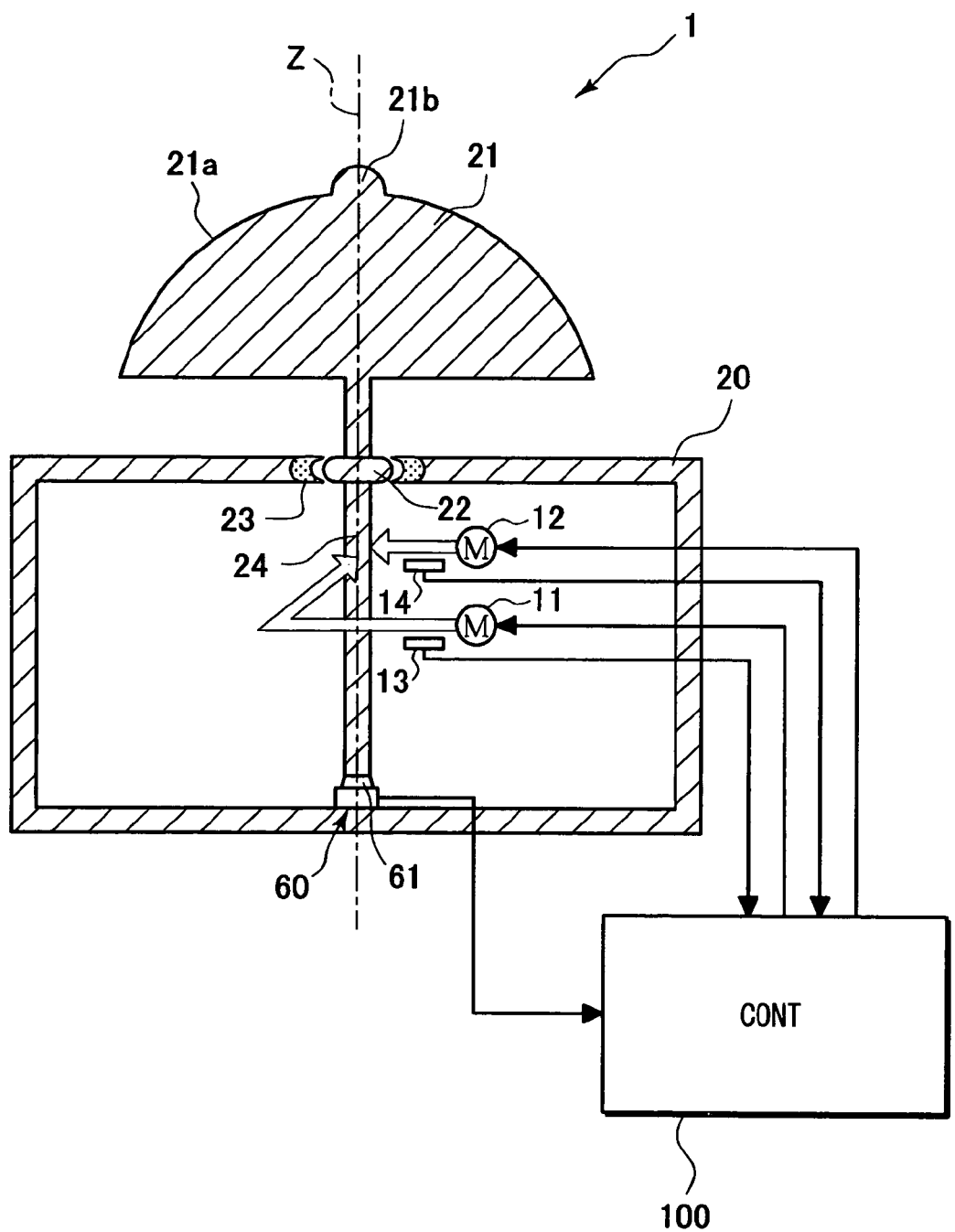
FIG. 22 is a sectional view showing an overview of a structure of the operation input device in a different embodiment from that in FIG. 3.

In this case, it is preferable to provide a hierarchy return controller for returning from the lower hierarchy to the upper hierarchy. For example, the selectable area 43 to which a control content of a return to the upper hierarchy is assigned is provided (the corresponding unique path also is provided in the discrete mode), and the position input to this selectable area 43 functions as the hierarchy return operation. In the operation input device 1, the hierarchy return operation can be performed by an operation in a different direction from the directional operation (position indication operation) by the joystick type controller 21. For example, as shown in FIG. 22, a function as a pressing operation portion (a tact switch 60 functions as a pressing operation portion) is provided on the joystick type controller 21 and the hierarchy return operation may be performed by the pressing operation. The hierarchy return controller may be provided as a controller 28 different from the operation input device 1. For example, as shown in FIG. 21, the controller 28 can be provided in a position in which the controller 28 is operable by another hand gripping the steering wheel 2 particularly by its thumb in the opposite side to the operation input device 1 of the steering wheel 2.

In some setting patterns, control contents assigned to the selectable areas 43 includes a content for restricting the selectable areas 43 except the predetermined selectable area 43 in accordance with the position input to the predetermined selectable area 43. That is, when the position input is performed in the specific selectable area 43, a position input restriction area where the position input is restricted exists in the selectable areas 43. In this embodiment, in the discrete mode, to restrict the position input to the position indication restricting area 43, the restriction is performed such that at least part of the unique path 410 of the position indication restricting area 43 is changed from the operation permission area 41 to the operation restriction area 42. The change from the operation permission area 41 to the operation restriction area 42 is not performed on the unique paths 410 of the selectable area 43 where the position input is not restricted.

Figure 11:
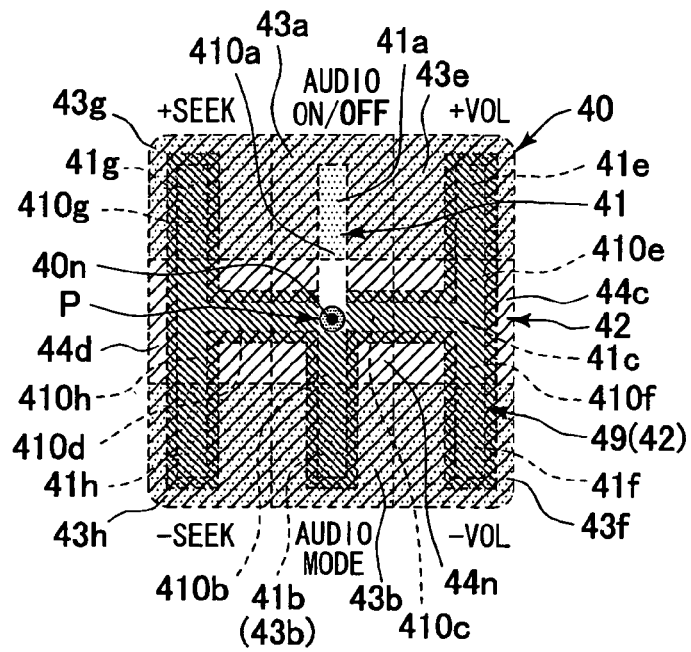
FIG. 11 explains setting patterns in which operation restrictions are performed in accordance with position input.
Figure 11:
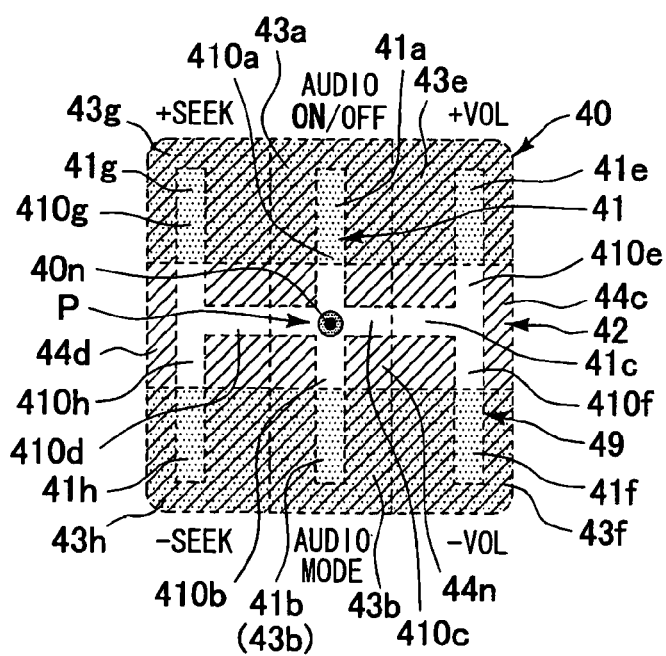

Specifically, in a setting pattern for audio operation in which an audio operation screen shown in FIG. 11 is displayed, when the audio is turned OFF, the pointer P can be moved from the neutral area 41n to only the selectable area 43a having a control indication content of turning the audio ON/OFF as shown in (a) portion of FIG. 11. That is, all the unique paths 410 except the unique path 410A are changed to the operation restriction areas 42. On the other hand, as shown in (b) portion of FIG. 11, when the position input is performed to turn the audio ON, motions of the pointer P along all the unique paths 410 toward the selectable areas 43a, 43b, 43e, 43f, and 43g are made possible.

A numeral 49 in (a) portion of FIG. 11 is a portion visually and easily showing an area applied with the reaction force of the operation prevention level at which the position input by the operation input device 1 is impossible when the audio is turned from ON to OFF in the discrete mode. The area is actually applied with the same reaction force as in the operation restriction area 42. That is, in (a) portion of FIG. 11, the area 49 includes operation permission areas 41n, 41b, 410b, 41c, 410c, 41d, 410d, 41e, 410e, 41f, 410f, 41g, 410g, 41 h, and 410h in the ON state of the audio, and these areas are changed to the operation restriction areas 42 in the discrete mode.

Figure 23:
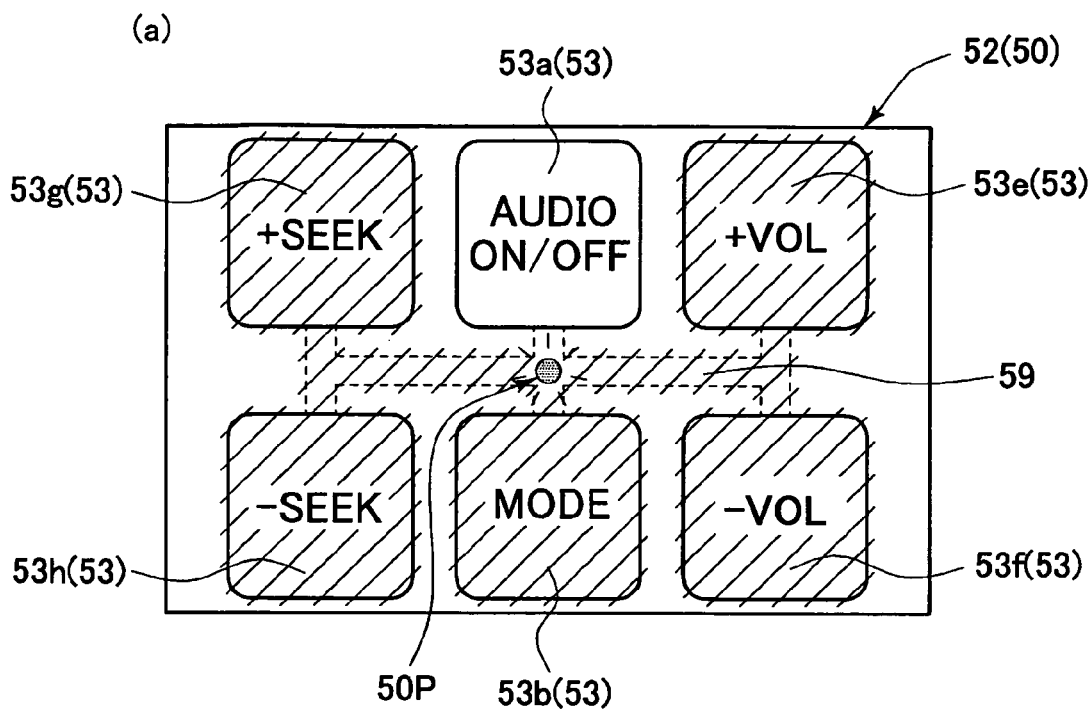
FIG. 23 explains another case where an operation restriction is performed in accordance with the position input.
Figure 23:
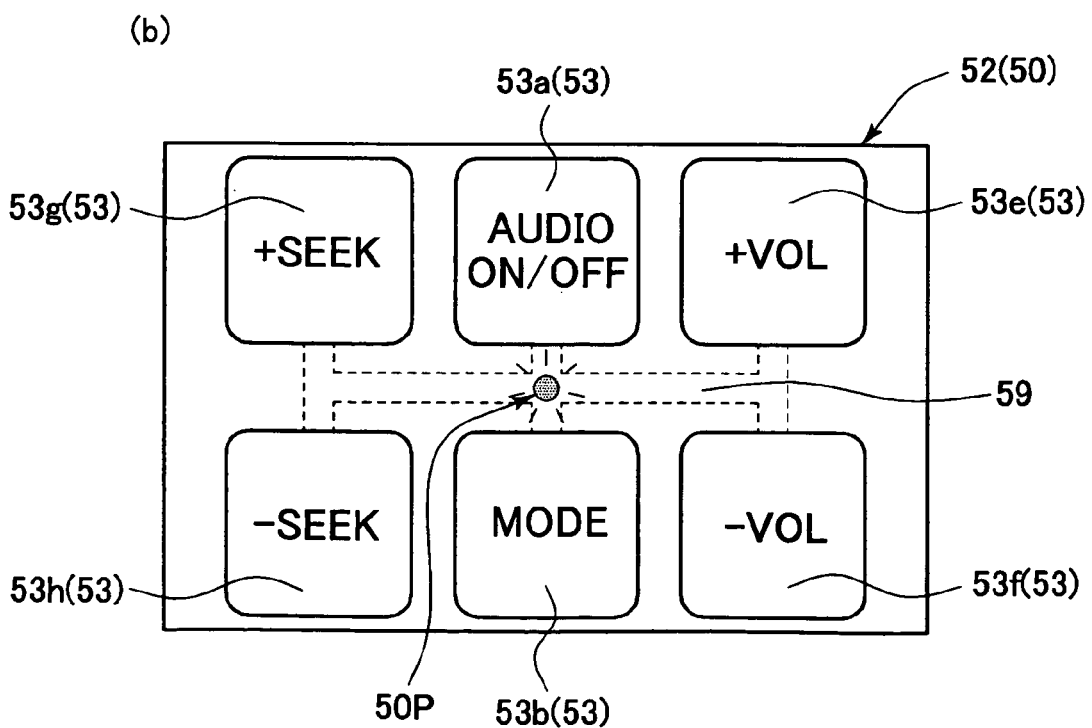

However, the operation restriction target area 49 is displayed on the display 202 so as to recognize that the change from part of the operation permission areas 41 to the operation restriction areas 42 is temporary in the discrete mode (see FIG. 23). In (a) portion of FIG. 11, in part of the area 49 in which the reaction force may change in the discrete mode, the operation permission areas 41n, 41b, 410b, 41c, 410c, 41d, 410d, 41e, 410e, 41f, 410f, 41g, 410e, 41h, and 410h before the change can be recognized visually even after the change to the operation restriction area 42.

In (b) portion of FIG. 11, the operation restriction target area 49, which is the operation permission area 41, is displayed in the same way as the other operation permission areas 41 ((b) portion of FIG. 23). When the operation restriction target area 49 is changed to the operation restriction area 42 as shown in (a) portion of FIG. 11, the operation restriction target area 49 is displayed in a different way from that of the operation permission areas 41 before the change and in a different way from that of the other operation restriction areas 42 ((a) portion of FIG. 23). Accordingly, when the area 49 is changed to the operation restriction area, the user can easily recognize that the change is temporary. In (a) portion of FIG. 11, the operation restriction target area 49 is changed to the operation restriction area 42 together with part of the operation restriction areas 42 around the operation restriction target area 49 in a different way from those of the operation permission areas 41 and the other operation restriction areas 42 before the change ((a) portion of FIG. 23). The temporary change is further highlighted.

In the above-mentioned embodiment, to restrict the position input to the position input restriction areas 43, the main controller 100 may change the selectable area 43, which becomes the position input restriction area, to the non-selectable area 44.

The memory 102 of the main controller 100 stores various programs. Specifically, the memory 102 stores: a setting pattern change program for performing the change of the setting patterns; a reaction force generation program for setting the control mode of the reaction force and generating the reaction force in the joystick type controller 21 in accordance with the set control mode; and a position input reception program which receives the position input on the selectable areas 43. These programs are performed by CPU 101 and function as selectable area setting means (setting pattern change program) of the present invention and reaction force control means (reaction force generation program).

The memory 102 stores setting pattern information, selection permission area arrangement information, and reaction force information as data used for performing the above-mentioned programs. The setting pattern information includes multiple setting patterns in which the arrangement forms (see FIGS. 5 and 6) of the selectable areas 43 correspond to the control contents assigned to the selectable areas 43 in the arrangement forms. The selection permission area arrangement information includes coordinate data for specifying the operation permission areas 41 and operation restriction areas 42 defined on the two-dimensional operation surface of the joystick type controller 21 in the discrete mode, and in this embodiment, includes coordinate data for specifying the operation restriction target area 49. The reaction force information includes information for specifying reaction force setting values of the various areas (such as the operation permission areas 41 and operation restriction areas 42) defined on the two-dimensional operation surface 40 of the joystick type controller 21.

Figure 12:
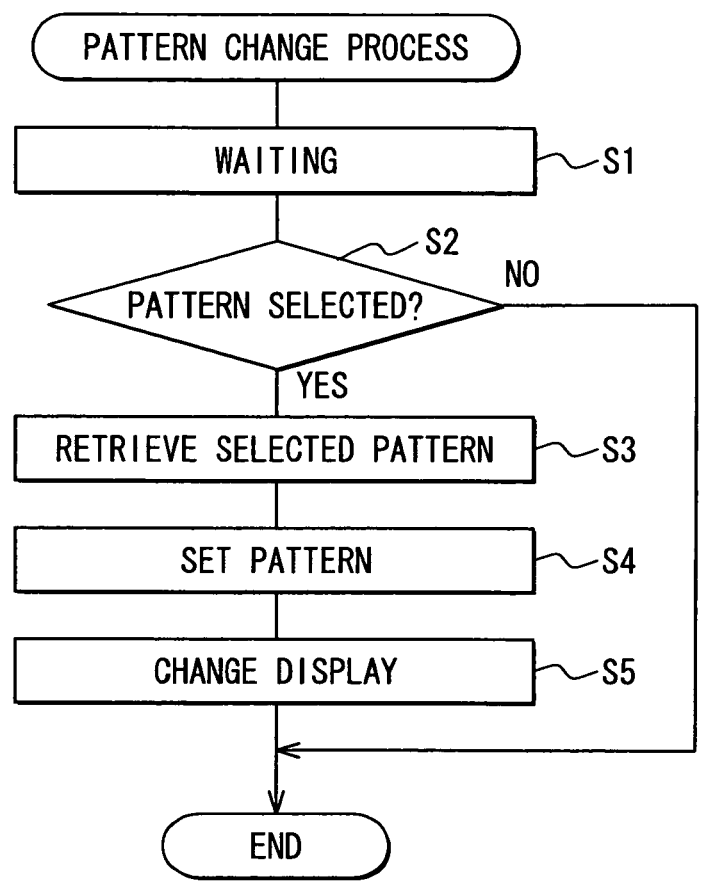
FIG. 12 is a flowchart showing a flow of a process of a setting pattern change program.

A process of the setting pattern change program is explained using the flowchart of FIG. 12. First, S1 is in a waiting state for an identification of a setting pattern. When there is no identification of a setting pattern to be set in S2, the program ends. When a setting pattern to be set is identified, the program proceeds to S3. Then, data (setting pattern information) about the identified setting pattern is retrieved from the memory 102, and the setting pattern is set in S4. Specifically, in S4, in accordance with the setting pattern information retrieved in S3, the arrangement form of the selectable areas 43 of the setting pattern is identified. In accordance with the specified arrangement form, the selectable areas 43 are set on the two-dimensional operation surface 40 of the joystick type controller 21. In accordance with the retrieved setting pattern information, the corresponding control contents are assigned to the set selectable areas 43. In S5, a display changing instruction signal is outputted to the display 202 so that the display 202 performs a display corresponding to the setting pattern set in S4, and this program ends. This program is repeated periodically.

Figure 13:
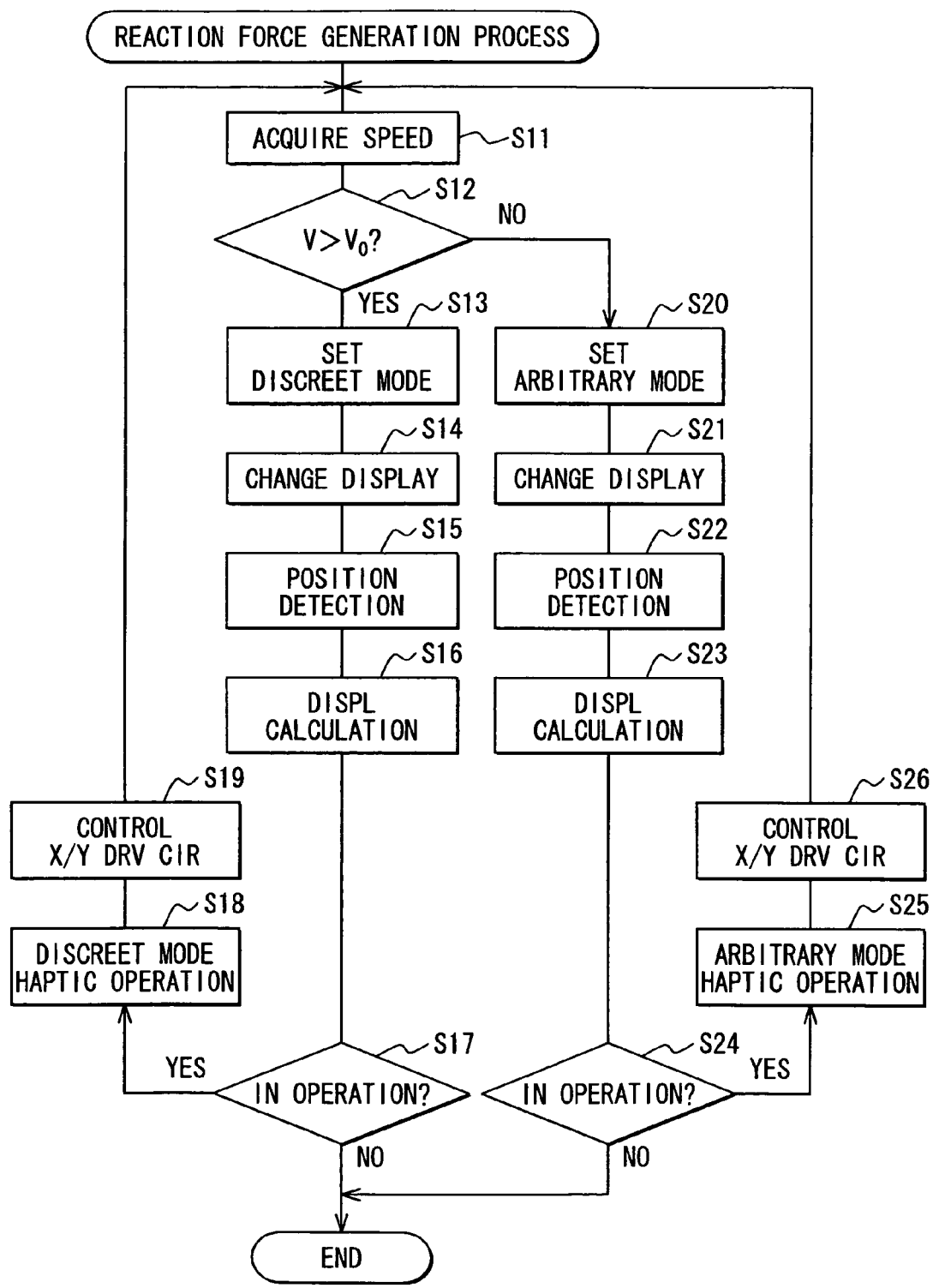
FIG. 13 is a flowchart showing a flow of a process of a reaction force generation program.

Next, a process of the reaction force generating program is explained using the flowchart of FIG. 13. First, a vehicle speed V of the present vehicle is acquired in S11. Specifically, a detection value of the speed sensor is acquired from the other ECUs. In S12, it is determined whether the acquired vehicle speed value V exceeds a vehicle speed threshold V0 (vehicle speed level: for example, 5 km/h). When the acquired vehicle speed value V exceeds the vehicle speed threshold V0, the process goes to S13 to set the discrete mode. On the other hand, when the acquired vehicle speed value V does not exceed the vehicle speed threshold V0, the process goes to S20 to set the arbitrary mode.

When the discrete mode is set in S13, the arrangement form (see FIG. 6) of the selectable areas 43 corresponding to the current setting mode is identified from the memory 102. Then, the selection permission area arrangement information is retrieved, and the selection permission areas 41 (unique paths 410) in the discrete mode is specified corresponding to the specified arrangement form of the selectable areas 43.

In S14, a display change instruction signal is outputted to the display 202 so that displaying is performed corresponding to the discrete mode. Also in the last display, when the displaying of the discrete mode is performed, the last displayed contents continue to be displayed without change of the display.

In S15, an indicated position on the two-dimensional operation surface 40 by the joystick type controller 21, which is the operation knob, is detected, and the detected indicated position is stored in the predetermined storage area of the memory 102. In S16, the displacement of the indicated position is calculated by calculating the difference between the detected indicated position and the last indicated position. At the first time, a difference from the neutral position 40n is calculated. In S17, it is determined whether the indicated position moves. This program ends when it is determined that the indicated position does not move. This program is repeated periodically. When it is determined that the position indication has moved in S17, the flow goes to S18.

In S18 and S19, reaction force in response to the position indication and the operation direction is applied to the joystick type controller 21. Specifically, at first, boundaries between the selection permission areas 41 set in S13 and selection restriction areas 42, which are the rest of the areas 41, are specified (S18). When the indicated position is displaced from the operation permission area 41 to the operation permission area 41 in response to the position indication operation by the joystick type controller 21, the CPU 101 calculates a drive instruction content outputted to the X drive circuit 111 and Y drive circuit 112 so that the reaction force of the normal level is applied oppositely to the operation direction (S1B). On the other hand, when the indicated position is displaced from the operation permission area 41 to the operation restriction area 42 in response to the position indication operation by the joystick type controller 21, the CPU 101 calculates a drive instruction content outputted to the X drive circuit 111 and Y drive circuit 112 so that the reaction force of the operation prevention level greater than the normal level is applied oppositely to the operation direction to prevent the position indication operation (S18). The reaction force information is retrieved from the memory 102, and a magnitude of each reaction force is set in accordance with the information. The CPU 101 outputs a drive instruction signal reflecting the calculated drive instruction content to the X drive circuit 111 and Y drive circuit 112 to control the drive of the actuators 11 and 12 (S19).

When the actuators 11 and 12 are driven, the process returns to S11.

In this embodiment, the position input is performed by movement of an indicated position from the non-selectable area 44 to the selectable area 43 by the operation input device 1. The CPU 101 calculates a drive instruction content outputted to the X drive circuit 111 and Y drive circuit 112 so that the reaction force of a tactile reaction force level greater than the normal reaction force level is applied oppositely to the operation direction on the boundary between the selectable area 43 and the non-selectable area 44 to obtain feeling of a click at the entry from the non-selectable area 44 to the selectable area 43 and at the exit from the selectable area 43 to the non-selectable area 44 on the operation permission area 41, and at the entry and exit from a certain selectable area 43 to another selectable area 43 on operation permission area 41 (S18). The reaction force information is retrieved from the memory 102, and a magnitude of the reaction force of the tactile reaction force level is set in accordance with the retrieved information.

When the arbitrary mode is set in S20, the arrangement form (see FIG. 5) of the selectable areas 43 corresponding to the current setting mode is identified from the memory 102. In the arbitrary mode, the whole surface of the two-dimensional operation surface 40 is selectable by the joystick type controller 21 as the selection permission areas 41.

In S21, a display change instruction signal is outputted to the display 202 so that displaying is performed corresponding to the arbitrary mode. When the display of the arbitrary mode is performed in the last display, the last content of the display continues to be displayed without changing the display.

In S22, an indicated position on the two-dimensional operation surface 40 of the joystick type controller 21, which is the operating knob, is detected, and the indicated position is stored in the predetermined storage area of the memory 102. Displacement of the indicated position is calculated by calculating difference between the current indicated position and the last indicated position in S23. However, at the first time, difference between the indicated position and the neutral position 40n is calculated. In S24, it is determined whether the indicated position has moved. This program ends when it is determined that the indicated position has not moved. This program is repeated periodically. When it is determined that the indicated position has moved in S24, the process goes to S25.

In S25 and S26, the reaction force in response to the indicated position and the operation direction is applied to the joystick type controller 21. Specifically, at first, the CPU 101 calculates a driving instruction content outputted to the X drive circuit 111 and Y drive circuit 112 so that the reaction force of the normal reaction level is applied oppositely to the operation direction in the whole area on the two-dimensional operation surface of the joystick type controller 21 (S25). The reaction information is retrieved from the memory 102, and a magnitude of the reaction force of the normal reaction level is set in accordance with the retrieved information. The CPU 101 outputs the drive instruction signal reflecting the calculated driving instruction content to the X drive circuit 111 and Y drive circuit 112 to drive the actuators 11 and 12 (S26). When the actuators 11 and 12 are driven, the process returns to S11.

Figure 14:
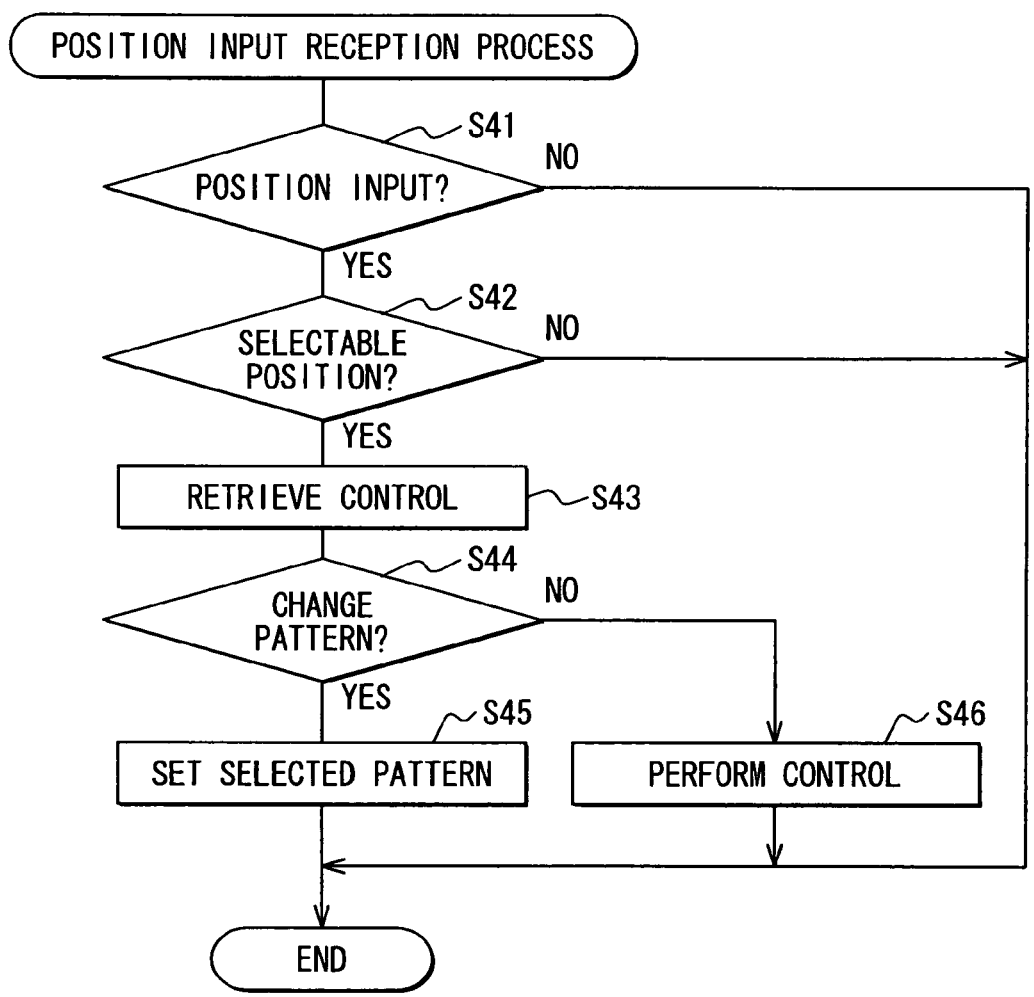
FIG. 14 is a flowchart showing a flow of a process of a position input reception program.

Next, a process of the position input reception program is explained using the flowchart of FIG. 14. First, the existence of the position input is determined in S41. This program also is repeated periodically. When the position input is performed, the process goes to S42, and it is determined whether the position indicated by the position input is in the selectable area. In this embodiment, since the position indication operation to the selectable area corresponds to the position input, the process does not go to NO. When the position input is performed in the selectable area, a control content of the selectable area is retrieved from information about the currently applied setting pattern in the memory 102 in S43.

In S44, it is determined whether the retrieved control content changes the setting pattern. When the retrieved control content changes the setting pattern, the process goes to S45, a setting pattern based on the control content retrieved in S43 is identified. Then, it is determined that the setting pattern has been identified in S2 of FIG. 12, and the setting pattern is changed in the following process.

When the control content retrieved in S44 does not change the setting pattern, the process goes to S46. In S46, the control based on the control content retrieved in S43 is performed. For example, the external device or its function is performed and the control instruction information for changing a control parameter is outputted.

When S45 or S46 end and when the process goes to the negative direction (NO) in either S41 or S42, this program ends. This program is repeated periodically.

As mentioned above, one embodiment of the present invention has been explained, but this is just an example. The present invention is not limited to the embodiment, and various modifications are made within the scope of the claims.

Figure 16:
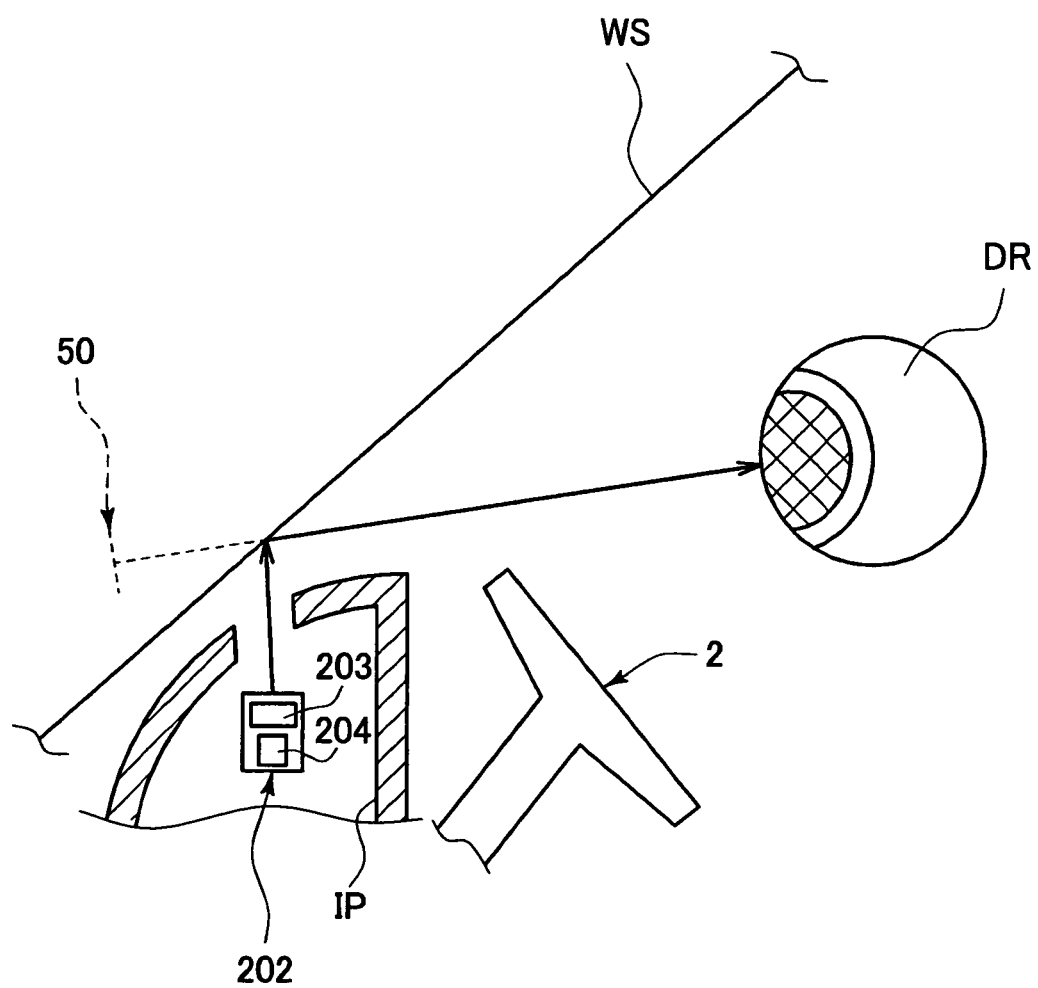
FIG. 16 is an example of an installation of a HUD display.

For example, the display 202 may be a head-up display shown in FIG. 16 instead of the meter display. A display of the head-up display 202 shown in FIG. 16 is disposed in an instrument panel IP extending from a lower side of a windshield WS disposed in front of the driver to an inner side of the vehicle. When a liquid crystal panel 203 on which a display image is imaged is irradiated with light, the light penetrating the liquid crystal panel 203 enters the windshield WS. Then, the light is reflected to a driver DR who has been seated, and the driver DR can thus see a display image 50 (51 or 52) as a virtual image. The same display image 50 (51 or 52) as FIG. 15 can be displayed. The display image 50 (51 or 52) may be displayed on a display (a center display disposed to the center on the front side of the vehicle interior) 5 provided on a center console CC of FIG. 1.

In the above-mentioned embodiment, in accordance with the position input to the specific selectable area 43, the main controller 100 restricts the position input to the selectable areas (position input restriction areas) 43 except the specific selectable area 43 in the discrete mode. Regardless of whether in the discrete mode or in the arbitrary mode, the main controller 100 restricts the position input to the predetermined selectable areas (position input restriction areas) 43, and can perform the change of a display content of the display 202 in association with the restriction. That is, when a condition (input restriction performing condition) that a predetermined travel condition occurs is satisfied, the corresponding position input restriction area 43 can be restricted.

Provided that the predetermined travel condition of the vehicle occurs (input restriction performing condition), the main controller 100 changes the reaction force setting so that part or all of the unique paths 410 of the selectable areas 43, which become the position input restriction areas, changes from the operation permission areas 41 to the operation restriction areas 42. The areas where the position indication operation may be restricted are part or all of the unique paths 410 of the position input restriction areas 43. These areas are operation restriction areas 48. The operation restriction areas 48 are set on path portions except the unique paths common to the selectable areas 43 not becoming the position input restriction areas among the unique paths 410 of the selectable areas 43 becoming the position input restriction areas.

For example, a vehicle speed is used as a parameter which defines the travel condition of the vehicle. Therefore, the reaction force can be controlled so that the position input to the predetermined selectable areas 43 (position input restriction areas 48) are restricted in accordance with a detected vehicle speed. More specifically, provided that the vehicle speed is over a preset vehicle speed threshold (input restriction performing condition), the main controller 100 controls the reaction force to restrict the position input on the selectable areas 43 forming the position indication restriction areas. The main controller 100 releases the restriction when the vehicle speed is under the vehicle speed threshold.

Figure 17:
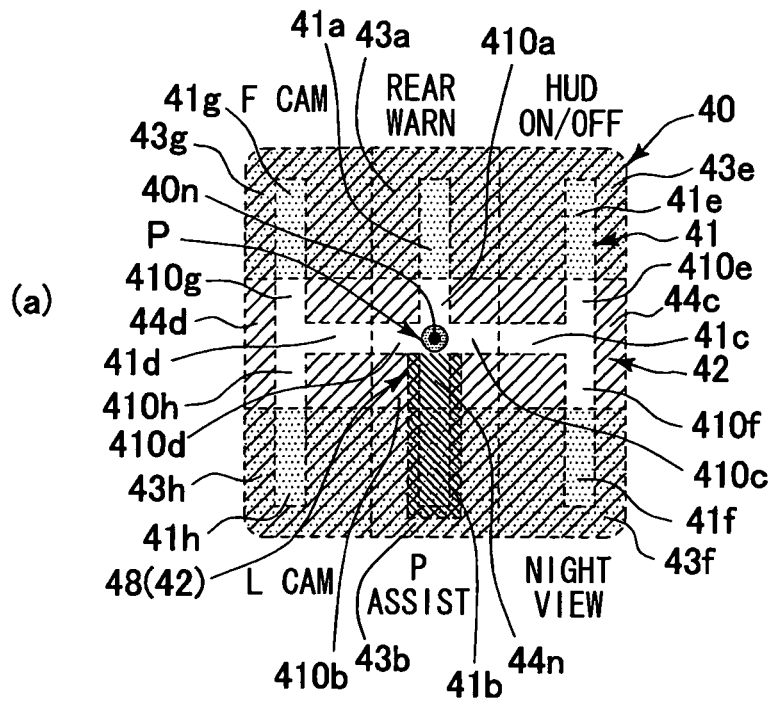
FIG. 17 is a first diagram simply showing a two-dimensional operation surface of the operation input device in which input to part of the selectable areas is restricted in accordance with a certain input restriction performing condition.
Figure 17:
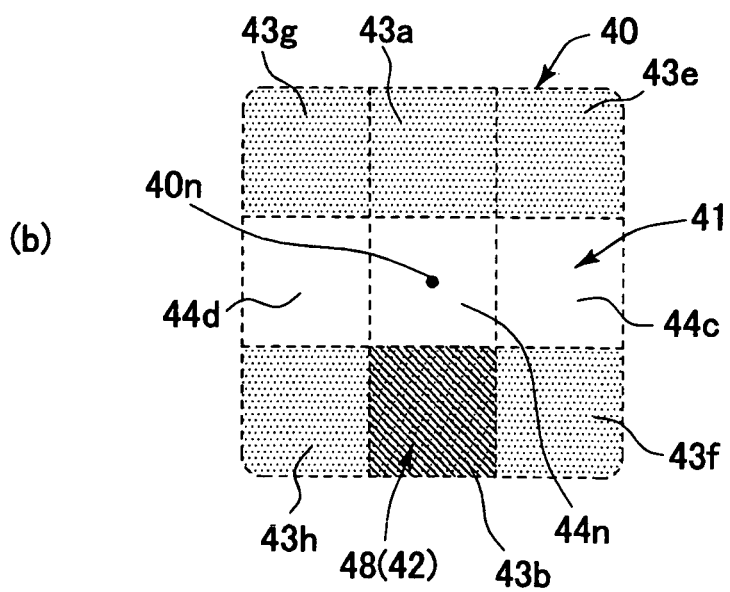

When control contents corresponding to the predetermined external device 201 or its device function are assigned to the selectable areas 43 forming the position input restriction areas, the external device 201 or part of its device functions not required to be performed or the external device 201 or part of their device functions not to be performed can be inhibited forcibly during the travel of the vehicle. The (a) portion of FIG. 17 shows, as its example, the two-dimensional operation surface 40 of the operation input device 1 where use of the parking support function is restricted during the vehicle travel at over a preset vehicle speed.

When a vehicle speed is defined as the travel condition of the vehicle, the input restriction performing condition and the mode change condition for changing the arbitrary mode to the discrete mode are set identically. The main controller 100 controls the reaction force so that the position input becomes impossible in a specific one of the selectable areas 43 (position indication restriction area) where the position input is possible in the arbitrary mode when the arbitrary mode is changed to the discrete mode. Specifically, to restrict the position indication operation on the selectable areas 43 forming the position indication restriction areas when changing to the discrete mode, at least part of the unique paths (operation restriction target areas) are set as the operation restriction areas 42.

On the contrary, when the vehicle speed is under the preset vehicle speed level, the position input on the selectable areas 43 (48) where the position input is to be restricted is restricted, and when the vehicle speed is over the vehicle speed, the restriction is released. For example, the main controller 100 can control the reaction force so that the position input becomes impossible, in the arbitrary mode, in specific part (position input restriction areas 48) of the selectable areas 43 where the position input is possible in the discrete mode.

The travel condition of the vehicle can be determined in accordance with not only the vehicle speed but a shift position. Therefore, for example, provided that the shift position is in the drive position, (input restriction performing condition), the same position input restriction can be performed as in the above case where the vehicle speed is over the preset vehicle speed. Provided that the shift position is in the parking position (input restriction performing condition), the same position input restriction can be performed as in the above case where the vehicle speed is under the preset vehicle speed.

The selectable areas 43 to which control contents of the external device or its function related to a reverse travel of the vehicle are assigned are defined as the input restriction target areas, and may be restricted from receiving the position input provided that the shift position is not in the reverse travel (input restriction performing condition). The device function related to the reverse travel of the vehicle includes the parking support function such as a back monitor, and the position input of the corresponding selectable area 43b can be restricted in the form as shown in (b) portion of FIG. 17.

Figure 18:
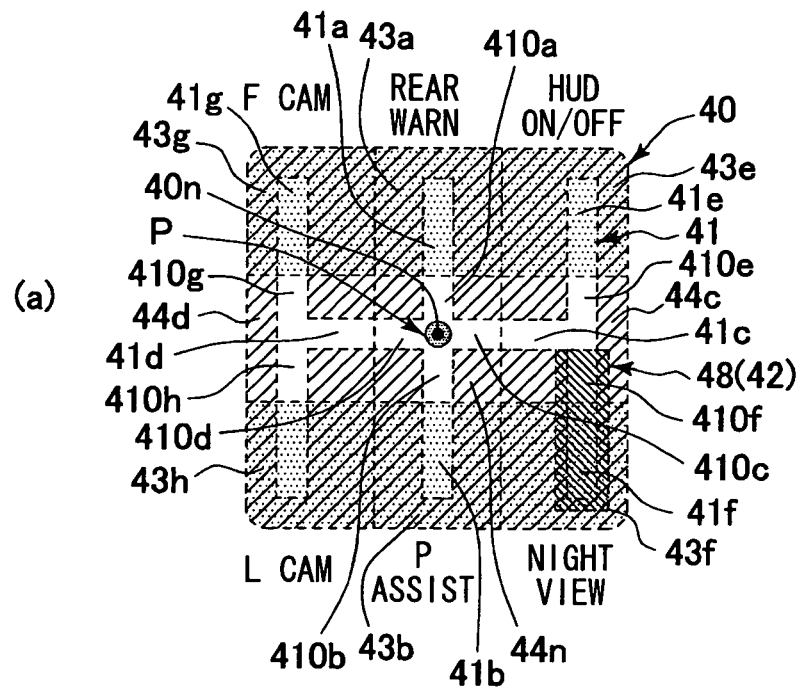
FIG. 18 is a second diagram simply showing a two-dimensional operation surface of the operation input device in which an input to part of the selectable areas is restricted in accordance with a certain restriction performing condition.
Figure 18:
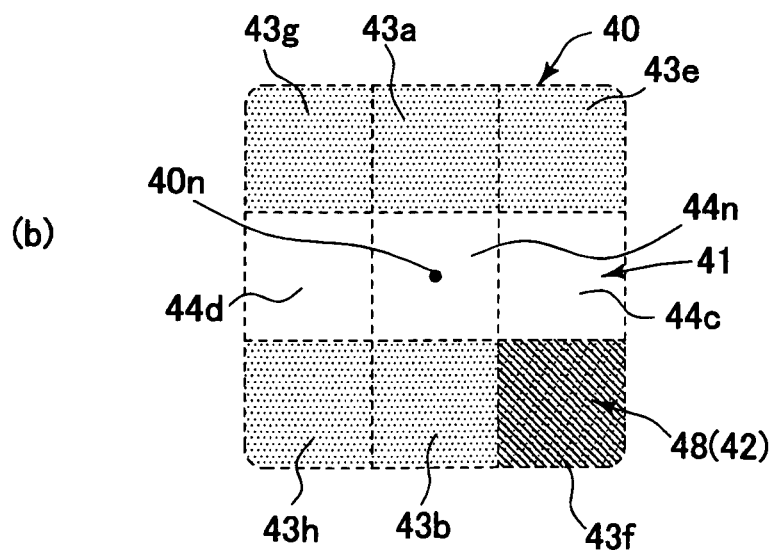

The lighting of a headlight can be defined as the travel condition of the above vehicle. Therefore, for example, provided that the headlight is not lighted (input restriction performing condition), the position input to the selectable area 43 to which a control content of a device function related to a night travel is assigned may be restricted. The device function related to the night travel includes a night view assist function such as a night vision. As shown in (a) and (b) portions of FIG. 18, the position input to the corresponding selectable area 43f can be restricted.

Figure 19:
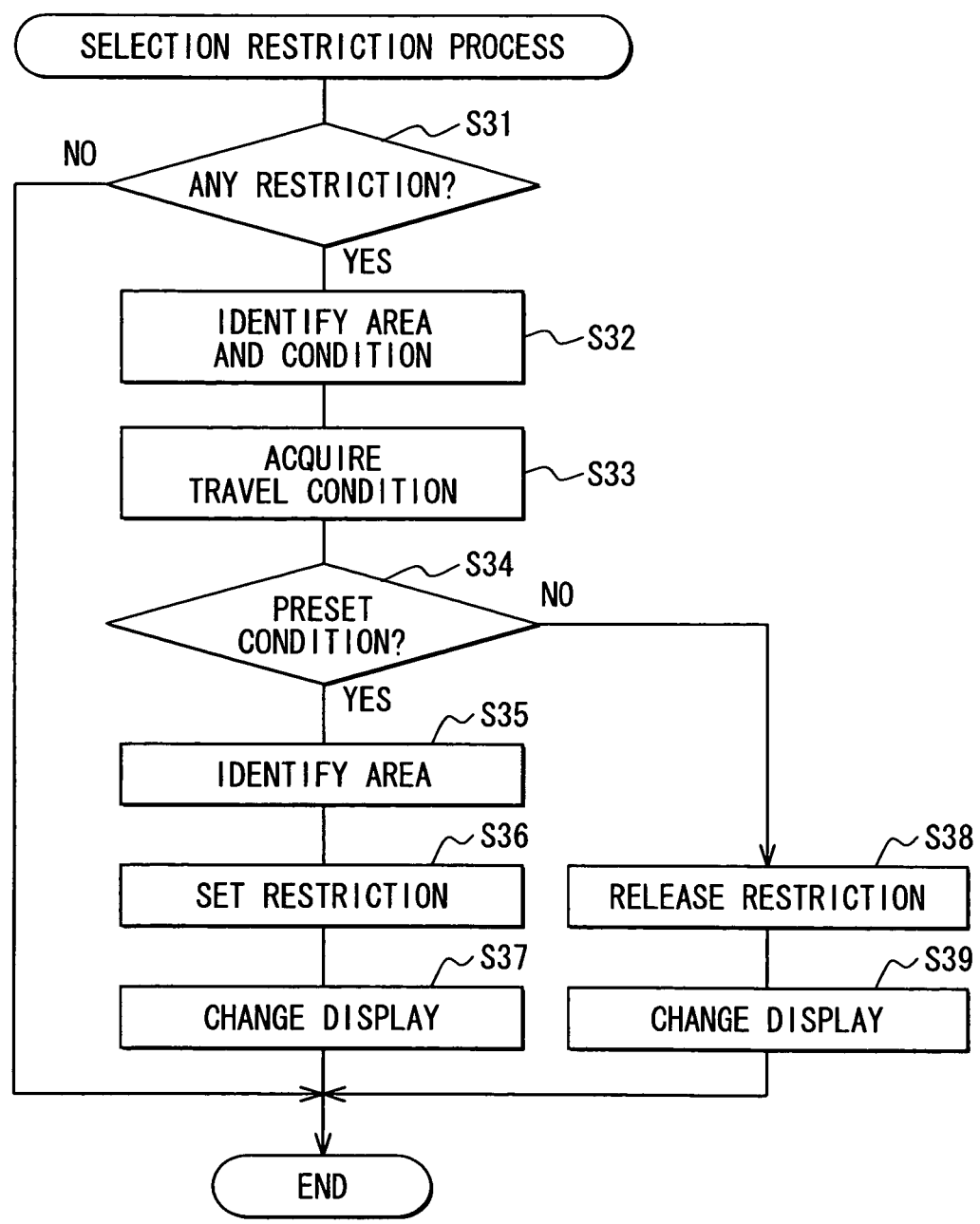
FIG. 19 is a flowchart showing a flow of a process of a position input restriction program.

As mentioned above, when the preset input restriction performing condition about the vehicle travel condition is satisfied, the main controller 100 restricts the position input to the selectable area 43 forming the position input restriction area corresponding to the condition. Specifically, the memory 102 of the main controller 100 stores a position input restriction program for performing the position input restriction based on the vehicle travel condition. Then, the restriction is performed by performing the program in the CPU 101. A process of the position input restriction program is explained using the flowchart of FIG. 19.

First, in the above embodiment, the setting pattern information stored in the memory 102 includes setting patterns and restriction information corresponding to the setting patterns. The restriction information is about correspondences between the selectable areas 43 (input restriction target areas) to be restricted from receiving the position input in the corresponding setting patterns and conditions for performing the restrictions (input restriction performing conditions).

In S31, it is determined whether there is a control content for restricting the position input by the operation input device 1 in the current setting pattern. Specifically, the setting pattern information about the current setting pattern is retrieved from the memory 102, and the determination is performed from the restriction information corresponding to the present setting pattern. When the current setting pattern has the input restriction target area, the process goes to S32, and when the current setting pattern has no input restriction target area, this program ends. The program is repeated periodically.

In S32, the input restriction target area and its input restriction performing condition are identified in accordance with the limitation information retrieved in S31. In S33, the travel condition of the vehicle related to the input restriction performing condition is acquired. The travel condition of the vehicle related to the input restriction performing condition is the vehicle speed, and the condition is satisfied when the vehicle speed exceeds the preset vehicle speed value (for example, 5 km/h).

In S34, it is determined whether the acquired travel condition satisfies the input restriction performing condition. In this embodiment, when the vehicle speed acquired in S33 exceeds the preset vehicle speed value, the input restriction performing condition is satisfied, and then the process goes to S35. On the other hand, when not exceeding the preset vehicle speed value, the input restriction performing condition is not satisfied, and process goes to S38.

In S35, the selectable area 43 forming the input restriction target area is identified, and restriction of the position input to the selectable area 43 is started in S36. The selectable area 43 is set as the operation restriction area 42. The display 202 displays that the position input restriction area 48 changes into the operation restriction area 42, and this program ends.

The input restriction performing condition and the condition for the change to the discrete mode are defined identically. Therefore, the selectable area 43 forming the input restriction target area and part or all of the corresponding unique paths 410 (operation restriction target areas 48) are set as the operation restriction areas 42 in association with the change to the discrete mode. The position indication operation to the selectable area 43 forming the input restriction target area is prevented, and the position input by the operation input device 1 becomes impossible. However, the paths common to the other selectable areas 43 not becoming the input restriction target areas are not set as the operation restriction areas 42.

On the other hand, in S38, since the input restriction performing condition is not satisfied, the restriction is released in the condition where the position input is restricted in the selectable area 43 forming the input restriction target area, and the display of the display 202 is returned to the former one in S39. In S38 and S39, when the current condition is not in the restriction condition, the current condition is maintained and the display is maintained. After performing S39, this program ends. Accordingly, the position input restriction of part of selectable areas 43 based on the travel condition can be performed.

In the above embodiment, the main controller 100 may restrict the position input to the position input restriction area 43 by changing the selectable area 43 forming the position input restriction areas into the non-selectable areas 44 provided that the predetermined travel condition of the vehicle occurs (input restriction performing condition).

In the present invention, it is preferable that the position indication operations on the areas 43 and 44 can be distinguished by tactile sensation. In all the above embodiment, the reaction force which generates a click feeling is controlled so that the position indication operations to the selectable areas 43 are distinguished from the position indication operations to the non-selectable positions 44. The reaction force for the areas 43 may be different from that for the areas 44 in magnitude, for example.

Figure 20:
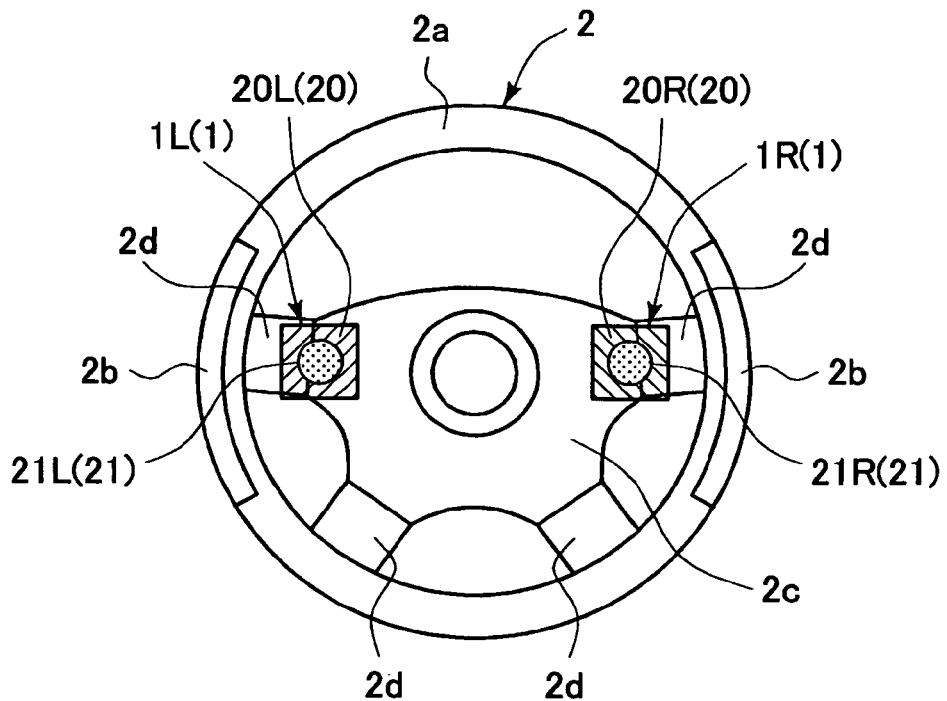
FIG. 20 is an external view showing a first example of the steering wheel mounting the operation input device of the present invention.

In all of the above embodiments, the operation input device 1 is provided on one of the right and left of the steering wheel 2. As shown in FIG. 20, the operation input device 1 may be provided on both of the right and left of the steering wheel 2 in the above reference position. In this case, different setting patterns can be assigned to the respective operation input device 1. A portion of the numeral provided with R corresponds to the right operation input device, and a portion of the numeral provided with L corresponds to the left input device.

In all the above embodiments, the position input to the selectable areas 43 is performed by the position indication operation from the non-selectable position 44 to the selectable area 43 or from a certain one of the selectable areas 43 to another one of the selectable areas 43. A controller (position indication operation input portion) specific to the position input may perform the position input. For example, as shown in FIG. 21, on the steering wheel 2, a position indication operation input portion 29 for the position input may be provided on the opposite side to the side to which the operation input device 1 is provided.

The position indication operation input portion may be provided on the operation input device 1, which performs the position indication operation. For example, as shown in FIG. 22, by pushing (push operation) the joystick type controller 21 in the direction of the operation axis Z, a switch portion 61 is pushed and biased to output a switch signal to the main controller 100. Specifically, by pressing the contact surface 21a of the joystick type controller 21 in the direction of the operation axis Z, the switch portion 61 of the tact switch 60 is pressed and biased by a top end (bottom end) of the rod 24 extending from the back of the joystick type controller 21. Then, the press onto the contact surface 21a is released, so that the joystick type controller 21 returns to and is retained at the former position before the pressing by a spring of a tact switch 30 (not shown).

That is, the operation input device 1 in this embodiment functions as the position indication operation portion which performs the position indication operation on the two-dimensional operation surface having a predetermined range and which has a degree of freedom of two-dimensional operations and as a press operation portion which enables a press operation in the different direction (Z direction in this embodiment) from the direction of the position indication operation. The operation input device 1 can perform the position indication operation toward the selectable areas 43 in the predetermined operation range 20 on the two-dimensional operation surface and permits the position input by the above pressing operation.

Figure 24:
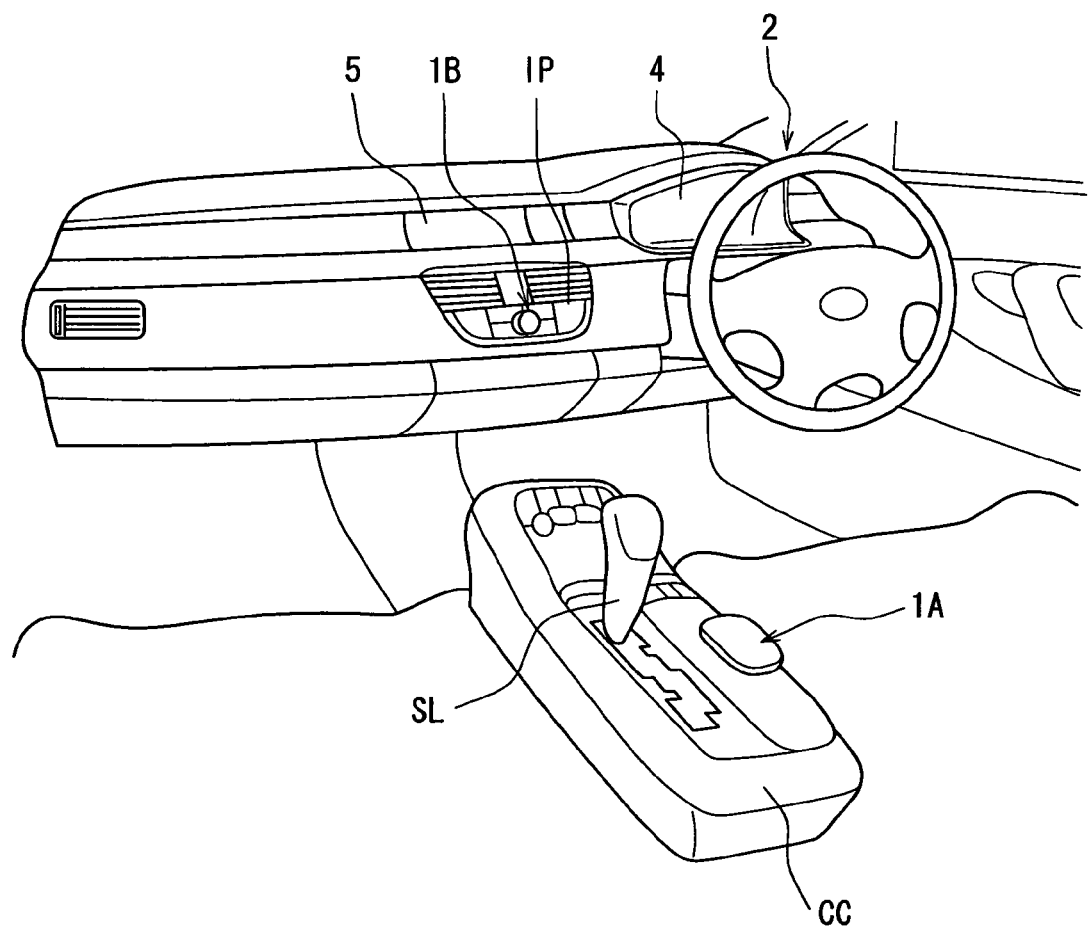
FIG. 24 is an external view showing an embodiment in which the operation input device of the present invention is provided on a different position from the steering wheel.

All the above embodiments are achieved on the premise that the operation input device 1 is provided on the steering wheel 2, but the operation input device 1 can also be provided on another portion easily operable by the driver during the drive. For example, as shown in FIG. 24, the operation input device 1 (1B) may be provided on the instrument panel IP of the vehicle shown in FIG. 1. As a portion easily operable by the driver during the drive, as shown in FIG. 24, the operation input device 1 (1A) can also be provided on the center console CC of the vehicle shown in FIG. 1. The operation input device 1 (1A) is provided between and adjacent the sitting portions of both seats, more specifically, closer to the driver than a shift lever SL to avoid disturbance by the shift lever SL.

A modification 1 is explained below. Difference between the modification 1 and the above embodiments is explained.

In the modification 1, the memory 102 of the main controller 100 stores setting patterns in each of which arrangement positions (arrangement form) of the selectable areas 43 (43a to 43h) correspond to control contents performed by the position input to the selectable areas 43 as setting pattern information. The main controller 100 sets the selectable areas 43 discretely on the two-dimensional operation surface 40 in accordance with the setting pattern and assigns the corresponding control contents to the selectable areas 43.

Figure 25:
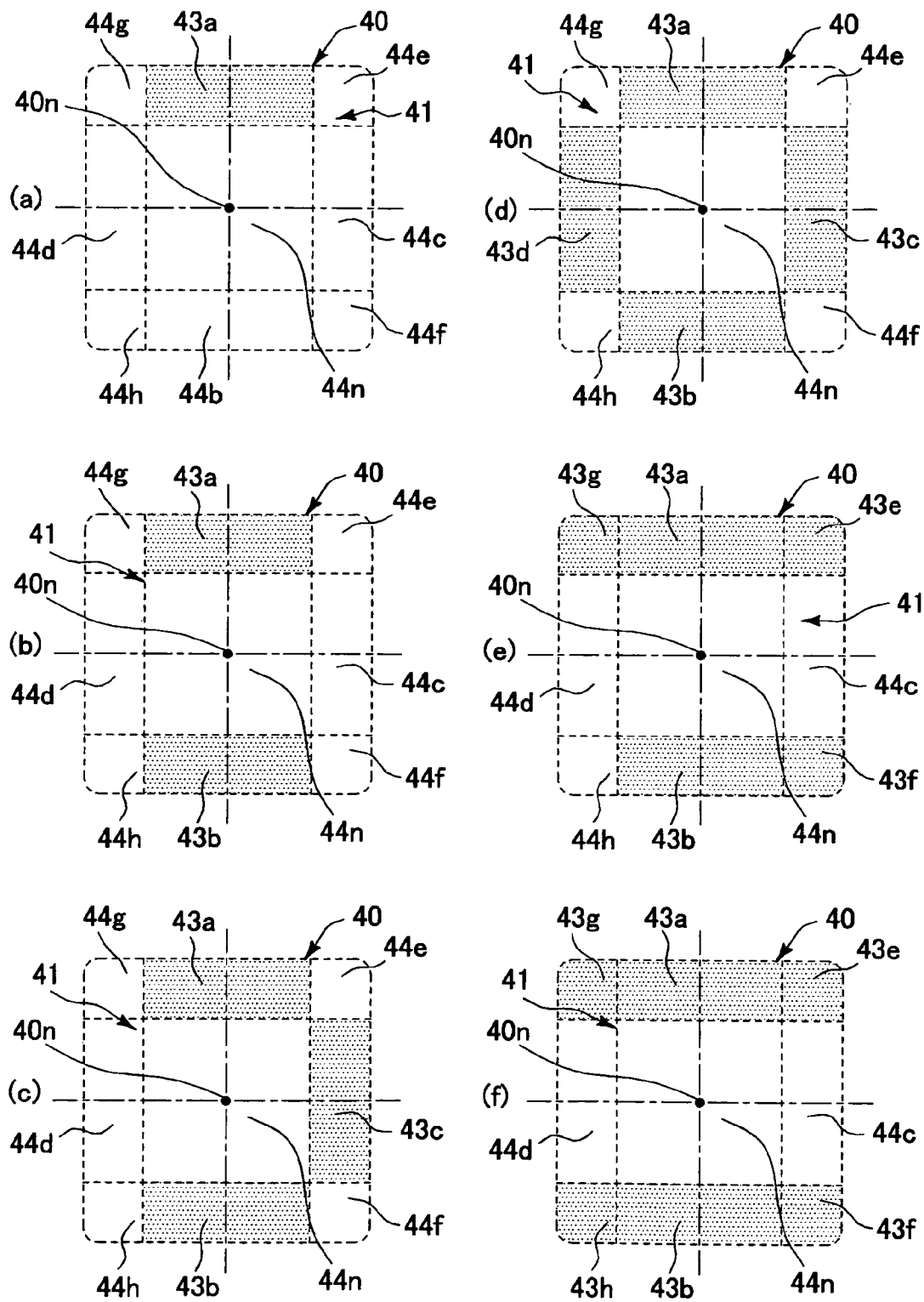
FIG. 25 simply shows two-dimensional operation surfaces in the arbitrary mode as a modification 1.
Figure 26:
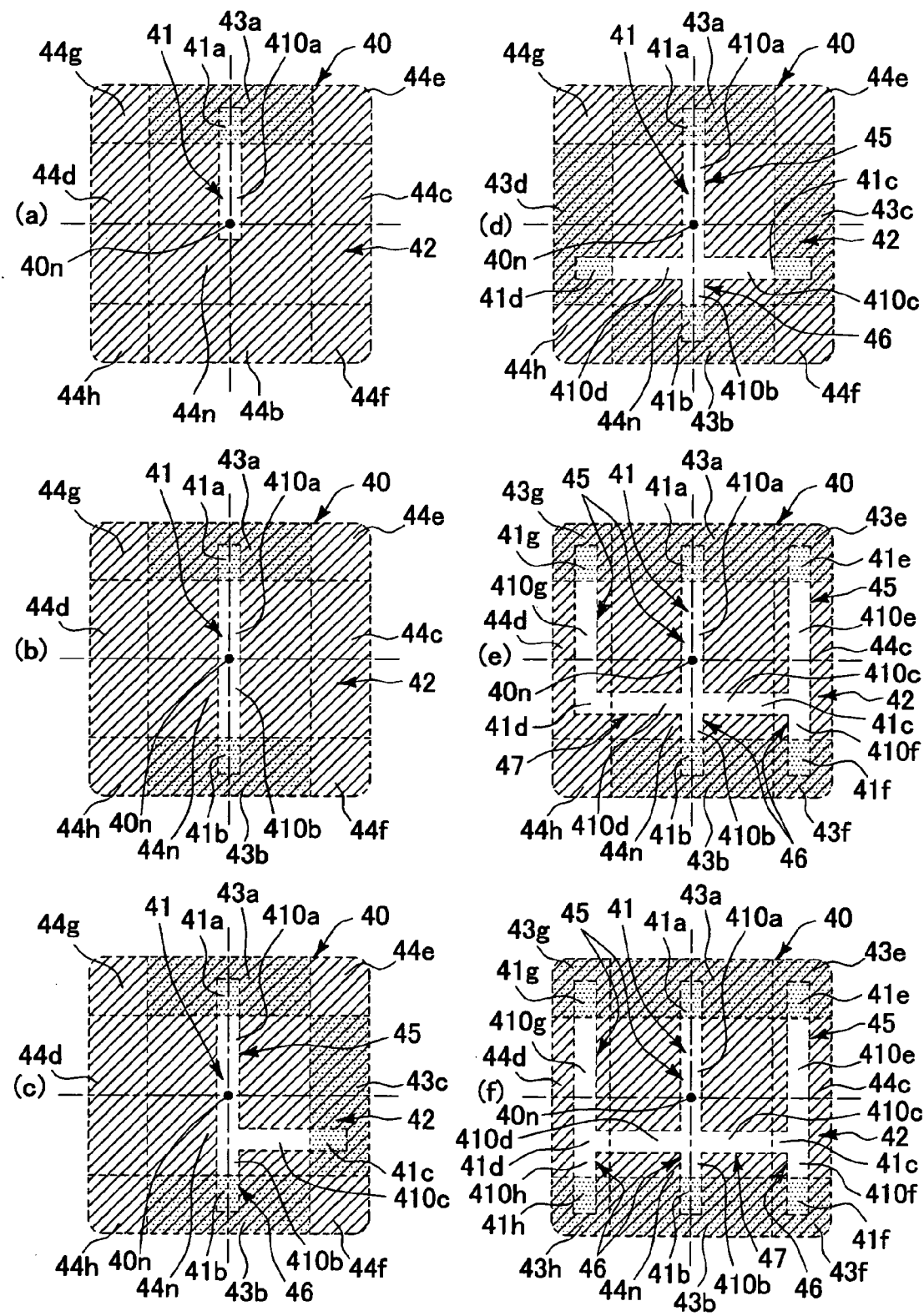
FIG. 26 simply shows the two-dimensional operation surface in the discrete mode as the modification 1.

In each setting pattern, the arrangement form of the selectable areas 43 (43a to 43h) in the two-dimensional operation surface 40 having a predetermined operation range are defined as a unique arrangement form based on the number of the selectable areas 43. In the modification 1, six arrangement forms as shown in FIG. 25 or 26 are defined. Accordingly, since the arrangement form of the selectable areas 43 is defined in accordance with the number, the user can memorize the arrangement forms easily. When a haptic device (operation input device) 1 is provided on the right side of the steering wheel 2, the arrangement form of the selectable areas 43 shown in FIGS. 25 and 26 and the unique paths 410 (410A to 410H) mentioned later are provided symmetrical to those of the left one.

On the unique paths 410 (410A to 410H) on the two-dimensional operation surface 40, lengths of operation strokes toward the corresponding selectable areas 43 are set uniquely in accordance with the operation direction of the haptic device 1. All the unique paths 410 in the modification 1 on the two-dimensional operation surface 40 can be set to have both of upward operation paths 45 in which the haptic device 1 is operated upward toward the corresponding selectable areas 43 and downward operation paths 46 in which the haptic device 1 is operated downward toward the corresponding selectable areas 43. When both the upward operation paths 45 and the downward operation paths 46 are set, the operation strokes of the upward operation paths 45 are set longer than those of the downward operation paths 46. The haptic device 1 provided on the steering wheel 2 is disposed operable in the vertical and horizontal directions in the vehicle interior space, and these operations are usually performed by the thumb. However, the upward operation can be performed easily by the thumb, but the downward operation by the thumb is difficult. This is because the upward operation stroke can be long but the downward operation stroke cannot be long due to the structure of the thumb. In the above structure, the downward operation is easy because its stroke is short but the upward operation becomes burdensome as the operation stroke becomes long, generating less erroneous operations.

The whole of the above unique paths 410 can be defined such that the upward operation paths 45 and downward operation paths 46 are connected to the common path 47 which extends in the left and right operation directions of the haptic device 1 and which is shared by the multiple unique paths 410. By providing the common path 47, the whole paths composed of the unique paths 410 are shaped simply. In the modification 1, the above-mentioned common path 47 is defined to be a single on the two-dimensional operation surface 40. All the upward operation paths 45 and downward operation paths 46 are connected to the common path 47. Because of the single common path, the whole of the unique paths 410 is shaped simply. In the modification 1, the upward operation paths 45 and downward operation paths 46 connected to the above-mentioned single common path 47 are directly connected to the selectable areas 43 corresponding to the paths. In consideration of the operations of the haptic device 1 by the thumb, the vertical operation around the base of the thumb is naturally easier than the lateral operation using the flexion of the thumb. Accordingly, the vertical operations are defined as main operations to the selectable areas 43 and lateral operations are defined as secondary operations on the common path. Accordingly, the operability is improved to perform the position indication operation to the selectable areas 43 more certainly.

In the modification 1, the upward operation paths 45 and downward operation paths 46 are defined as linear paths vertically connected to the common path 47. Accordingly, the whole of the unique paths 410 is shaped simply, and the user can understand the paths easily. In the present invention, the upward operation paths 45 may be paths in which the haptic device 1 is guided upward to the selectable positions corresponding to the upward operation paths 45, and the downward operation paths 46 may be paths in which the haptic device 1 is guided downward to the selectable positions corresponding to the downward operation paths 46. The paths does not necessarily need to be connected to the common path 47, and even if connected, vertical connection is not needed. For example, the upward operation paths 45 and the downward operation paths 46 in which the above guide operations are performed are defined as last junctions to the corresponding selectable positions or last paths from corners to the selectable positions. Operation strokes of the upward operation paths forming the last paths can be set longer than operation strokes of the downward operation paths forming the last paths. The upward operation paths and the downward operation paths extend from the common path by different angles, and operation strokes can be set in accordance with the angles. In this case, operation strokes of the upward extending paths can be set longer than those of the downward extending paths.

In the modification 1, there are multiple setting patterns. In all the setting patterns, a starting position of the common path 47 set on the two-dimensional operation surface 40 is defined as the same position (see (c) to (f) portions of FIG. 26). Starting points of the upward operation paths 45 and downward operation paths 46 from the common path 47 are predefined. The upward operation paths 45 and downward operation paths 46 are set to be connected only to the starting points (see (e) and (f) portions of FIG. 26: the starting points in the modification 1 are left, center, and right portions on the common path 47, and the operation paths 45 and 46 can extend from the starting points). In some setting patterns, the starting points of the upward operation paths 45 and downward operation paths 46 are set in either or both lateral ends of the common path 47 which extends laterally, but the upward operation paths 45 and downward operation paths 46 do not extend from the starting points, and the ends are defined as the selectable areas 43 (see (c) and (d) portions of FIG. 26).

Figure 27:
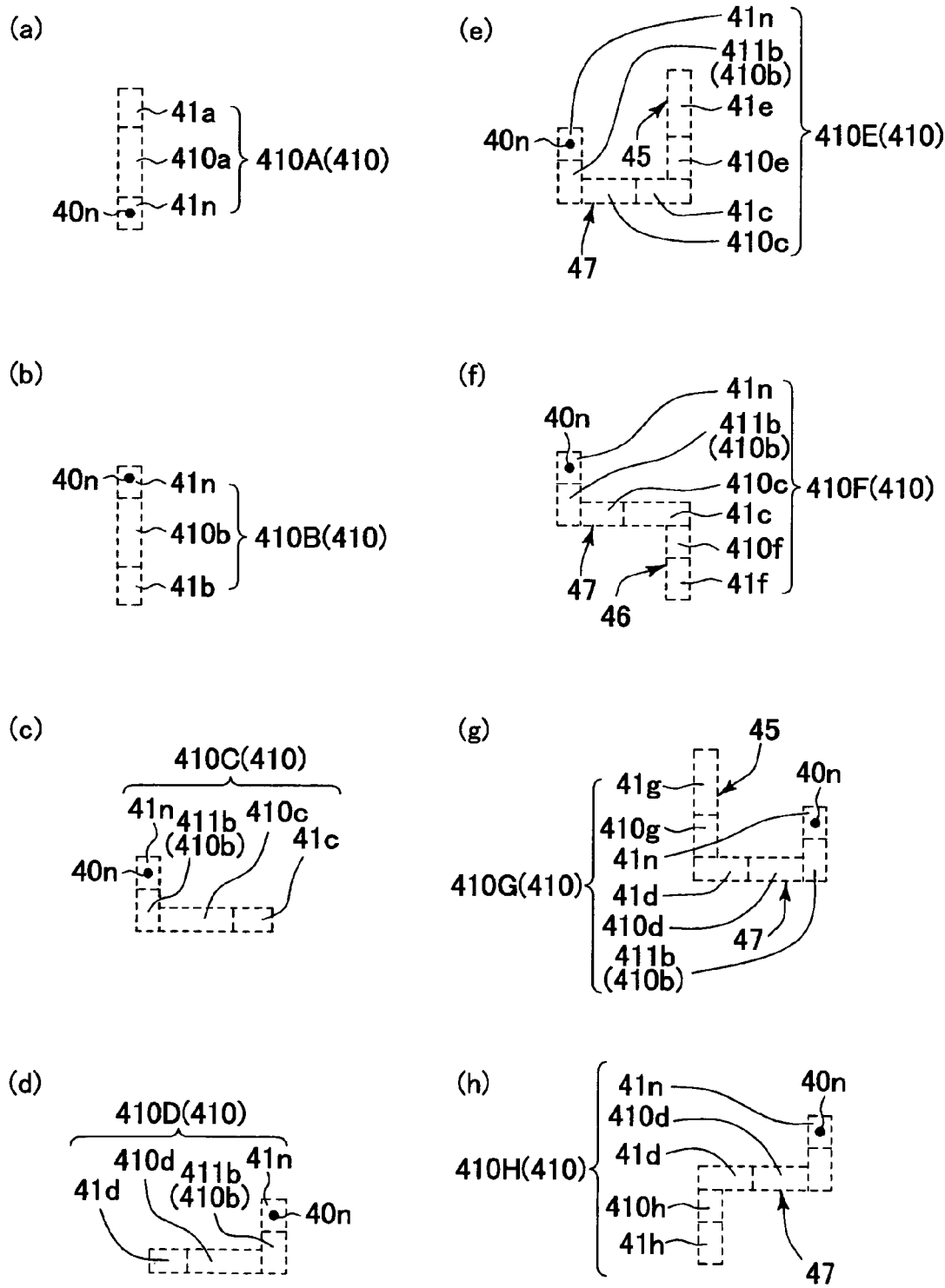
FIG. 27 shows unique paths in the modification 1.

The common path 47 in the modification 1 is disposed below the neutral position 40n of the reaction force on the two-dimensional operation surface 40. The unique path 410 in the modification 1 is shown in FIG. 27. The unique path 410A to the selectable area 43a is composed of the neutral area 41n including the neutral position 40n and the path 410a. The unique path 410B to the selectable area 43b is composed of the neutral area 41n and the path 410b. The unique path 410C to the selectable area 43c is composed of the neutral area 41n and the path 410c. The unique path 410D to the selectable area 43d is composed of the neutral area 41n and the path 410d. The unique path 410E to the selectable area 43e is composed of the neutral area 41n and paths 410c, 41c, and 410e. The unique path 410F to the selectable area 43f is composed of the neutral area 41n and paths 410c, 41c, and 410f. The unique path 410G to the selectable area 43g is composed of the neutral area 41n and paths 410d, 41d, and 410g. The unique path 410H to the selectable area 43h is composed of the neutral area 41n and paths 410d, 41d, and 410h.

In the input apparatus 10 in the modification 1, when the position input is performed on the selectable areas 43 by the haptic devices 1, the main controller 100 performs control contents corresponding to the selectable areas 43.

Figure 28:
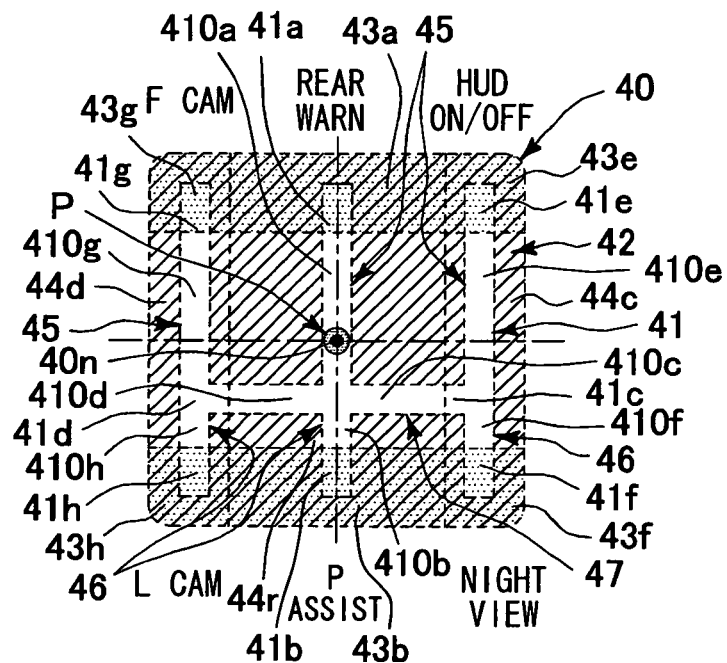
FIG. 28 explains setting patterns for the control indications as the modification 1.
Figure 28:
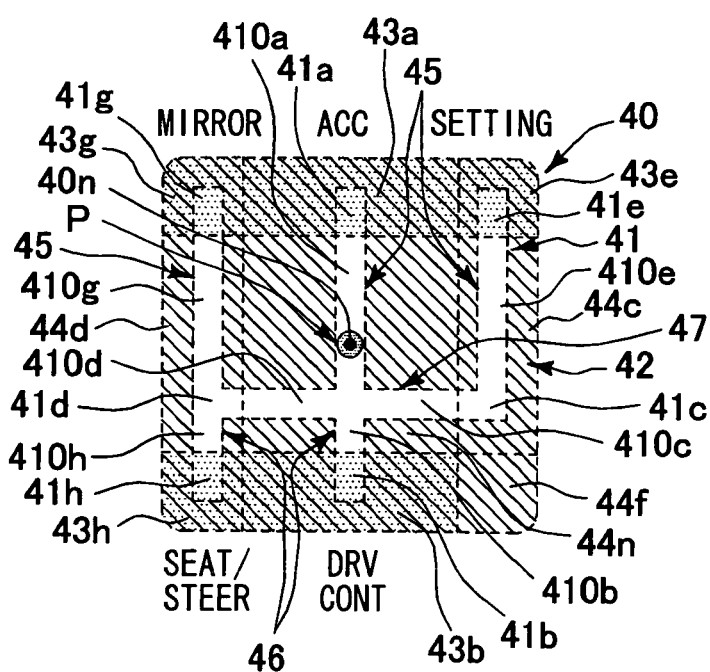

The setting patterns in the modification 1 include only the control contents assigned to the selectable areas 43 and related to each other. Specifically, the setting patterns in the modification 1 are patterns for control indications. In these patterns, only control contents related to the same device 201 or the same device function are collected and assigned to the selectable areas 43. Specifically, the setting patterns for control indications include a setting pattern in which only the "view assist functions" such as the "front camera," "rear camera," "head-up display (HUB)," "side camera," "parking support function," "night-view assist function," and "rear-lateral warning function" are assigned to the selectable areas 43a, 43b, 43e, 43f, 43g, and 43h as shown in (a) portion of FIG. 28 and a setting pattern in which only control contents related to various vehicular functions are assigned to selectable areas 43*a*, 43*b*, 43*e*, 43*g*, and 43*h* as shown in (b) portion of FIG. 28. Although FIG. 28 shows a display in the discrete mode, the same content is displayed in the arbitrary mode.

A structure of changing the setting patterns in the modification 1 uses a form of changing hierarchical selection patterns as follows. In the lower hierarchy setting pattern (for control indications), control indication contents related to the same external device 201 or the same function of the external device 201 are assigned to the selectable areas 43 and, in accordance with the position input, the corresponding control indication content is performed. In the upper hierarchy setting pattern (for changing setting patterns), the lower hierarchy setting patterns related to different external devices 201 or different device functions are assigned to the selectable areas 43 to change the setting patterns. That is, a device or function to be used in the upper setting pattern is selected, and a concrete content to be used in the device or function selected in the upper setting patterns is selected in the lower setting patterns.

Figure 29:
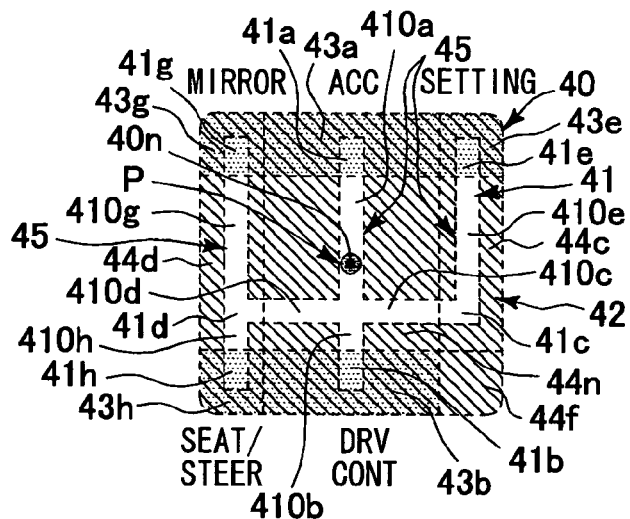
FIG. 29 explains movements between hierarchies of the setting patterns as the modification 1.
Figure 29:
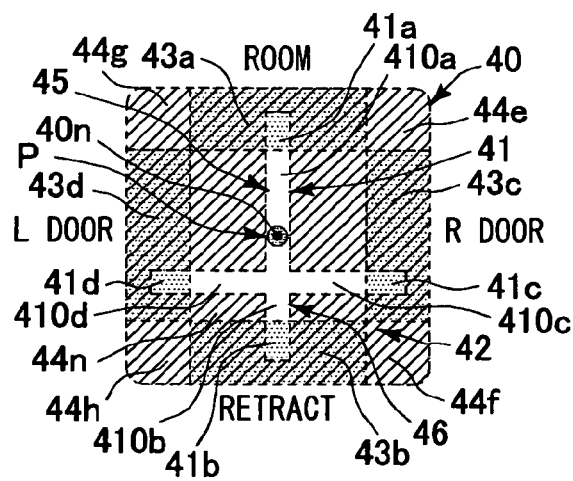
Figure 29:
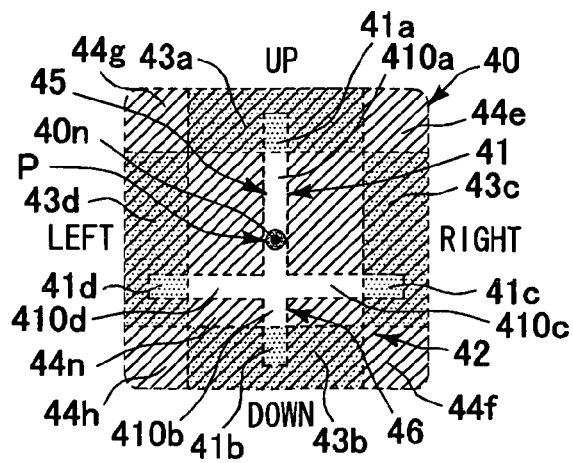

The concrete example is shown in FIG. 29. The (a) portion of FIG. 29 shows the upper hierarchy setting pattern for selecting the external device 201 or its device function to be used. When the "mirror position change function" is selected from this upper setting pattern by the position input, the upper setting pattern is changed to the lower hierarchy setting pattern. In this lower hierarchy setting pattern, control contents related to the device or device function selected on the upper hierarchy are collected. In the modification 1, as shown in (b) portion of FIG. 29, the setting pattern includes control contents related to the "mirror position change function" to select which mirror is changed concretely. When the mirror to be changed is selected from this setting pattern by the position input, the current setting pattern changes to a further lower hierarchy setting pattern than the current setting pattern. Also in this further lower hierarchy setting pattern, control contents related to the device or its function selected in the upper hierarchy are collected. In the modification 1, as shown in (c) portion of FIG. 29, the setting pattern includes control contents related to the mirror selected in (b) portion of FIG. 29 to determine whether the mirror is tilted in upward, downward, left, or right direction. That is, in the setting pattern of (c) portion of FIG. 29, the setting pattern is not changed even when the position input is performed to the selectable areas 43, but a control content of the selectable area 43 which have received the position input is performed. An angle of the mirror is changed by a predetermined angle by one selection (position input). FIG. 29 is shown in the discrete mode, but it is natural that the above explanation is applied also in the arbitrary mode.

Also in this case, it is preferable to provide the hierarchy return operation portion for returning from the lower hierarchy to the upper hierarchy. For example, the selectable area 43 to which a control content for returning to the upper hierarchy is assigned is provided in each lower hierarchy setting pattern (corresponding unique paths are provided in the discrete mode), and the position input to the selectable area 43 can be used as the hierarchy return operation. The hierarchy return operation can be performed by an operation in a different direction from the directional operation (position indication operation) by the joystick type controller 21 in the haptic device 1. For example, as shown in FIG. 22, a function (tact switch 60 functions as a press operation portion) as a press operation portion is provided on the joystick type controller 21, and the hierarchy return operation can be performed by the pressing operation. The hierarchy return controller may be provided as the controller 28 different from the haptic device 1. For example, as shown in FIG. 21, the controller 28 can be provided in a position operable by the opposite hand, particularly by its thumb, to the hand which grasps the steering wheel 2 in the opposite side to the haptic device 1 of the steering wheel 2.

In some setting patterns, control contents assigned to the selectable areas 43 include a content for restricting the position input to the selectable areas 43 except the predetermined selectable area 43 in accordance with the position input to the predetermined selectable area 43. That is, when the position input is performed to a specific one of the selectable areas 43, the position input restriction area where the position input is restricted is among the selectable areas 43. In the modification 1, in the discrete mode, at least part of the unique paths 410 of the position input restriction area 43 is changed from the operation permission area 41 to the operation restriction area 42 to restrict the position input to the position input restriction area 43. However, the change from the operation permission area 41 to the operation restriction area 42 is not performed on the unique paths 410 of the selectable areas 43 where the position input is not restricted.

Figure 30:
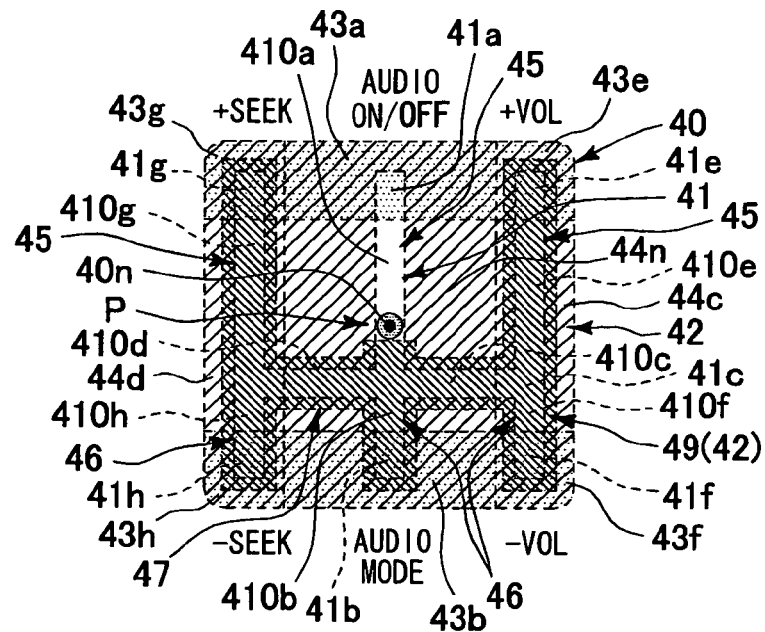
FIG. 30 explains the setting patterns in which the operation restriction is performed in accordance with the position input as the modification 1.
Figure 30:
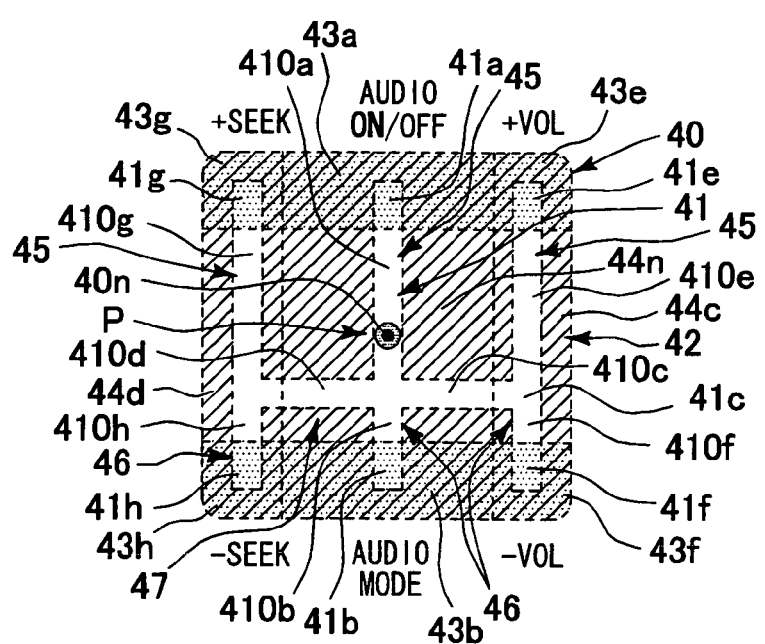

Specifically, in a setting pattern for audio operations in which an audio operation screen shown in FIG. 30 is displayed, when the audio is turned off, the pointer P can be moved from the neutral area 41*n* only to the selectable area 43*a* of a control indication content of turning the audio ON/OFF as shown in (a) portion of FIG. 30. That is, all the unique paths 410 except the unique path 410A are changed to the operation restriction areas 42. On the other hand, when the position input of turning the audio ON is performed, the pointer P can be moved along all the unique paths 410 toward the selectable areas 43*a*, 43*b*, 43*e*, 43*f*, 43*g*, and 43*h* as shown in (b) portion of FIG. 30.

The numeral 49 in (a) portion of FIG. 30, in the discrete mode, visually and simply shows an area applied with the reaction force of the operation prevention level at which the position indication by the haptic device 1 is impossible. The area is actually applied with the reaction force of the same operation prevention level as the operation restriction areas 42. That is, in (a) portion of FIG. 30, the areas 49 include the operation permission areas 41*n*, 41*b*, 410*b*, 41*c*, 410*c*, 41*d*, 410*d*, 41*e*, 410*e*, 41*f*, 410*f*, 41*g*, 410*g*, 41*h*, and 410*h* in the ON state of the audio. The areas 49 actually include the operation restriction target areas which change to the operation restriction areas 42 in the discrete mode.

The operation restriction target areas 49 are displayed in the display 202 in such a form as to be capable of recognizing that the change from part of the operation permission areas 41 to the operation restriction areas 42 in the discrete mode is temporal. In (a) portion of FIG. 30, in part of the areas 49 where there is a possibility that the reaction force is changed in the discrete mode, the operation permission areas 41*n*, 41*b*, 410*b*, 41*c*, 410*c*, 41*d*, 410*d*, 41*e*, 410*e*, 41*f*, 410*f*, 41*g*, 410*g*, 41*h*, and 410*h* before the change can be recognized visually even after the change to the operation restriction areas 42. In (a) portion of FIG. 30, when the operation restriction target areas 49 are the operation permission areas 41, the operation restriction target area 49 is displayed in the same form as the other operation permission areas 41. When the operation restriction target areas 49 change to the operation restriction areas 42, the operation restriction target areas 49 are displayed in a different form from that of the operation permission areas 41 before the change and from the other operation restriction areas 42. Accordingly, the user can easily recognize that the areas 49 change to the operation restriction areas temporarily. In (a) portion of FIG. 30, the operation restriction target areas 49, when changing to the operation restriction areas 42, are displayed in a different form from that of the operation permission areas 41 before the change and from the other operation restriction areas 42 together with part of the operation restriction areas 42 around the areas 49, so that the temporality of the change is further highlighted.

Figure 31:
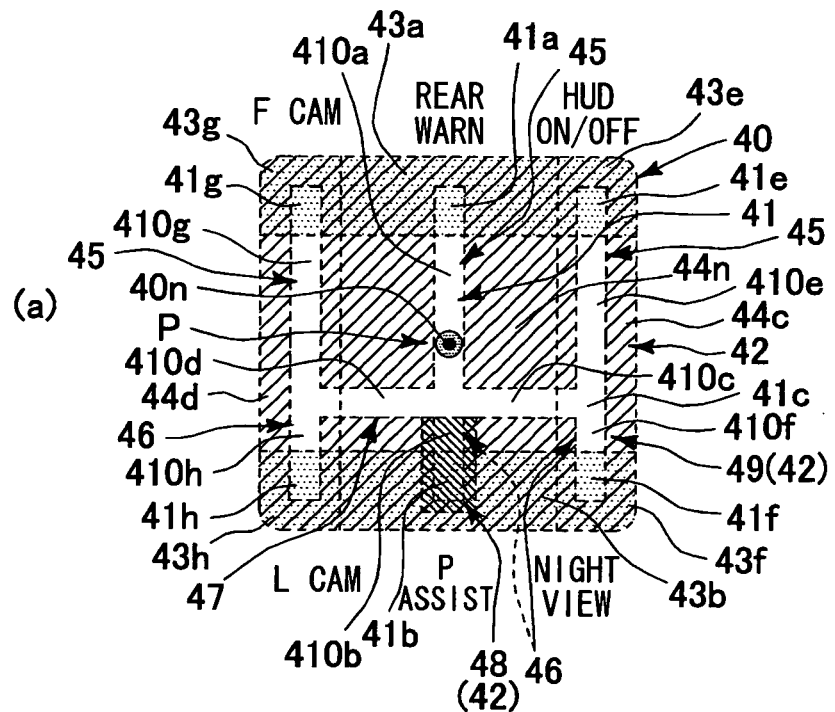
FIG. 31 is a first diagram simply showing a two-dimensional operation surface of a haptic device, the surface having the selectable areas, part of which is restricted from receiving input in accordance with a certain input restriction performing condition as a modification 1'.
Figure 31:
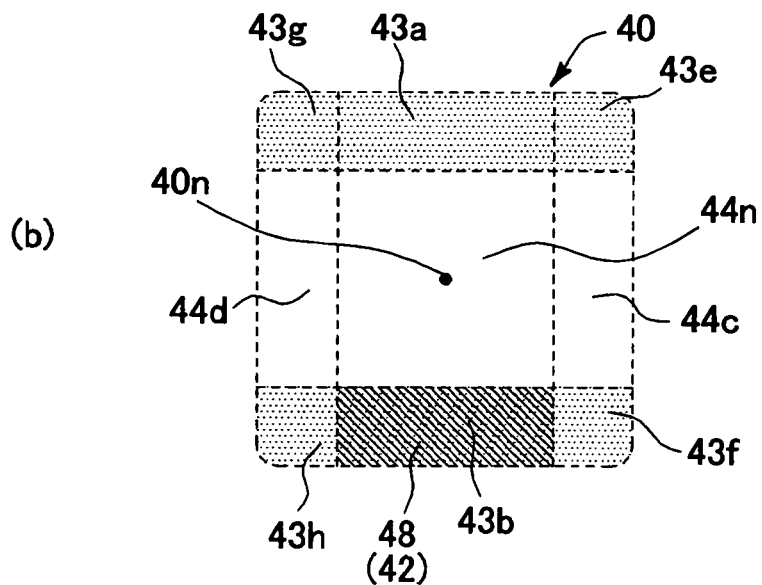

Control contents corresponding to the predetermined external device 201 or its function can be assigned to the selectable areas 43 forming the position input restriction areas. Accordingly, the external device 201 or part of its functions not required to be performed during the vehicle travel or the external device 201 or part of its functions not to be performed during the vehicle travel cannot be performed during the vehicle travel forcibly. FIG. 31 shows the two-dimensional operation surface 40 of the haptic device 1 where use of the parking support function is restricted while the vehicle travels at over a preset vehicle speed.

As the input restriction target areas, the selectable areas 43 to which a control content related to the external device or its device function related to the reverse travel of the vehicle are assigned are defined. Provided that the shift position is not in the reverse (input restriction performing condition), the position input to the selectable areas 43 may be restricted. As a device function related to the reverse travel of the vehicle, there is the parking support function such as a back monitor, in which the position input to the corresponding selectable area 43*b* can be restricted as shown in FIG. 31.

Figure 32:
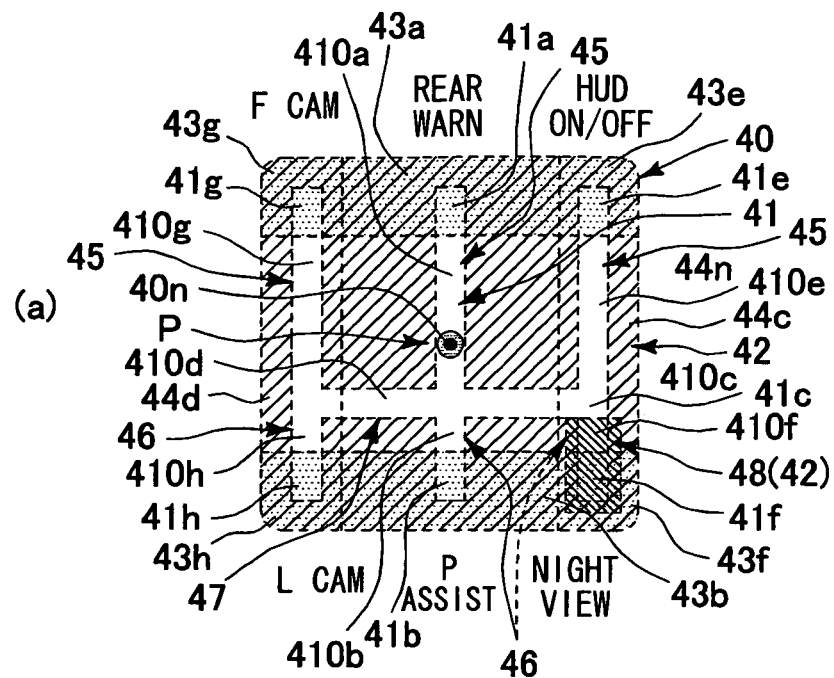
FIG. 32 is a second diagram simply showing the two-dimensional operation surface of a haptic device, the surface having the selectable areas, part of which is restricted from receiving input in accordance with a certain input restriction performing condition as the modification 1'.
Figure 32:
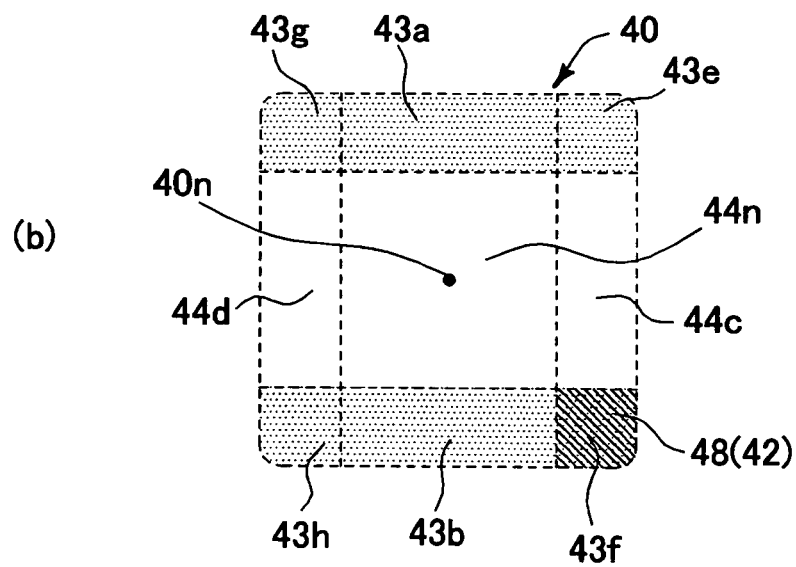

The lighting of the headlight can be used as the above vehicle travel condition. Therefore, for example, provided that the headlight is not lighted (input restriction performing condition), the position input to the selectable area 43 to which a control content related to the device function related to the night travel may be restricted. As a device function related to the night travel, there is the night view support function such as a night vision, in which the position input to the corresponding selectable area 43*f* can be restricted as shown in FIG. 32.

Figure 33:
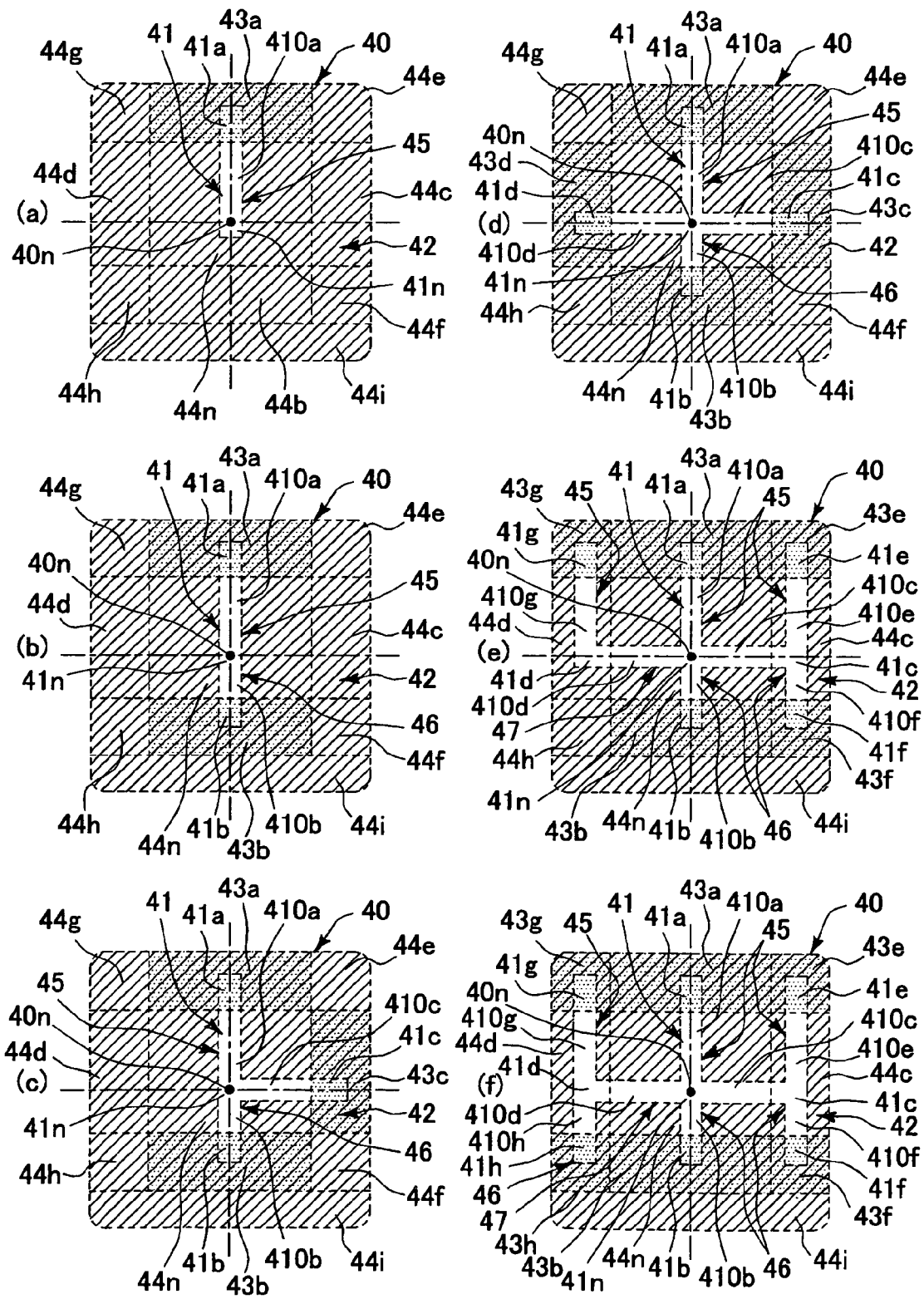
FIG. 33 simply shows different two-dimensional operation surfaces from those of FIG. 26 in the discrete mode as a modification 2.
Figure 34:
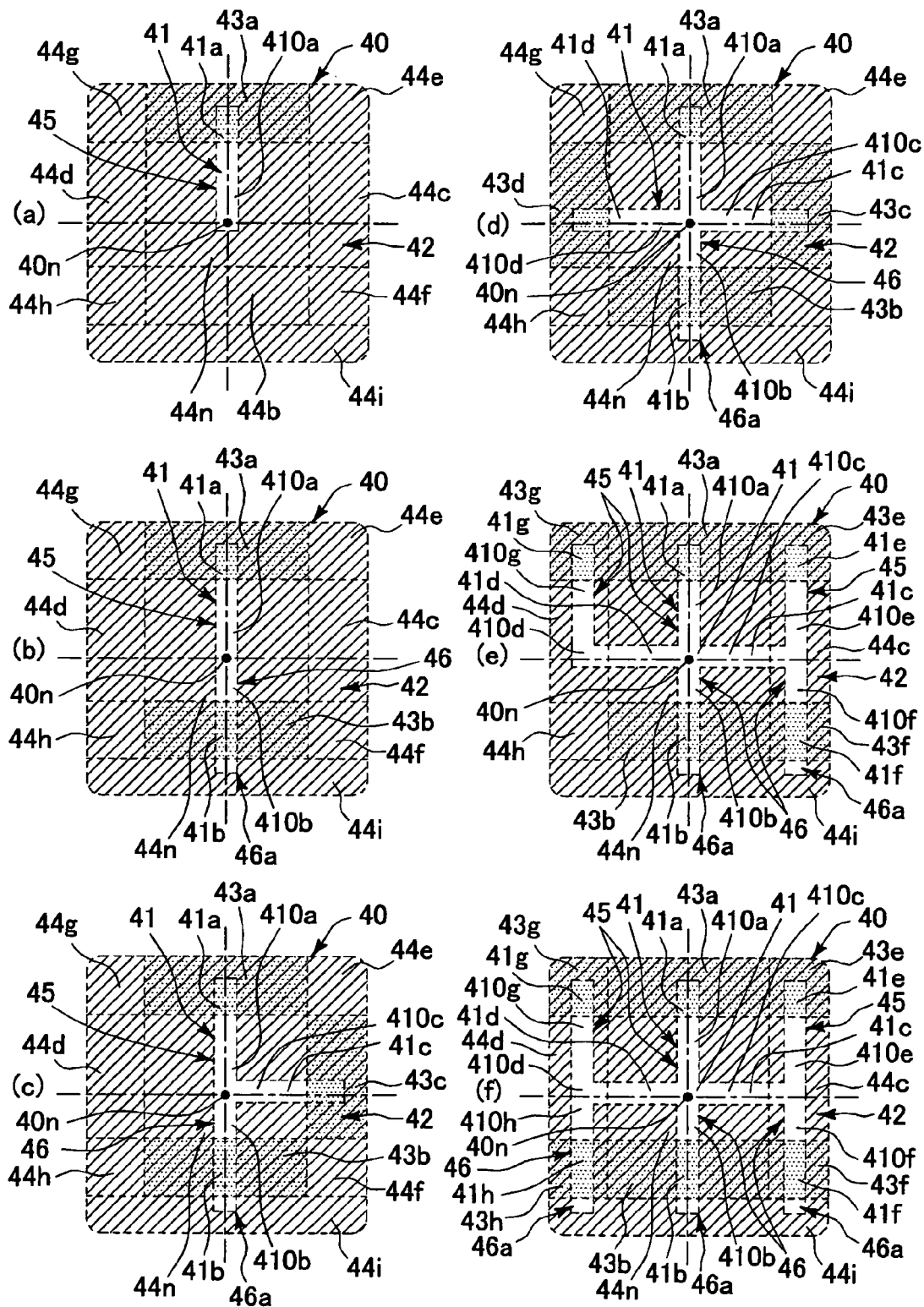
FIG. 34 simply shows different two-dimensional operation surfaces from those of FIGS. 26 and 33 in the discrete mode as the modification 2.

Settings of the unique paths 410 to the selectable areas 43 are not limited to the above settings. For example, as shown in FIG. 33, the common path 47 can be disposed to a position passing through the neutral position 40*n* of the reaction force on the two-dimensional operation surface 40. Since the joystick type controller 21, when not applied with the reaction force, is always disposed in the neutral position 40*n*, the position indication operations to the selectable areas 43 become generally easy. As shown in FIG. 34, a non-selectable area 46*a* not receiving the position input is defined on the downward operation path 46 in such a form as to extend further downward from the corresponding selectable area 43. A length (operation stroke amount) of the downward operation path 46 and non-selectable path 46*a* is the same as the upward operation path 45 disposed vertically symmetrical thereto (modification 2).

Figure 35:
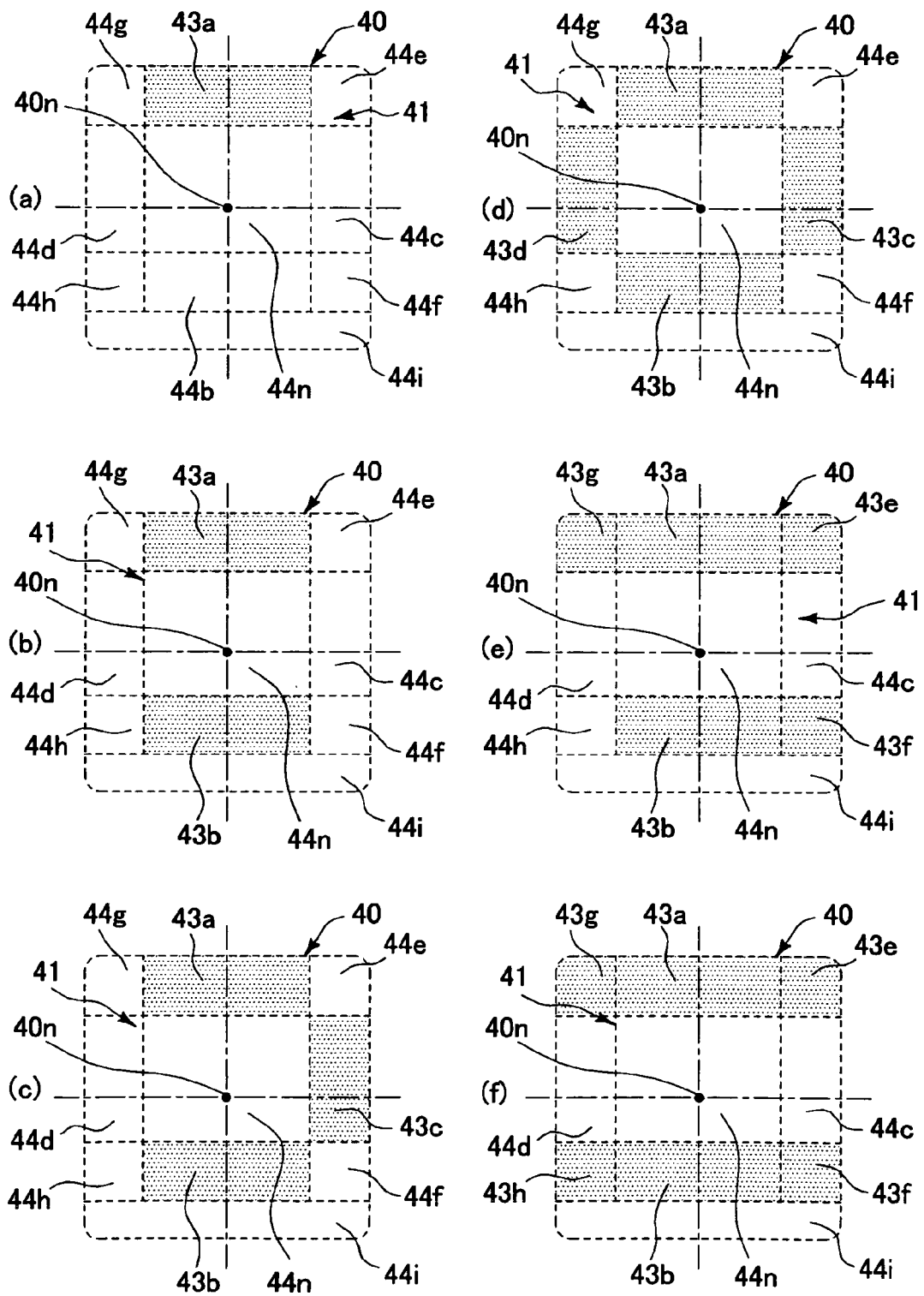
FIG. 35 simply shows two-dimensional operation surfaces in the arbitrary mode corresponding to the embodiments of FIGS. 33 and 34 as the modification 2.

The arbitrary mode in the modification 2 of FIGS. 33 and 34 may be defined as shown in FIG. 25, but as shown in FIG. 35, the arbitrary mode may have a vertically asymmetric form reflecting the arrangement form of the selectable areas 43 in the discrete mode. In this case, the operation restriction areas 42 may include a non-selectable area 44*i*.

In the above modification 1 where the discrete mode is set as shown in FIG. 26, the neutral position 40*n* may be disposed under a geometric center position such that the common path 47 passes through the neutral position 40*n* of the reaction force on the two-dimensional operation surface 40.

A modification 3 is explained below. Difference between the above embodiments and the modification 3 is explained.

Figure 36:
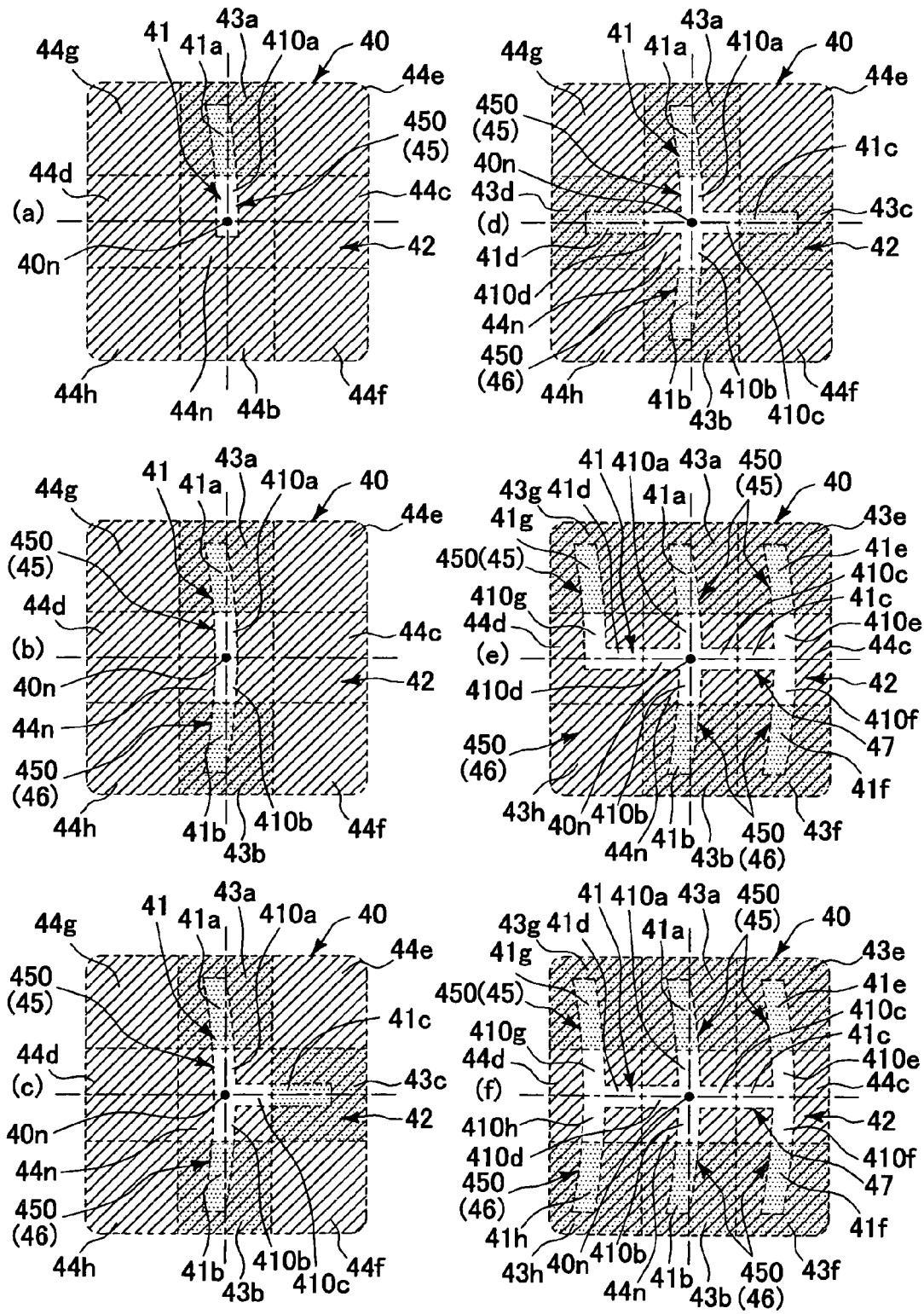
FIG. 36 simply shows two-dimensional operation surfaces in the discrete mode as a modification 3.

In the modification 3, six arrangement forms as shown in FIG. 36 are defined in the discrete mode. Accordingly, since the arrangement forms of the selectable areas 43 are defined by the number, the user memorizes the arrangement forms easily.

In the modification 3, the whole of the unique paths 410 (410A to 410H) has vertical paths 450 extending in the vertical operation direction of the haptic device 1 on the two-dimensional operation surface 40 in the discrete mode. At least the vertical paths 450 have curved shapes around the base knuckle disposed to the base of the thumb performing operations. When the haptic device 1 is provided on the steering wheel 2 as described above, the vertical operations by the thumb trace the curved tracks around the base knuckle of the thumb. In this structure, the vertical paths 450 in the discrete mode have the curved tracks, permitting smooth operations. In the modification 3, the multiple vertical paths 450 are provided on the two-dimensional operation surface 40, and all of the vertical paths 450 have curved shapes. Accordingly, guide operations on all the vertical paths can be performed smoothly.

The whole of the unique paths 410 including the curved vertical paths 450 includes the common path 47 which extends in the lateral direction of the haptic device 1 and is shared by the multiple unique paths 410 on the two-dimensional operation surface 40. The vertical paths 450 having the curved shapes intersect the common path 47. The common path 47 permits the whole of the unique paths 410 to have a simple shape.

The common path 47 in the modification 3 is defined as a single on the two-dimensional operation surface 40, all the vertical paths 450 are connected to the common path 47. The single common path 47 permits the whole of the unique paths 410 to have a simpler shape.

The curved vertical path 450 on the two-dimensional operation surface 40 may be either of the upward operation path 45 guiding the upward operation of the haptic device 1 toward the corresponding selectable area 43 or the downward operation paths 46 guiding the downward operation of the haptic device 1 toward the corresponding selectable area 43. In the modification 3, the upward operation paths 45 and downward operation paths 46 are directly connected to the common path 47 and the selectable areas 43 corresponding thereto along the curved shapes thereof. Accordingly, main operations to the selectable areas 43 are vertical, and secondary operations to the selectable areas 43 are lateral.

In the modification 3, there are multiple setting patterns, in all of which a starting position of the common path 47 is defined as the same position on the two-dimensional operation surface 40 ((c) to (f) portions of FIG. 36). The starting points of the upward operation paths 45 and downward operation paths 46 on the common path 47 are predetermined. The upward operation paths 45 and downward operation paths 46 are connected only to the predetermined starting points (see (e) and (f) portions of FIG. 36: the starting points in the modification 3 are in the left edge, center, and right edge on the common path, from which the upward operation paths 45 and the downward operation paths 46 can extend). In some setting patterns, the starting points of the upward operation paths 45 and downward operation paths 46 are defined at one or both of the lateral edges of the laterally extending common path 47, but the upward operation paths 45 and downward operation paths 46 do not extend from the starting points, and the edges are defined as the selectable areas 43 (see (c) and (d) portions of FIG. 36).

Figure 37:
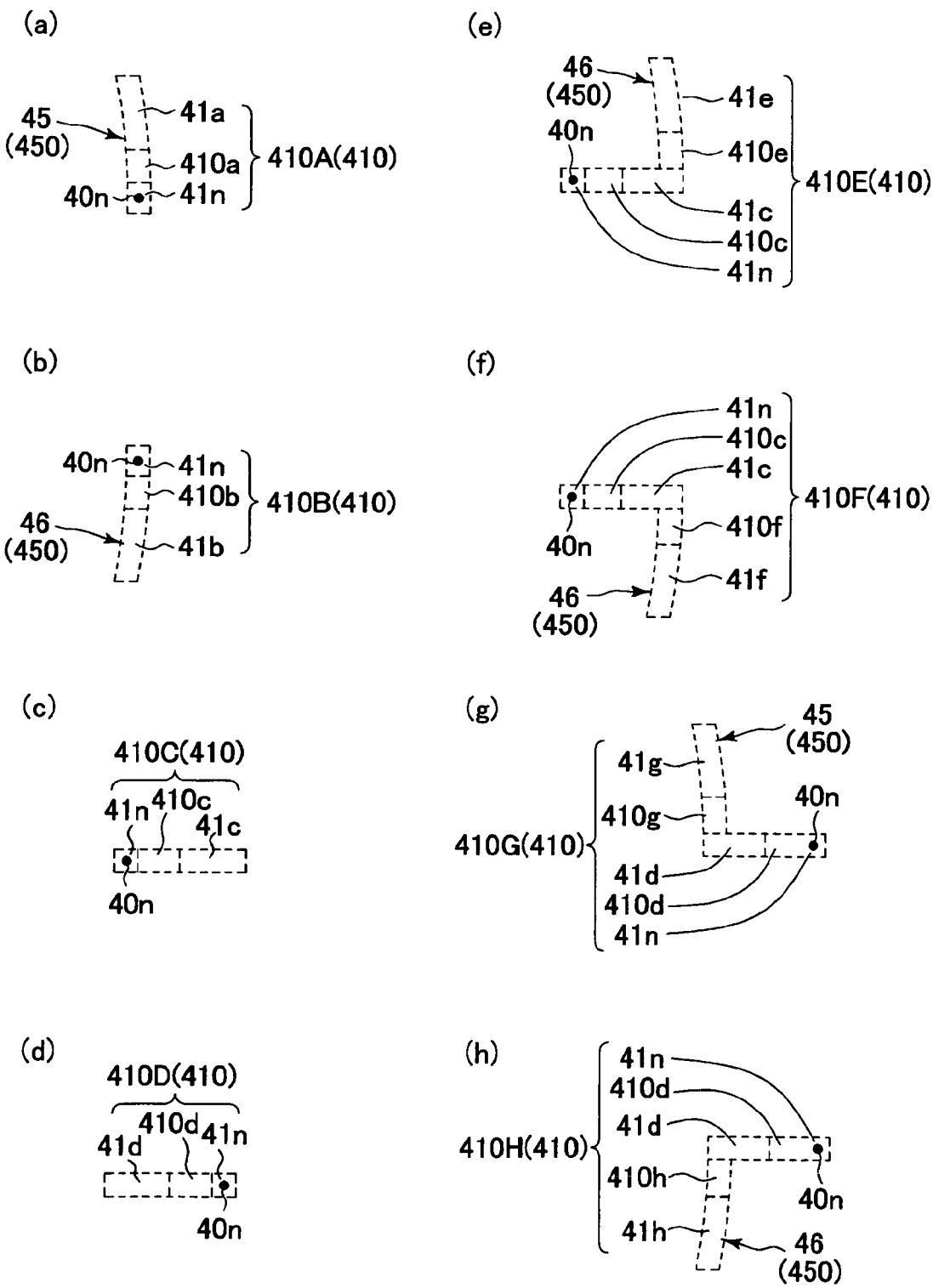
FIG. 37 shows unique paths in the modification 3.

The unique paths 410 in the modification 3 are as shown in FIG. 37. The unique path 410A toward the selectable area 43*a* is composed of the neutral area 41*n* including the neutral position 40*n* and the path 410*a*. The unique path 410B toward the selectable area 43*b* is composed of the neutral area 41*n* and the path 410*b*. The unique path 410C toward the selectable area 43*c* is composed of the neutral area 41*n* and the path 410*c*. The unique path 410D toward the selectable area 43*d* is composed of the neutral area 41*n* and the path 410*d*. The unique path 410E toward the selectable area 43*e* is composed of the neutral area 41*n* and the paths 410*c*, 41*c*, and 410*e*. The unique path 410F toward the selectable area 43*f* is composed of the neutral area 41*n* and the paths 410*c*, 41*c*, and 410*f*. The unique path 410G toward the selectable area 43*g* is composed of the neutral area 41*n* and the paths 410*d*, 41*d*, and 410*g*. The unique path 410H toward the selectable area 43*h* is composed of the neutral area 41*n* and the paths 410*d*, 41*d*, and 410*h*.

Figure 41:
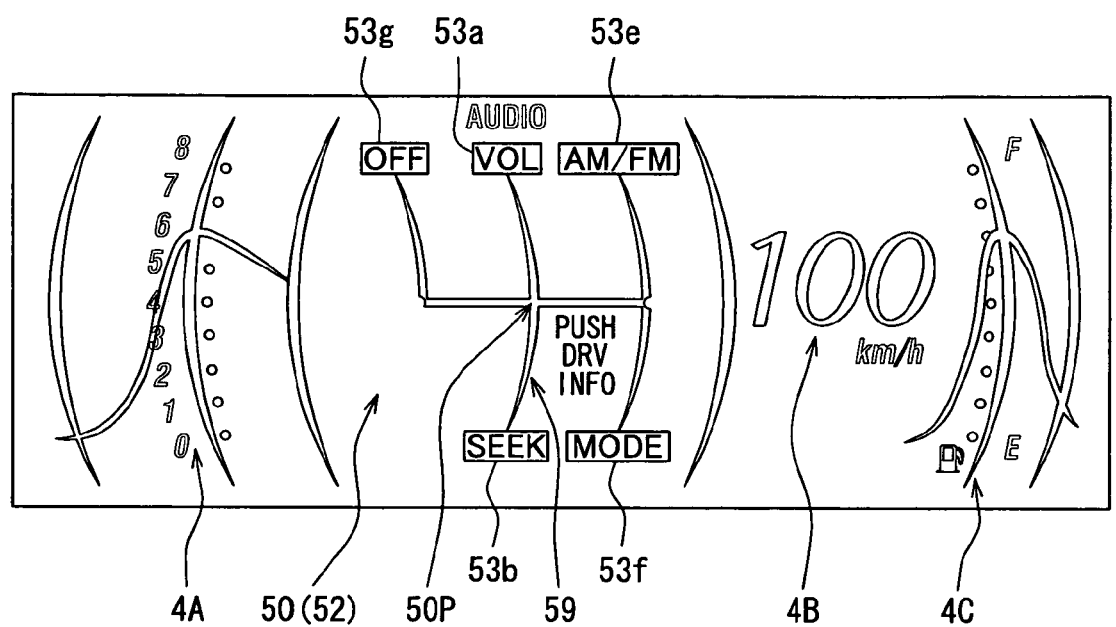
FIG. 41 is an example of a screen display by a meter display of the modification 3.

In the modification 3, the vertical paths 450 of the unique paths 410 have curved shapes. On the display 202, as shown in FIG. 41, graphics of the vertical paths 450 toward the selectable areas 43 are displayed reflecting the curved shapes. Accordingly, the driver can perform the operations even on the unique paths 410 having the curved shapes without confusion by looking at only the graphics. These graphics are superior in design to simple, linear ones.

The display 202 in the modification 3 is constituted in FIG. 1 as a meter display having a display portion 4 in the back side of the steering wheel 2 in front of the driver's seat. The screen 50 (screens 51 and 52) are displayed between a tachometer 4A and a speedometer 4B in a form as shown in FIG. 41. However, the screen 52 in FIG. 41 is displayed in a form where a position indication (pointer) 50P emits light on a unique path corresponding portion 59. A fuel meter 4C also is displayed on the right of a digital display type speedometer.

Figure 38:
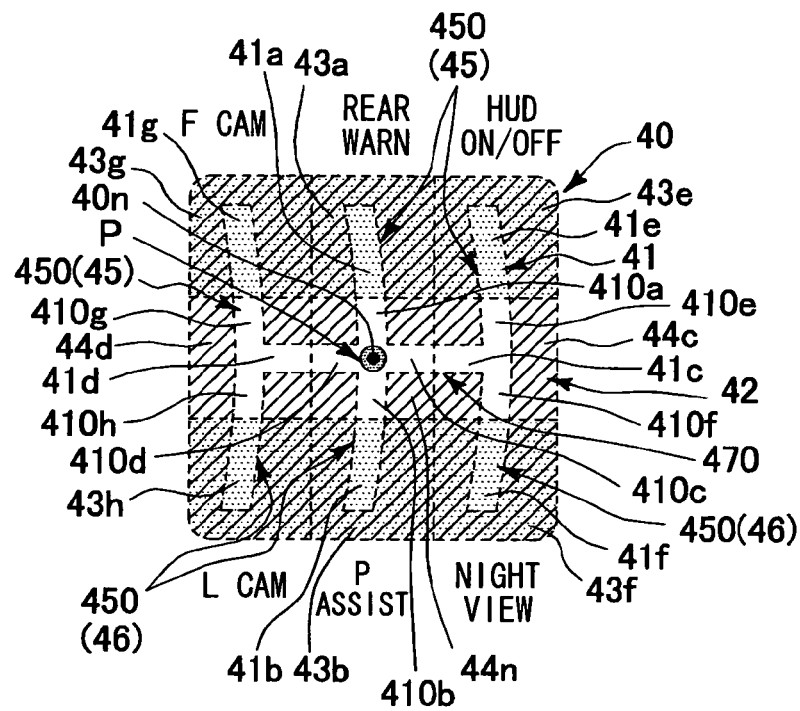
FIG. 38 explains setting patterns for the control indications as the modification 3.
Figure 38:
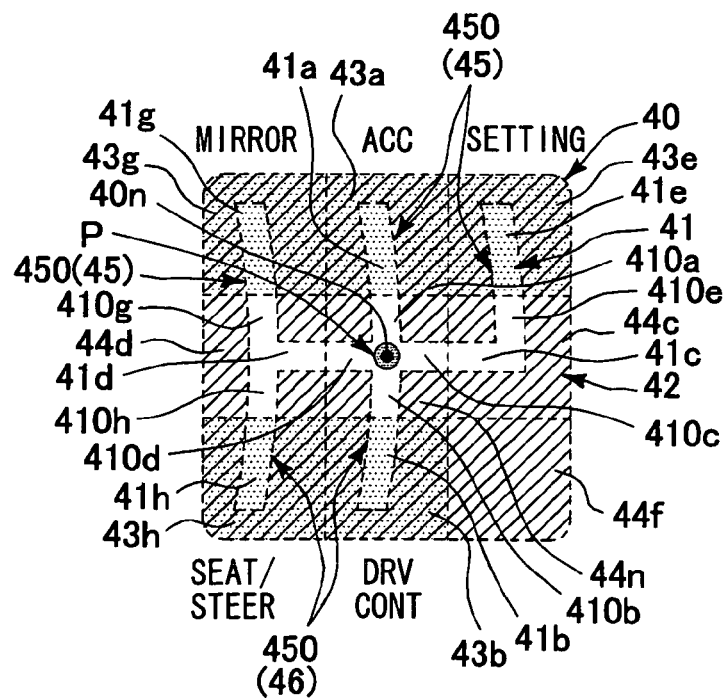

The setting patterns in modification 3 are set to collect only control contents assigned to the selectable areas 43 and related to each other. Specifically, the setting patterns for control indications are such that only control contents of the same external device 201 or same device function are collected and assigned to the selectable areas 43. Specifically, as shown in (a) portion of FIG. 38, a pattern in which only the "view assist functions" such as the "front camera," "rear camera," "head-up display (HUD)," "side camera," "parking assist function," "night view assist function," and "rear-lateral warning function" are assigned to the selectable areas 43*a*, 43*b*, 43*e*, 43*f*, 43*g*, and 43*h* is provided. As shown in (b) portion of FIG. 38, a pattern in which only vehicular functions are assigned to the selectable areas 43*a*, 43*b*, 43*e*, 43*g*, and 43*h* is provided. FIG. 38 shows the display in the discrete mode, but this display is the same as that in the arbitrary mode.

A structure of the setting pattern for switching the setting patterns in the modification 3 embodiment includes a lower hierarchy setting pattern (for control indications) in which control indication contents of the same external device 201 or the same function of the external device 201 are assigned to the selectable areas 43 and a control indication content corresponding to the position input is performed, and an upper hierarchy setting pattern (for changing setting patterns) in which lower hierarchy setting patterns of different external devices 201 or device functions are assigned to the selectable areas 43 to change setting patterns. That is, the changing form of the hierarchical pattern selection is such that a device or function to be used is selected in the upper setting pattern and a concrete content to be used in the device or function selected in the upper setting pattern is selected in the lower setting pattern.

Figure 39:
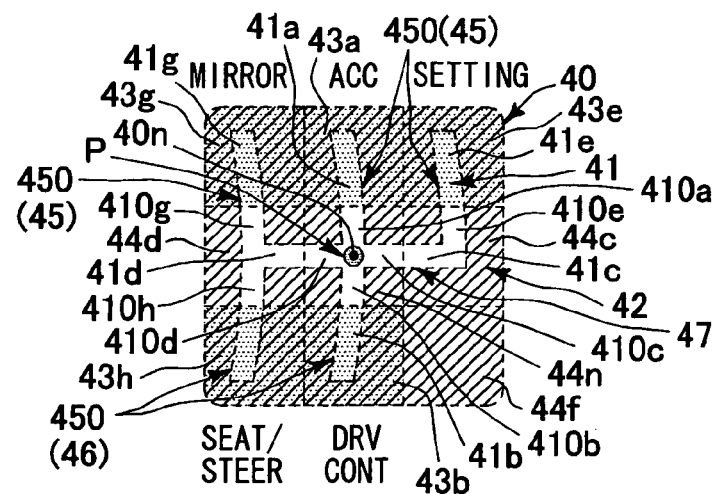
FIG. 39 explains movements between hierarchies of the setting patterns as the modification 3.
Figure 39:
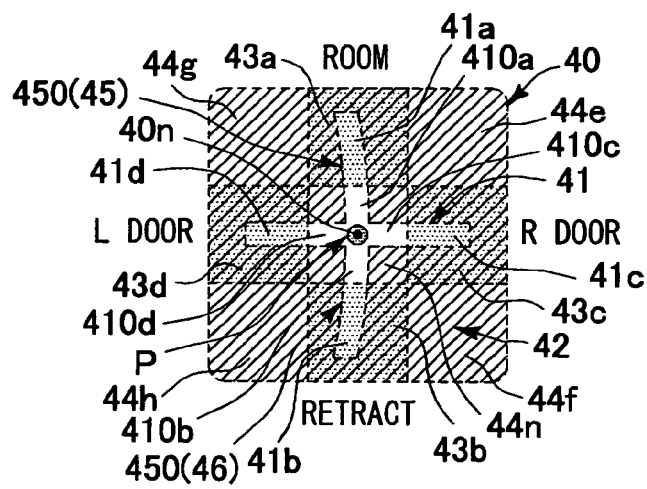
Figure 39:
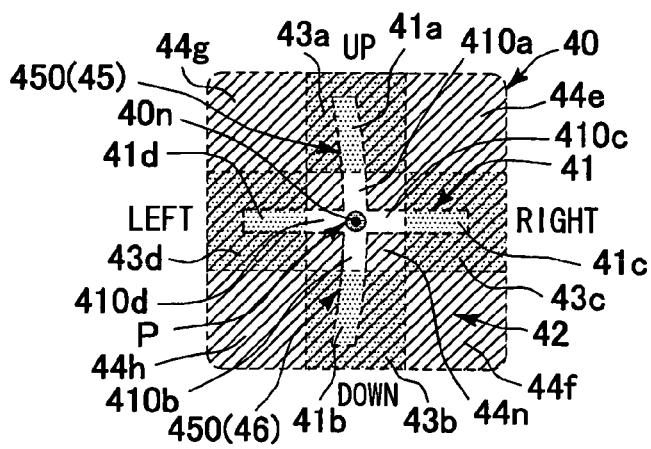

The concrete example is shown in FIG. 39. The (a) portion of FIG. 39 shows the upper hierarchy setting pattern for selecting the external device 201 or its device function to be used. When the "mirror position change function" is selected by the position input in the upper setting pattern, the upper setting pattern changes to the lower hierarchy setting pattern. In this lower hierarchy setting pattern, control contents related to the device or device function selected on the upper hierarchy are collected. In the modification 3, as shown in (b) portion of FIG. 39, the lower setting pattern includes control contents related to the "mirror position change function" for selecting which mirror is changed. When a mirror to be changed is selected in this setting pattern by the position input, the current lower hierarchy setting pattern changes to a further lower hierarchy setting pattern. Also in this further lower hierarchy setting pattern, control contents related to the device or device function selected on the upper hierarchy are collected. In the modification 3, as shown in (c) portion of FIG. 39, the setting pattern includes control contents related to the mirror selected in (b) portion of FIG. 39 to determine whether the mirror is inclined in the upward, downward, left, or right direction. That is, in the setting pattern of (c) portion of FIG. 39, even when the position input is performed to each of the selectable areas 43, the setting pattern is not changed. Instead, a control indication content of the selectable area 43 which has received the position input is performed. An angle of the mirror is changed by a predetermined angle by one selection (position input). FIG. 39 is shown in the discrete mode, the explanation is applied also in the arbitrary mode.

Also in this case, as well as in the modification 1, it is preferable to provide that the hierarchy return operation portion for returning from the upper hierarchy to the lower hierarchy.

Also in modification 3, in the discrete mode, to restrict the position input to the position input restriction areas 43, at least part of the unique paths 410 of the position input restriction areas 43 are changed from the operation permission areas 41 to the operation restriction areas 42. The change from the operation permission areas 41 to the operation restriction areas 42 is not performed on the unique paths 410 of the selectable areas 43 where the position input is not restricted.

Specifically, in a setting pattern for audio operation in which an audio operation screen shown in FIG. 11 is displayed, when the audio is turned OFF, the pointer P can be moved from the neutral area 41*n* to only the selectable area 43*a* having a control indication content of turning the audio ON/OFF as shown in (a) portion of FIG. 41. That is, all the unique paths 410 except the unique path 410A are changed to the operation restriction areas 42. On the other hand, as shown in (b) portion of FIG. 40, when the position input is performed to turn the audio ON, motions of the pointer P along all the unique paths 410 toward the selectable areas 43*a*, 43*b*, 43*e*, 43*f*, 43*g*, and 43*h* are made possible.

Figure 40:
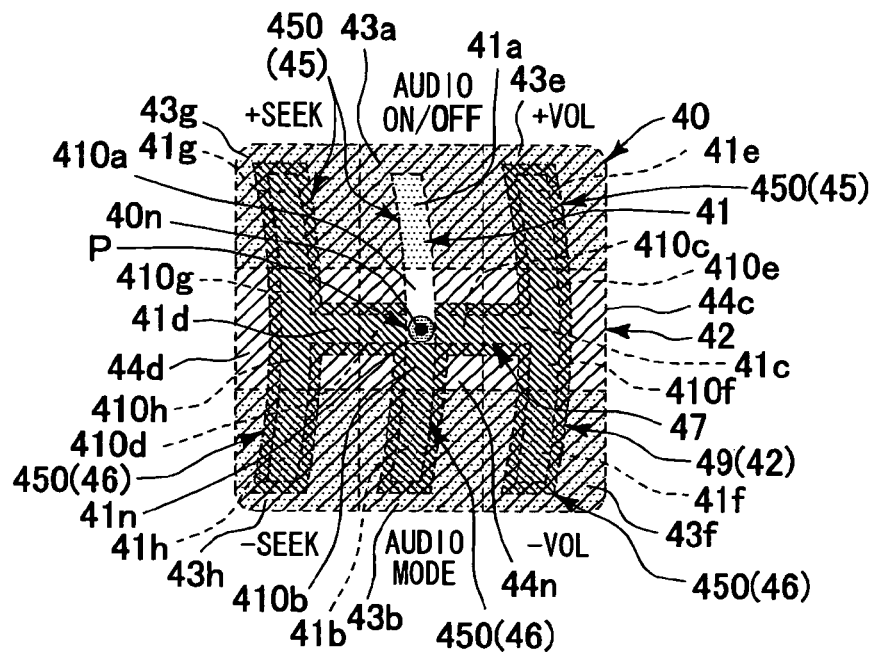
FIG. 40 explains the setting patterns in which operation restrictions are performed in accordance with the position input as the modification 3.
Figure 40:
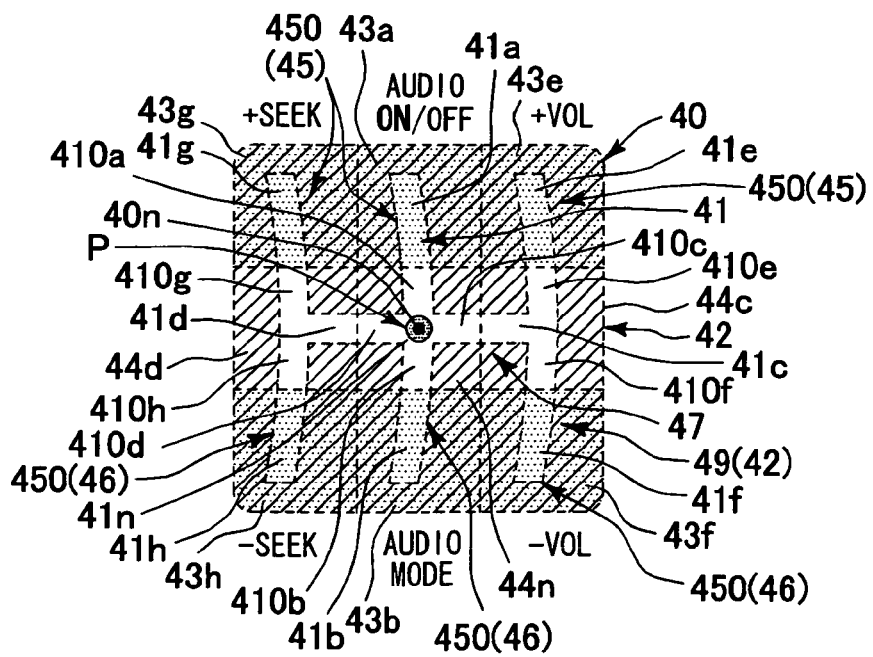

A numeral 49 in (a) portion of FIG. 40 is a portion visually and easily showing an area applied with the reaction force of the operation prevention level at which the position input by the operation input device 1 is impossible when the audio is turned from ON to OFF in the discrete mode. That is, in (a) portion of FIG. 40, the areas 49 include operation permission areas 41*n*, 41*b*, 410*b*, 41*c*, 410*c*, 41*d*, 410*d*, 41*e*, 410*e*, 41*f*, 410*f*, 41*g*, 410*g*, 41*h*, and 410*h* in the ON state of the audio, and these areas are changed to the operation restriction areas 42 in the discrete mode. The areas 49 are actually the operation restriction target areas which change to the operation restriction areas 42 in the discrete mode.

The operation restriction target areas 49 are displayed in the display 202 in such a form as to be capable of recognizing that the change from part of the operation permission areas 41 to the operation restriction areas 42 in the discrete mode is temporal. In (a) portion of FIG. 40, in part of the areas 49 in which the reaction force may change in the discrete mode, the operation permission areas 41*n*, 41*b*, 410*b*, 41*c*, 410*c*, 41*d*, 410*d*, 41*e*, 410*e*, 41*f*, 410*f*, 41*g*, 410*g*, 41*h*, and 410*h* before the change can be recognized visually even after the change to the operation restriction areas 42. In (a) portion of FIG. 40, when the operation restriction target areas 49 are the operation permission areas 41, the operation restriction target areas 49 are displayed in the same way as the other operation permission areas 41. When the operation restriction target areas 49 change to the operation restriction areas 42, the operation restriction target areas 49 are displayed in a different way from the operation permission areas 41 before the change and from the other operation restriction areas 42. Accordingly, when the areas 49 change to the operation restriction areas, the user can easily recognize that the change is temporal. In (a) portion of FIG. 40, when the operation restriction target areas 49 are changed to the operation restriction areas 42, the operation restriction target areas 49 are displayed in a different way from the operation permission areas 41 before the change and from the other operation restriction areas 42 together with part of the operation restriction areas 42 around the operation restriction areas 49. The temporary change is further highlighted.

Figure 42:
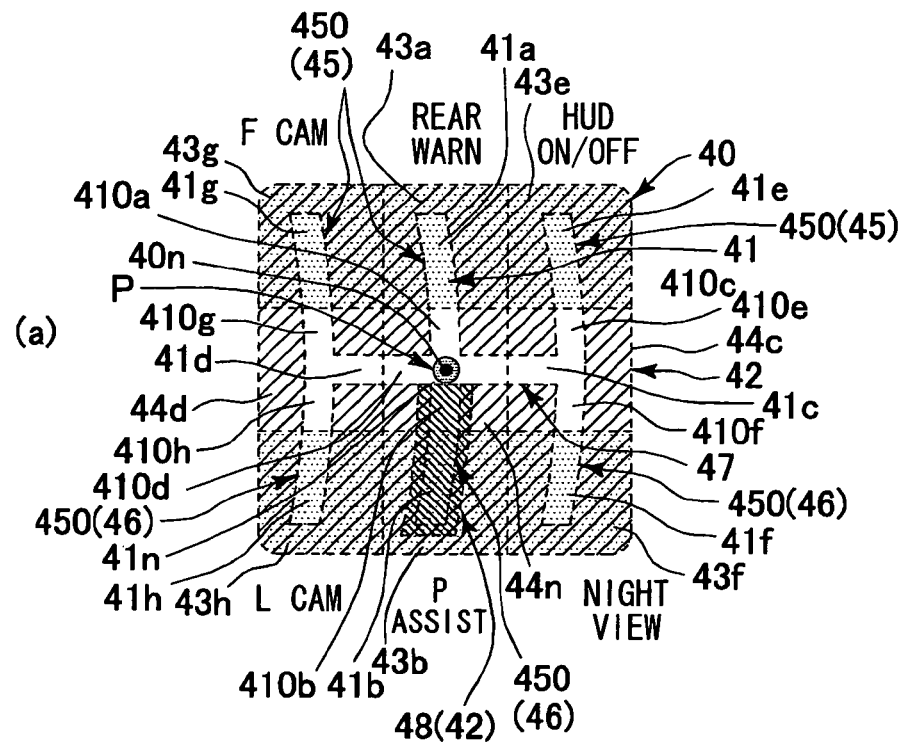
FIG. 42 is a first diagram simply showing two-dimensional operation surfaces of the haptic device, the surface having the selectable areas, part of which is restricted from receiving input in accordance with a certain input restriction performing condition as a modification 3'.
Figure 42:
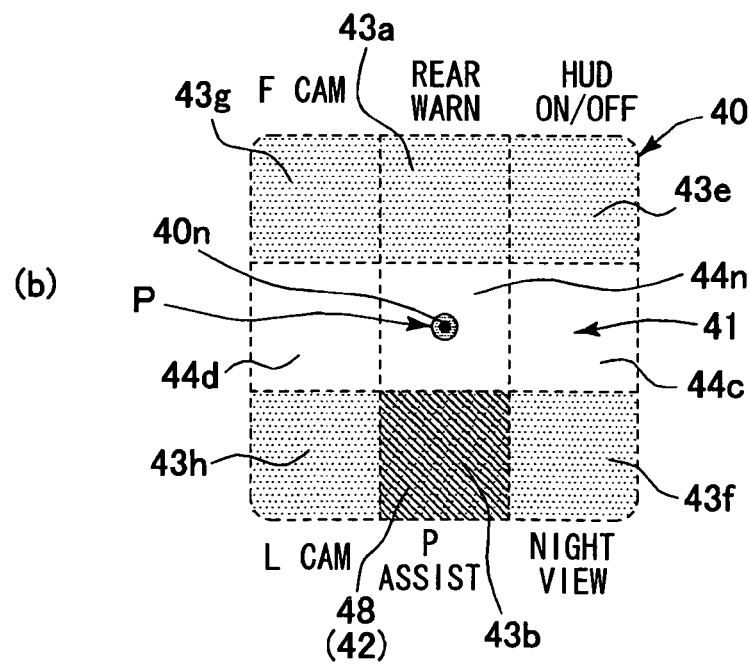

In the modification 3, as the input restriction target areas, the selectable areas 43 to which control contents related to the external device or its device function related to the reverse travel of the vehicle are defined. Then, provided that the shift position is not in the reverse (input restriction performing condition), the position input may be restricted. The device function related to the reverse of the vehicle includes the parking assist function such as a back monitor. As shown in FIG. 42, the position input to the corresponding selectable area 43*b* can be restricted (modification 3').

Figure 43:
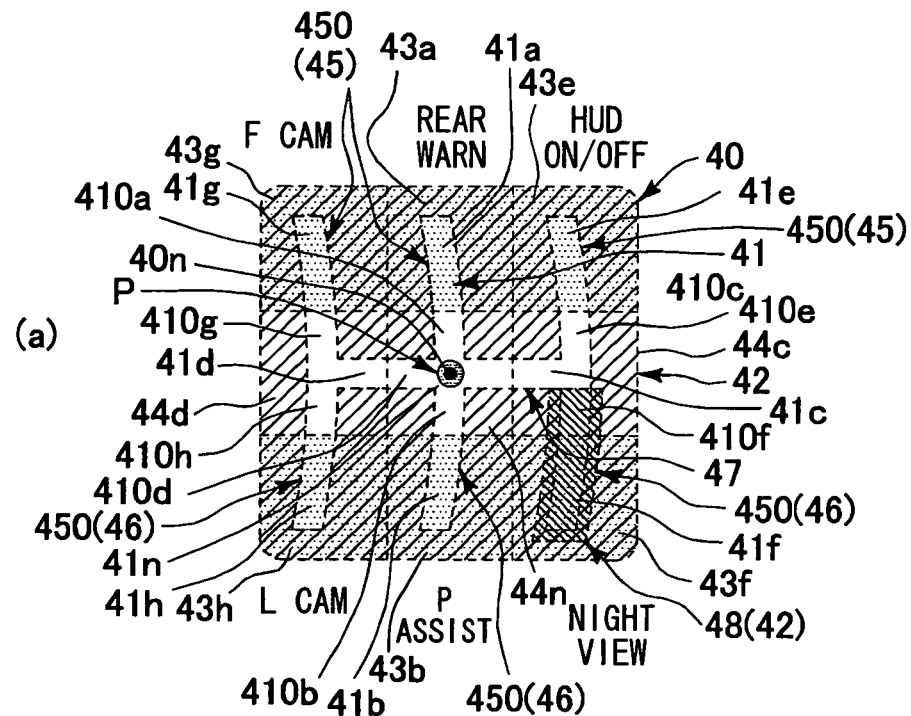
FIG. 43 is a second diagram simply showing two-dimensional operation surfaces of the haptic device, the surface having the selectable areas, part of which is restricted from receiving input in accordance with a certain input restriction performing condition as the modification 3'.
Figure 43:
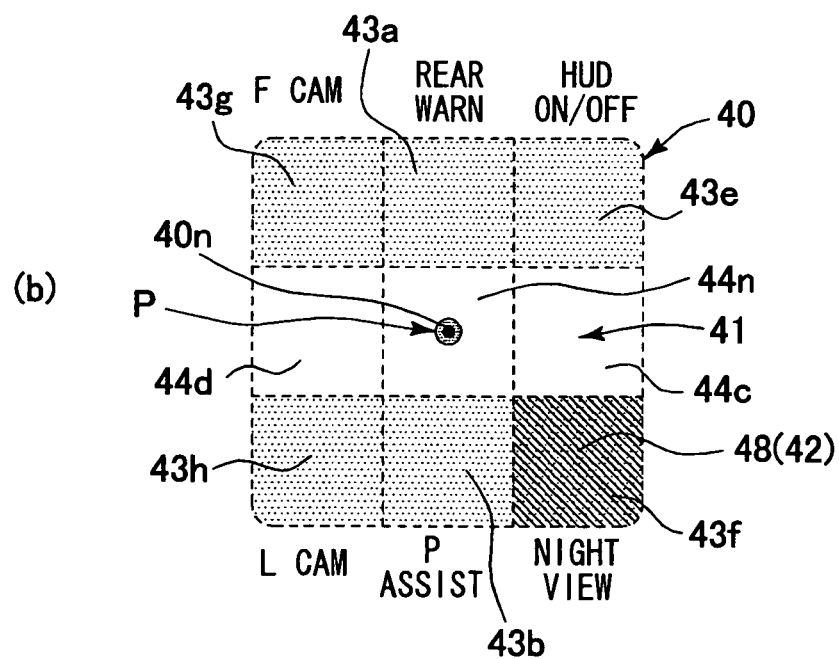

Lighting of the headlight can be defined as the above travel condition of the vehicle. Therefore, for example, provided that the headlight is not lighted (input restriction performing condition), the position input to the selectable area 43 to which a control content related to device function related to the night travel may be restricted. The device function related to the night travel includes the night view assist function such as a night vision. As shown in FIG. 43, the position input to the corresponding selectable area 43*f* can be restricted (modification 3').

In the above explanation, the haptic device 1 is provided on one of the right and left of the steering wheel 2. As shown in FIG. 20, the haptic device 1 may be provided on both of the right and left of the steering wheel 2 in the above reference position. Since different setting patterns can be set in the respective haptic devices 1 (1R, 1L) on both sides, more control contents can be operated. A positional relationship between the vertical paths 450 and the base knuckle corresponding to the vertical paths 450 are opposed laterally between the haptic devices 1 (1R, 1L). The curved shapes of the vertical paths 450 are opposite between the haptic devices 1 (1R, 1L). That is, the vertical paths 450 of the haptic device 1R have curved shapes around the base knuckle of the thumb of the corresponding hand, and the vertical paths 450 of the haptic device 1L have curved shapes around the base knuckle of the thumb of the corresponding hand. Accordingly, the smooth guide operation is possible in the haptic devices 1R and 1L. Portions of symbols provided with R correspond to the right haptic device, and portions of symbols provided with L correspond to the left haptic device.

Figure 50:
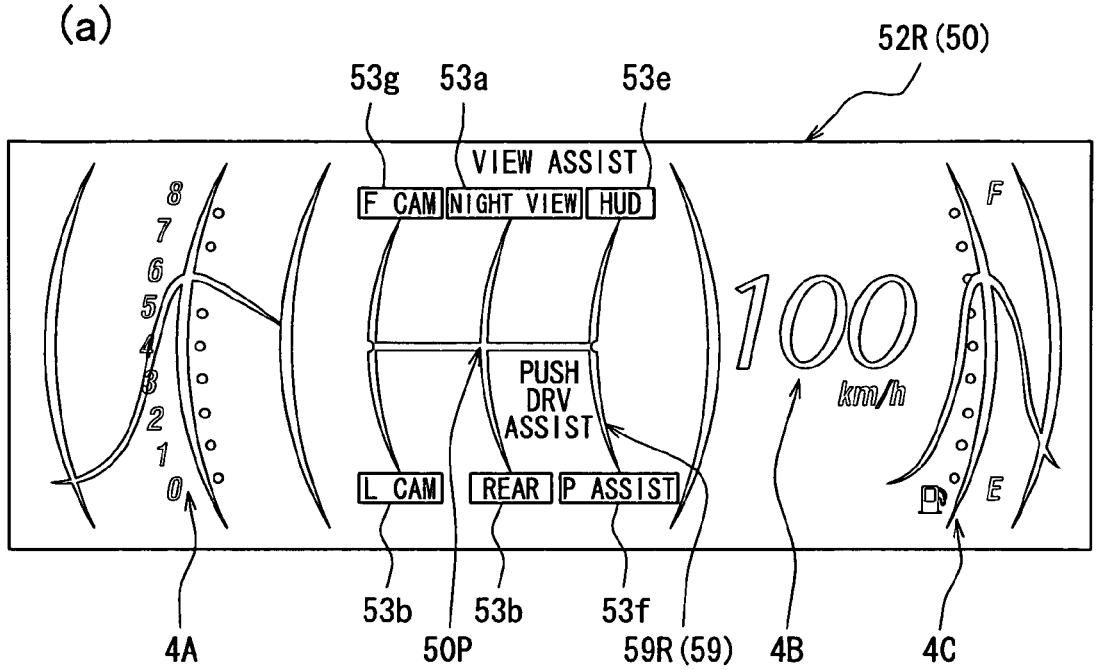
FIG. 50 is an example of screen displays of the display corresponding to the embodiment of the steering wheel mounting the haptic device of the present invention.
Figure 50:
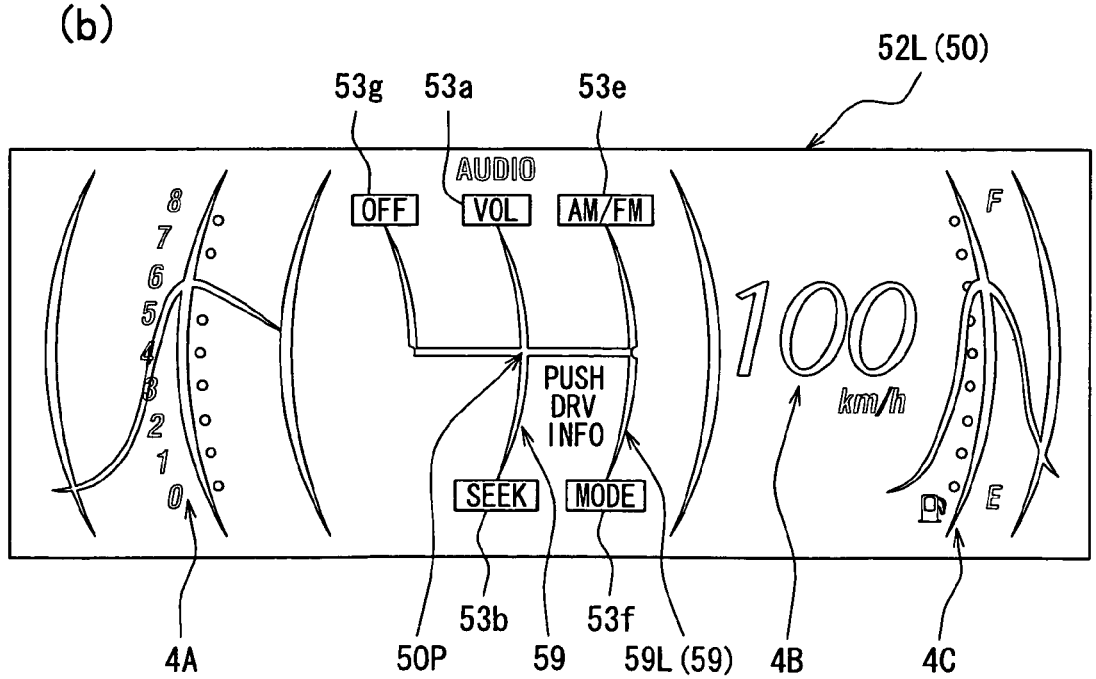

When the haptic devices 1R and 1L are provided on both the right and left of the steering wheel 2, as shown (a) and (b) portions of in FIG. 50, the display 202 can display graphics of both of the vertical paths 450 and 450 in different shapes reflecting the curved shapes. Difference among the directions of the curved shapes of the vertical paths 450 in the unique paths 410 of the haptic devices 1R and 1L can be recognized visually on the screen (display graphics 59R and 59L corresponding to the unique paths) and displayed characteristically in design.

In the above embodiment, the upward operation paths 45 and downward operation paths 46 forming the vertical paths 450 have the same shapes and the same strokes have the same shapes and the same strokes on the two-dimensional operation surface 40. The operation strokes of the upward operation paths 45 and downward operation paths 46 can be set to differ in accordance with distances from the base knuckle of the operating thumb.

Figure 44:
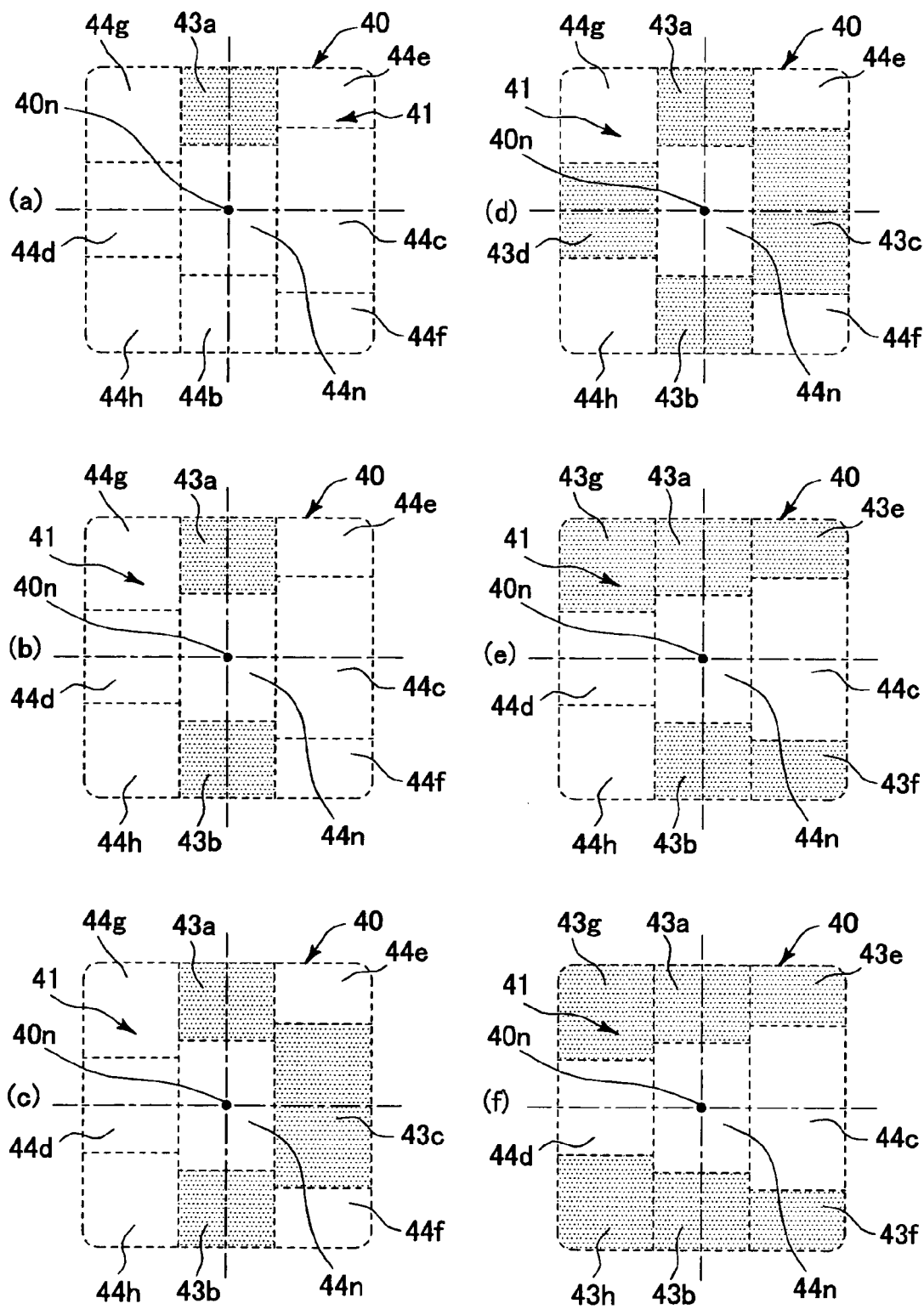
FIG. 44 simply shows different two-dimensional operation surfaces from those of FIG. 26 in the discrete mode as an area modification 1.
Figure 45:
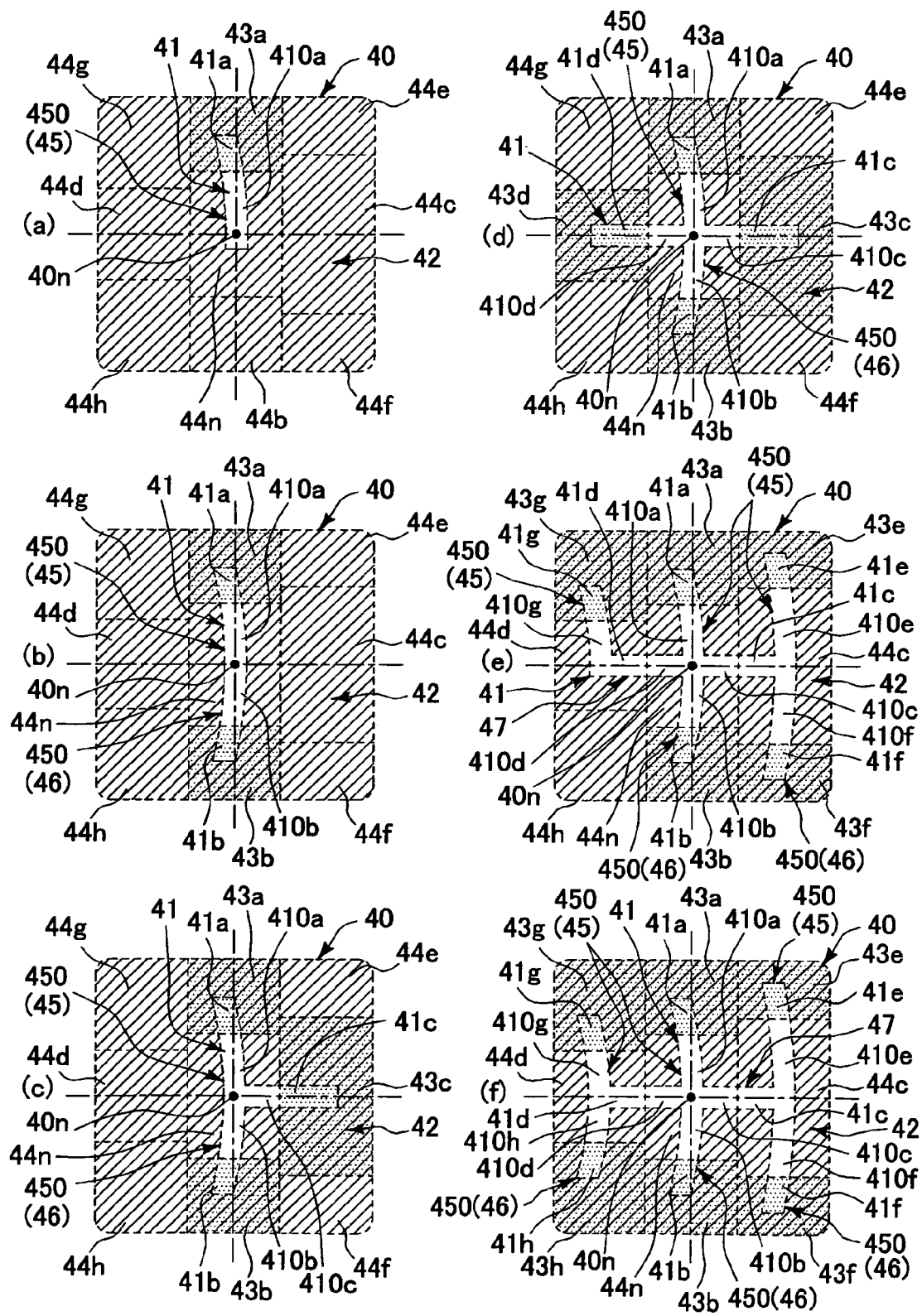
FIG. 45 simply shows the two-dimensional operation surfaces in the arbitrary mode in the embodiment of FIG. 44 as the area modification 1.
Figure 46:
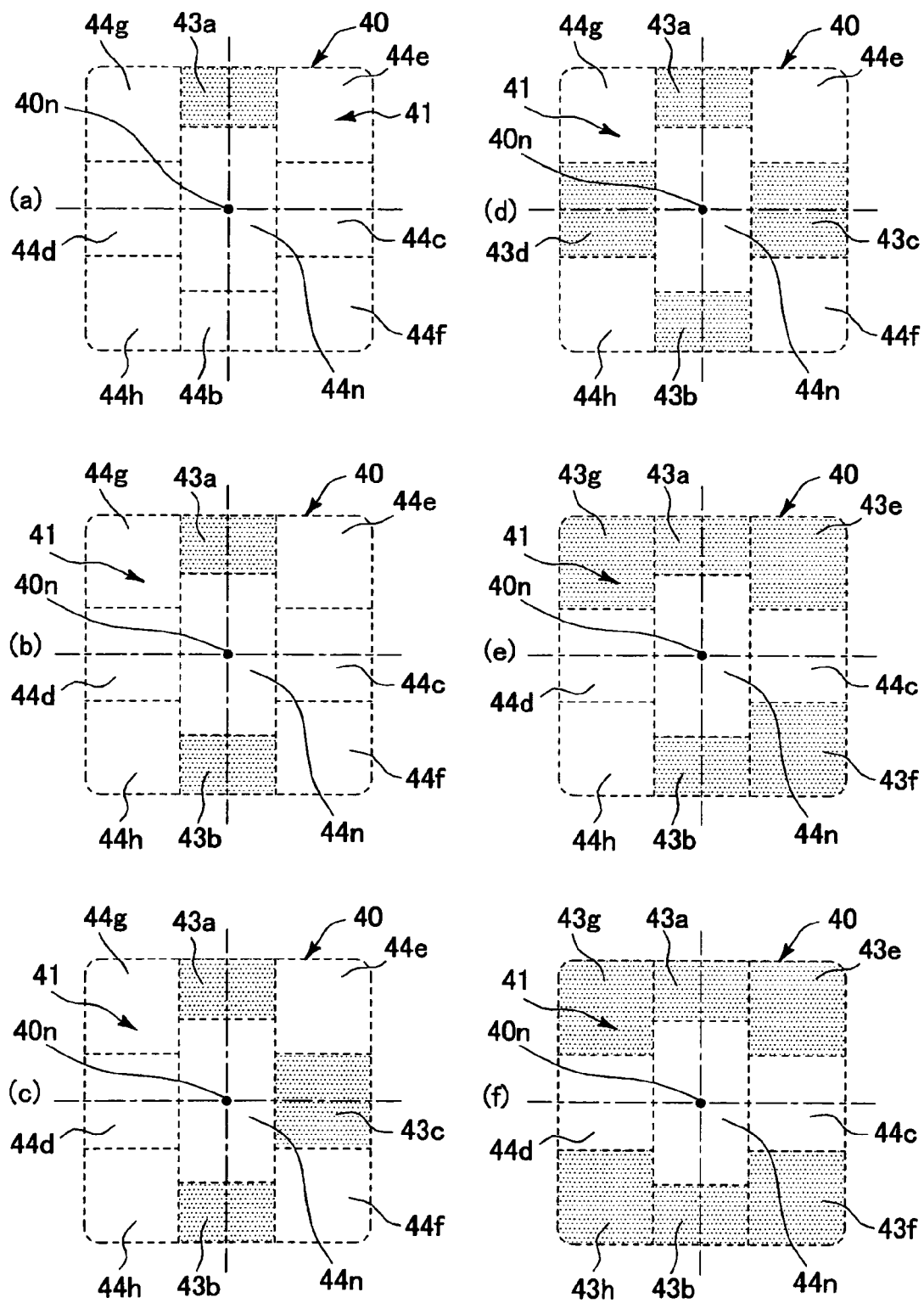
FIG. 46 simply shows different two-dimensional operation surfaces from those of FIGS. 26 and 44 in the discrete mode as an area modification 2.
Figure 47:
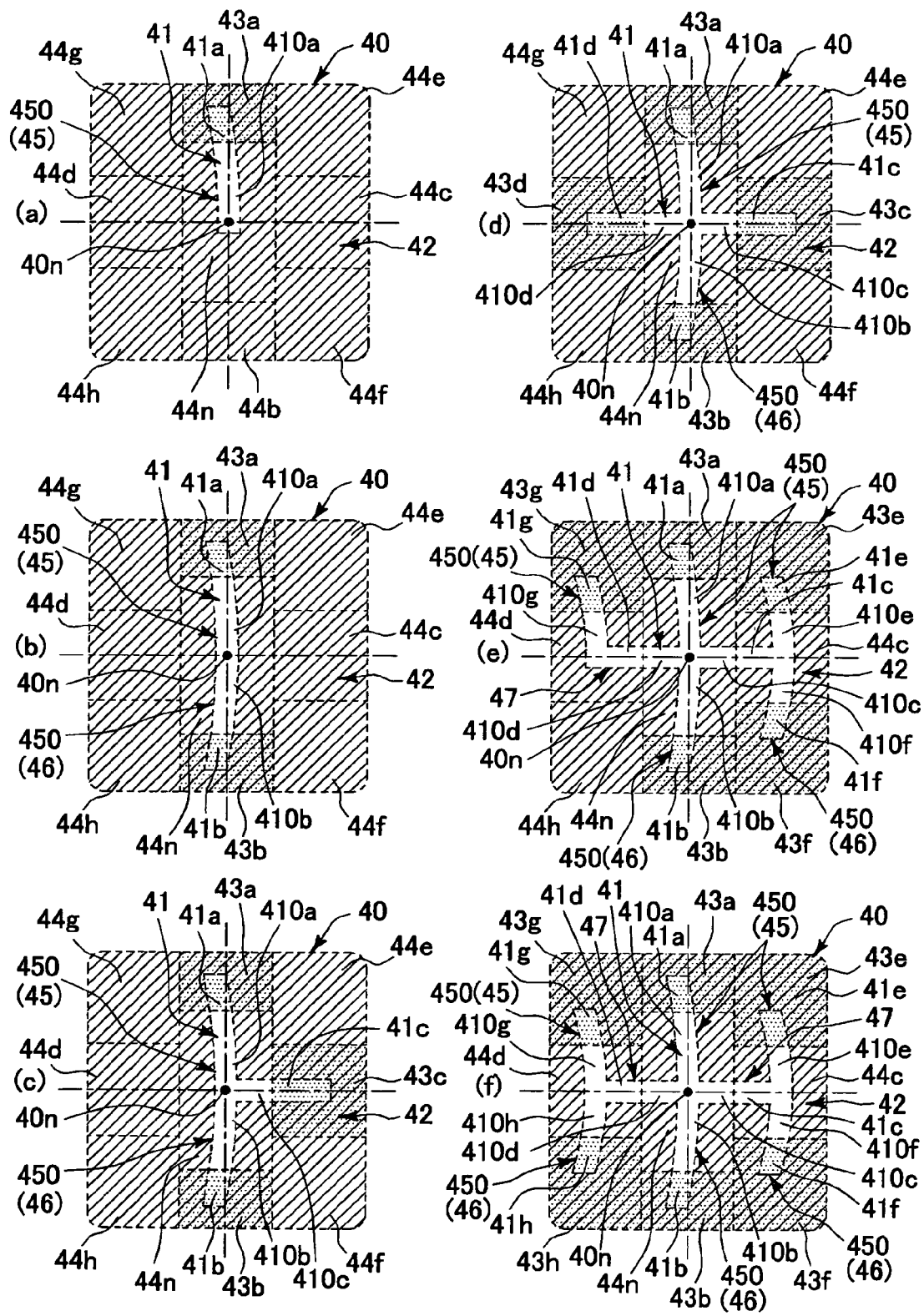
FIG. 47 simply shows the two-dimensional operation surface in the arbitrary mode in the embodiment of FIG. 46 as the area modification 2.
Figure 48:
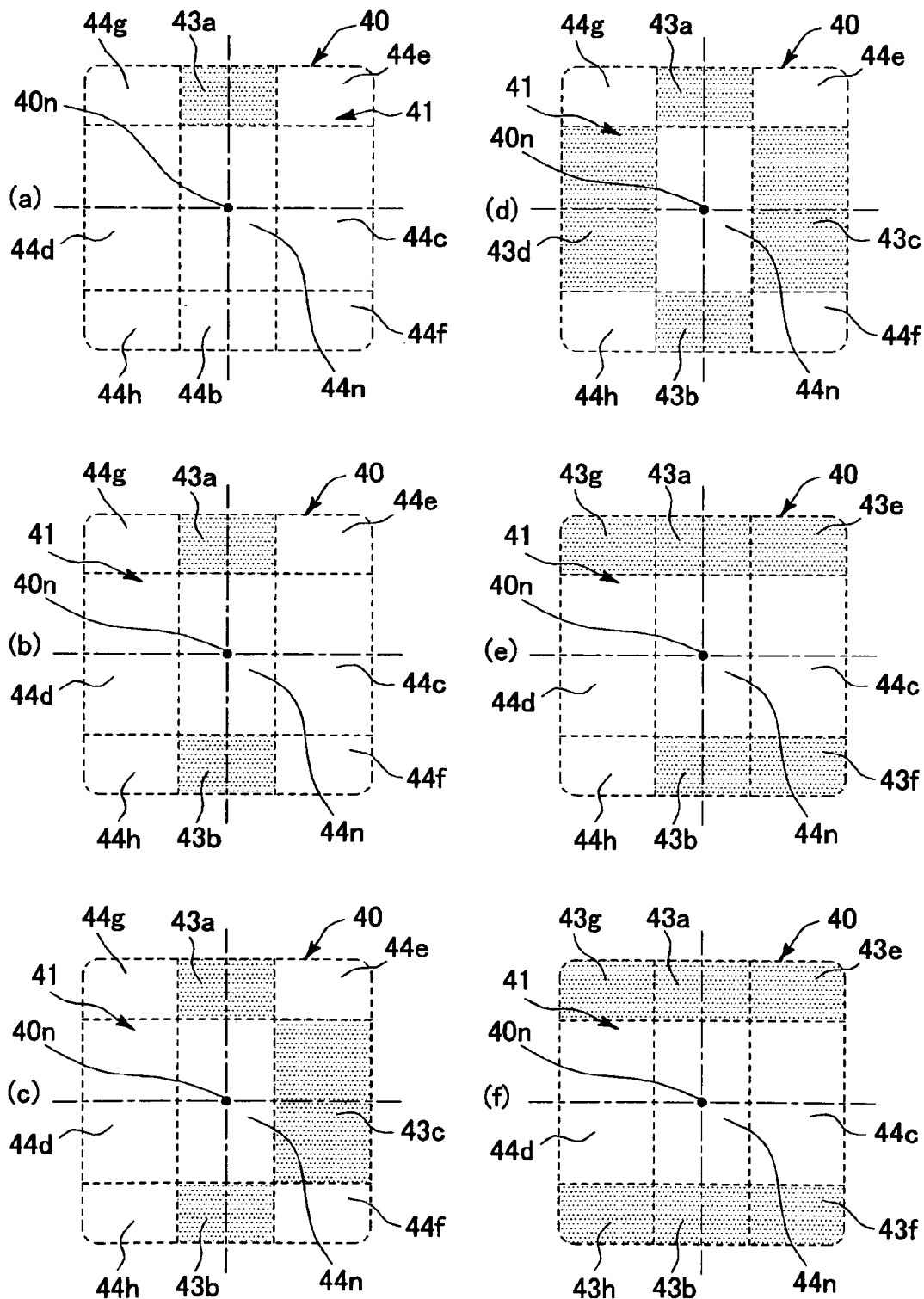
FIG. 48 simply shows different two-dimensional operation surfaces from those of FIGS. 26, 44, and 46 in the discrete mode as an area modification 3.

Specifically, as shown in FIG. 45, in the discrete mode, the operation stroke of each of the vertical paths 450 having the curved shapes can be defined to be longer as the distance from the base knuckle is longer on the two-dimensional operation surface 40 (area modification 1). Since the thumb operation is performed around the base knuckle of the thumb, it becomes more difficult to make the operation stroke long as the distance from the base knuckle is short. In FIG. 45, since the operation stroke is defined to be short in the side near the thumb base knuckle, the operation becomes easy. Since the operation stroke is defined to be long in the side away from the thumb base knuckle, generating less erroneous operations. The arbitrary mode in the embodiment having the discrete mode shown in FIG. 44 may be defined as shown in FIG. 45, but may have a vertically asymmetrical form reflecting the arrangement form of the selectable areas 43 in the discrete mode of FIG. 46 (area modification 2).

On the other hand, in the discrete mode, as shown in FIG. 45, in the vertical paths 450 having curved shapes, the vertical paths 450 disposed to the center portion can have longer operation strokes than those of the vertical paths 450 disposed outside the center portion in the lateral operation direction of the haptic device 1 on the two-dimensional operation surface 40. That is, the vertical paths 450 disposed to the left and right sides can be longer than the vertical paths 450 disposed in the center. It is preferable that the vertical paths 450 are longer in consideration of preventing erroneous operations. Since the operating range of the two-dimensional operation surface 40 of the haptic device 1 is fundamentally defined to be circular, the lengths are restricted. On the circular two-dimensional operation surface 40, the center vertical range is longer, and the vertical range closer to the left and right sides becomes short. In the above structure, the operation strokes of the vertical paths 450 can be set as vertically long as possible at the lateral positions.

In accordance with a vehicle speed of the user's vehicle acquired by the main controller 100, the vertical operation strokes of the vertical paths 450 can be set adjustable. For example, the operation strokes of the vertical paths 450 can be set longer as the acquired vehicle speed is higher. Since more concentration on the drive is needed as the vehicle speed becomes higher, troublesome operations become difficult. In this structure, as the vehicle speed becomes higher, the operation strokes become shorter, permitting easy operations.

Figure 49:
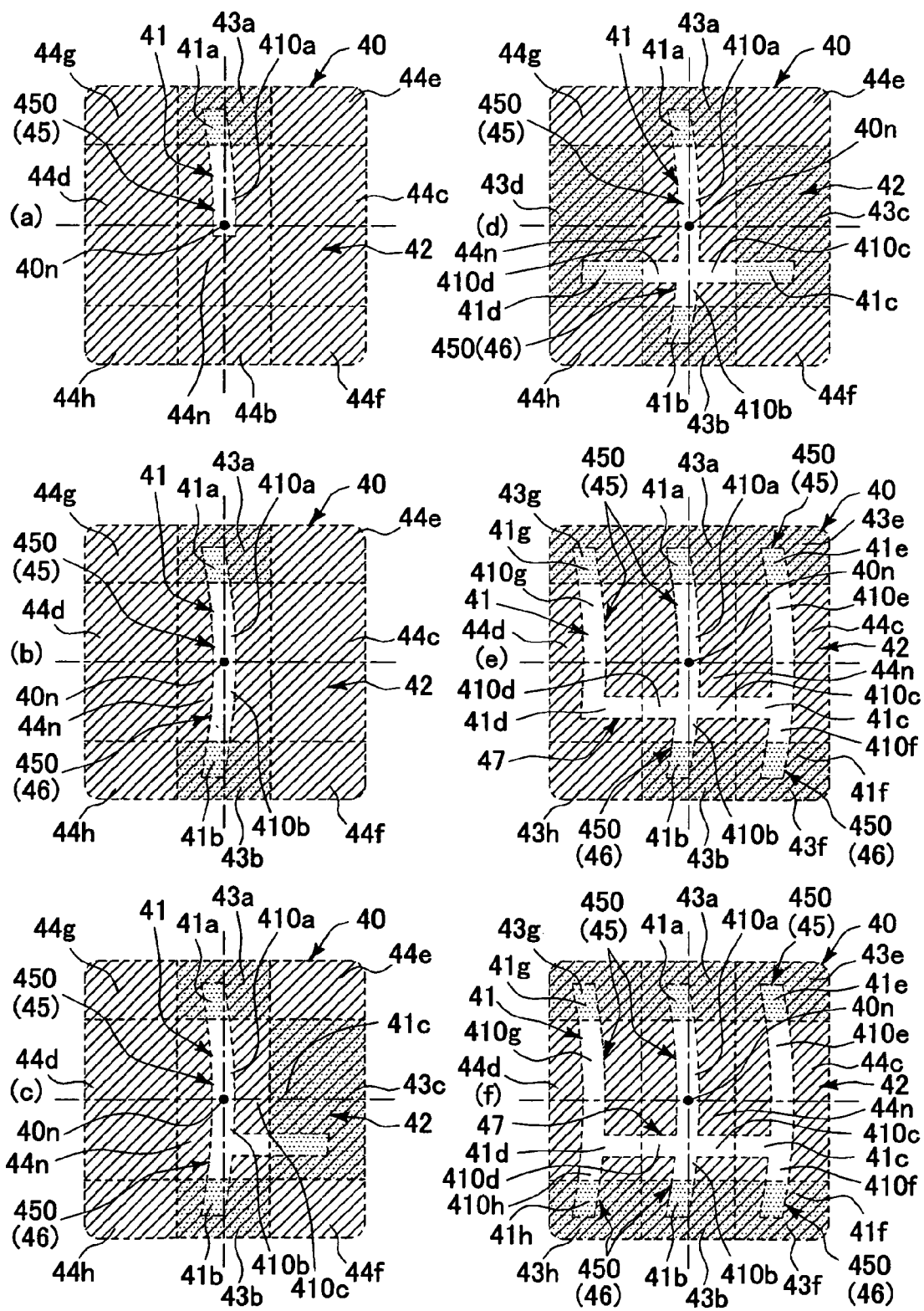
FIG. 49 simply shows the two-dimensional operation surfaces in the arbitrary mode in the embodiment of FIG. 48 as the area modification 3.

In the discrete mode, both of the upward operation paths 45 and downward operation paths 46 can be provided as the curved vertical paths 450. In this case, as shown in FIG. 49, the operation strokes of the upward operation paths 45 can be defined longer than the operation strokes of the downward operation paths 46. The haptic device 1 provided on the steering wheel 2 is disposed to be operable in the vertical and lateral directions. Such a operation is usually performed by the thumb. However, upward operations by the thumb are easy but downward operations by the thumb are difficult. This is because upward operation strokes can be long but downward operation strokes cannot be long due to the mechanism of the thumb. In this structure, since the upward operation strokes are set longer than the downward operation strokes, the upward operations need large operational burden while the downward operations are easy, generating less erroneous operations (area modification 3).

In this embodiment, as described above, there is difference between the upward operation paths 45 and the downward operation paths 46 in length. In the display on the display 202, the graphics related to amounts of the operation strokes of the unique paths 410 are displayed independently of the length of the actual operation stroke of the haptic device 1. That is, since only at least rough shapes of the unique paths 410 may be understood on the display 202, the unique paths 410 do not need to be displayed in detail. In the modification 3, a design oriented display is performed as shown in FIG. 41. In FIG. 41, in graphic displays 55 and 56 related to amounts of the operation strokes of the upward operation paths and the downward operation paths, lengths of the strokes are the same, improving the design of the display.

The common path 47 of the embodiment shown in FIG. 49 is disposed below the neutral position 40*n* of the reaction force on the two-dimensional operation surface 40. When the operation strokes of the upward operation paths 45 is defined longer than the operation strokes of the downward operation paths 46, the common path 47 can be disposed to a position passing through the neutral position 40*n* of the reaction force. Since the joystick type controller 21 is always disposed in the neutral position 40*n* when not provided with the reaction force, the position indication operations to the selectable areas 43 become generally easy. The non-selectable area 46*a* receiving no position input can be defined extending from the corresponding non-selectable area 43 on the downward operation path 46. An amount of an operation stroke of the downward operation path 46 and non-selectable area 43*a* is the same as that of the upward operation path 45 disposed vertically symmetrical thereto. The arbitrary mode in these embodiments may be defined as shown in FIG. 25. A vertically asymmetrical form reflecting the arrangement form of the selectable areas 43 of the discrete mode may be used. In these embodiments, when the lower areas remain, these areas may be defined as the operation restriction areas 42.

In the above-mentioned embodiments in which the discrete mode is set as shown in FIG. 49, the neutral position 40*n* may be disposed under the geometric center position of the two-dimensional operation surface 40 so that the common path 47 passes through the neutral position 40*n* of the reaction force on the two-dimensional operation surface 40.

It will be obvious to those skilled in the art that various changes may be made in the above-described embodiments of the present invention. However the scope of the present invention should be determined by the following claims.

What is claimed is:

1. An input apparatus for a vehicle, being used for an operation input of a vehicular electronic device, the input apparatus comprising:
an operation input device configured to perform a position indication operation on a two-dimensional operation surface having a predetermined operation range wherein an operation axis is maintained at a neutral angle position when not in operation and wherein the operation input device is operated, against a reaction force that returns the operation axis to the neutral angle position, to tilt the operation axis in a direction of a position to be indicated when in operation;
a reaction force applying device configured to apply the reaction force in response to a position indication operation performed to the operation input device;
a selectable area setting device configured to set selectable areas for the position input in the operation range on the two-dimensional operation surface;
a reaction force control device configured to set, as a control mode for the reaction force, a guide input mode in which the reaction force is controlled to guide the position indication operation toward the selectable areas by the operation input device along unique paths defined on the selectable areas on the two-dimensional surface; and
a setting pattern change portion device, wherein
the operation input device is provided on a steering wheel of the vehicle and is operable by a thumb of a driver when the steering wheel is in a reference position in which the vehicle travels straight and when the driver grips both sides of the steering wheel,
the unique path includes a plurality of vertical paths and a lateral common path connecting the plurality of the vertical paths on the two-dimensional operation surface,
the lateral common path divides the plurality of vertical paths into a plurality of upward operation paths and a plurality of downward operation paths,
the selectable area setting device is configured to set the selectable areas in accordance with one of a plurality of setting patterns, each of which corresponds to an arrangement position of the selectable areas, the plurality of setting patterns have the lateral common path but are different from each other, and
the setting pattern change portion device is configured to change the plurality of setting patterns by adding at least one of the upward operation path and the downward operation path to the lateral common path.

2. The input apparatus of claim 1,
wherein the reaction force control device has, as a control mode for the reaction force, an arbitrary mode in which a position indication operation toward the selectable areas by the operation input device is performed arbitrarily in the operation range on the two-dimensional operation surface, and the guide input mode is set at least during a travel of a vehicle.

3. The input apparatus of claim 2 further comprising:
a travel condition detecting device for detecting a predetermined travel condition of the vehicle, wherein
the reaction force control device is configured to set the guide input mode when the predetermined travel condition is detected and sets the arbitrary mode when the predetermined travel condition is not detected.

4. The input apparatus of claim 3,
wherein the travel condition detecting device is configured to detect a vehicle speed of the vehicle, and
the reaction force control device is configured to set the guide input mode when the vehicle speed detected is equal to or greater than a preset vehicle speed level, and set the arbitrary mode when the vehicle speed detected is smaller than the preset vehicle speed level.

5. The input apparatus of claim 1,
wherein the position input is performed when a position indicated by the position indication operation of the operation input device is on the selectable area.

6. The input apparatus of claim 1,
wherein the selectable area setting device is configured to assign corresponding control contents, which are performed by the position input to the selectable areas.

7. The input apparatus of claim 6,
wherein the control contents include a content performing a control for changing a current one of the setting patterns to a different one of the setting patterns in accordance with the position input to the corresponding selectable area.

8. The input apparatus of claim 7,
wherein the setting patterns assign the different vehicular electronic device or different device functions of the vehicular electronic device to a plurality of the selectable areas, and
the control contents assigned to the plurality of the selectable areas respectively have a content of a change to a setting pattern for, in accordance with the position input to each of the selectable areas, specifying a control indication content for the vehicular electronic device or the device function corresponding to the selectable area and for performing a control based on the control indication content.

9. The input apparatus of claim 6,
wherein the control contents include a content for specifying a control indication content corresponding to the vehicular electronic device or the device function of the vehicular electronic device in accordance with the position input to the corresponding selectable area and for performing a control based on the control indication content.

10. The input apparatus of claim 9,
wherein the control contents include a content for causing the reaction force control device to perform a control of the reaction force restricting the position input to the selectable areas except the corresponding selectable area in accordance with the position input to the corresponding selectable area in the guide input mode.

11. The input apparatus of claim 1 further comprising:
an operation content display device configured to display correspondences between arrangement positions of the selectable areas set by the selectable area setting device and the control contents corresponding to the selectable areas; and
a display content changing device configured to, in accordance with a change of the setting patterns by the selectable area setting device, change a display content displayed by the operation content display device to a corresponding content.

12. The input apparatus of claim 11,
wherein the operation content display device is configured to display figures of arrangement positions of the selectable areas and figures of the unique paths toward the arrangement positions, at least in the guide input mode.

13. The input apparatus of claim 11,
wherein the operation content display device is configured to display the display content on a meter display disposed in front of a driver's seat.

14. The input apparatus of claim 11,
wherein the operation content display device is composed as a head-up display which projects the display content on a windshield in front of the driver's seat.

15. The input apparatus of claim 11,
wherein the operation content display device is configured to display the display content on a center display disposed to a center on a front in a vehicle interior.

16. The input apparatus of claim 1,
wherein a length of an operation stroke toward the corresponding selectable area on the two-dimensional operation surface on each of the unique paths is set to a unique length in accordance with an operation direction of the operation input device.

17. The input apparatus of claim 16,
wherein the selectable area setting device is configured to assign corresponding control contents, which are performed by the position input to the selectable areas.

18. An input apparatus for a vehicle, being used for an operation input of a vehicular electronic device, the input apparatus comprising:
an operation input device configured to perform a position indication operation on a two-dimensional operation surface having a predetermined operation range wherein an operation axis is maintained at a neutral angle position and at a neutral position when not in operation and wherein the operation input device is operated, against a reaction force that returns the operation axis to the neutral angle position, to tilt the operation axis in a direction of a position to be indicated when in operation;
a reaction force applying device configured to apply the reaction force in response to a position indication operation performed to the operation input device;
a selectable area setting device configured to set selectable areas for the position input in the operation range on the two-dimensional operation surface; and
a reaction force control device configured to set, as a control mode for the reaction force, a guide input mode in which the reaction force is controlled to guide the position indication operation toward the selectable areas by the operation input device along unique paths defined on the selectable areas on the two-dimensional surface, wherein
the operation input device is provided on a steering wheel of the vehicle and is operable by a thumb of a driver when the steering wheel is in a reference position in which the vehicle travels straight and when the driver grips both sides of the steering wheel,
the unique paths includes a plurality of vertical paths and a lateral common path connecting the plurality of the vertical paths on the two-dimensional operation surface,
the lateral common path divides the plurality of vertical paths into a plurality of upward operation paths and a plurality of downward operation paths,
the upward operation path guiding an upward operation of the operation input device to move toward the corresponding selectable area and the downward operation path guiding a downward operation of the operation input device to move toward the corresponding selectable area, and
when both of the upward operation path and the downward operation path are present, an operation stroke of the upward operation path is set longer than that of the downward operation path.

19. The input apparatus of claim 18,
wherein the neutral angle position is disposed on one of the upward operation path, and the lateral common path is disposed below the neutral position of the reaction force on the two-dimensional operation surface.

20. The input apparatus of claim 19,
wherein a non-selectable path further extending downward from the corresponding selectable area and not receiving the position input is defined on the downward operation path.

21. The input apparatus of claim 18,
wherein the lateral common path is disposed to a position passing through the neutral position of the reaction force on the two-dimensional operation surface.

22. The input apparatus of claim 18 further comprising:

an operation content display device configured to display correspondences between arrangement positions of the selectable areas set by the selectable area setting device and the control contents corresponding to the selectable areas, to display figures of the unique paths corresponding to the selectable areas, and to display figures of operation stroke amounts toward the selectable areas corresponding to the unique paths regardless of actual lengths of the operation stroke amounts by the operation input device.

23. The input apparatus of claim 22, wherein the operation content display device is configured to display figures of the operation stroke amounts of the upward operation path and the downward operation path such that lengths of the figures are uniform.

24. An input apparatus for a vehicle, being used for an operation input of a vehicular electronic device, the input apparatus comprising:

an operation input device configured to perform a position indication operation on a two-dimensional operation surface having a predetermined operation range wherein an operation axis is maintained at a neutral angle position when not in operation and wherein the operation input device is operated, against a reaction force that returns the operation axis to the neutral angle position, to tilt the operation axis in a direction of a position to be indicated when in operation;

a reaction force applying device configured to apply the reaction force in response to a position indication operation performed to the operation input device;

a selectable area setting device configured to set selectable areas for the position input in the operation range on the two-dimensional operation surface;

a reaction force control device configured to set, as a control mode for the reaction force, a guide input mode in which the reaction force is controlled to guide the position indication operation toward the selectable areas by the operation input device along unique paths defined on the selectable areas on the two-dimensional surface; and a vehicle speed detecting device configured to detect a vehicle speed of the vehicle, wherein the operation input device is provided on a steering wheel of the vehicle and is operable by a thumb of a driver when the steering wheel is in a reference position in which the vehicle travels straight and when the driver grips both sides of the steering wheel, the unique paths includes a plurality of vertical paths on the two dimensional operation surface, and all vertical paths have respective curved shapes around a base knuckle disposed to a base of the thumb for operation, and wherein a vertical operation stroke of at least one of the vertical path is set longer as the vehicle speed detected is higher, and the vertical operation stroke of the vertical path is set shorter as the vehicle speed detected is slower.

25. An input apparatus for a vehicle, being used for an operation input of a vehicular electronic device, the input apparatus comprising:

an operation input device configured to perform a position indication operation on a two-dimensional operation surface having a predetermined operation range wherein an operation axis is maintained at a neutral angle position when not in operation and wherein the operation input device is operated, against a reaction force that returns the operation axis to the neutral angle position, to tilt the operation axis in a direction of a position to be indicated when in operation;

a reaction force applying device configured to apply the reaction force in response to a position indication operation performed to the operation input device;

a selectable area setting device configured to set selectable areas for the position input in the operation range on the two-dimensional operation surface; and a reaction force control device configured to set, as a control mode for the reaction force, a guide input mode in which the reaction force is controlled to guide the position indication operation toward the selectable areas by the operation input device along unique paths defined on the selectable areas on the two-dimensional surface, wherein the operation input device is provided on a steering wheel of the vehicle and is operable by a thumb of a driver when the steering wheel is in a reference position in which the vehicle travels straight and when the driver grips both sides of the steering wheel, the unique paths include a vertical path on the two dimensional operation surface, and at least the vertical path has a curved shape around a base knuckle of the thumb for operation, and wherein an operation stroke of the upward operation path is defined longer than an operation stroke of the downward operation path.

* * * * *